United States Patent
Schwab et al.

(10) Patent No.: US 7,372,951 B2
(45) Date of Patent: *May 13, 2008

(54) CALL PROGRAMMING APPARATUS AND METHOD

(75) Inventors: Eileen Cecilia Schwab, Schaumburg, IL (US); Gayle Roberta Ekstrom, Chicago, IL (US); Gisele Arlette Marcus, Chicago, IL (US); Edward Alan Ossello, Chicago Heights, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/823,889

(22) Filed: Jun. 28, 2007

(65) Prior Publication Data

US 2007/0253546 A1    Nov. 1, 2007

Related U.S. Application Data

(63) Continuation of application No. 11/472,005, filed on Jun. 20, 2006, now Pat. No. 7,254,225, which is a continuation of application No. 11/119,573, filed on May 2, 2005, now Pat. No. 7,088,811, which is a continuation of application No. 10/370,089, filed on Feb. 20, 2003, now Pat. No. 7,016,483, which is a continuation of application No. 10/134,943, filed on Apr. 29, 2002, now Pat. No. 6,597,781, which is a continuation of application No. 09/250,686, filed on Feb. 16, 1999, now Pat. No. 6,381,323.

(51) Int. Cl.
*H04M 3/42* (2006.01)
*H04M 3/46* (2006.01)

(52) U.S. Cl. .................... 379/211.02; 379/201.02; 379/211.03; 379/211.04

(58) Field of Classification Search ........... 379/201.01, 379/201.02, 207.02, 211.01–211.04, 216.01, 379/221.01, 913; 455/461
See application file for complete search history.

(56) References Cited

U.S. PATENT DOCUMENTS

| | | | |
|---|---|---|---|
| 4,313,035 A | 1/1982 | Jordan et al. | |
| 5,060,255 A | 10/1991 | Brown | |
| 5,243,645 A | 9/1993 | Bissell et al. | |
| 5,249,219 A | 9/1993 | Morganstein et al. | |
| 5,369,686 A | 11/1994 | Dutra et al. | |
| 5,452,347 A | 9/1995 | Iglehart et al. | |
| 5,475,748 A | 12/1995 | Jones | |
| 5,487,111 A | 1/1996 | Slusky et al. | |
| 5,506,888 A | 4/1996 | Hayes et al. | |
| 5,548,636 A | 8/1996 | Banister et al. | |
| 5,555,292 A | 9/1996 | Eckhart | |
| 5,579,375 A | 11/1996 | Ginter | |
| 5,586,169 A | 12/1996 | Pinard et al. | |
| 5,588,037 A | 12/1996 | Fuller et al. | |
| 5,592,541 A | 1/1997 | Fleischer, III et al. | |
| 5,598,464 A | 1/1997 | Hess et al. | |
| 6,381,323 B1 | 4/2002 | Schwab et al. | |
| 6,597,781 B2 | 7/2003 | Schwab et al. | |
| 7,016,483 B2 | 3/2006 | Schwab et al. | |
| 7,088,811 B2 | 8/2006 | Schwab et al. | |
| 7,254,225 B2 * | 8/2007 | Schwab et al. | 379/211.02 |

* cited by examiner

*Primary Examiner*—Harry S. Hong
(74) *Attorney, Agent, or Firm*—Brinks Hofer Gilson & Lione

(57) ABSTRACT

A method of routing incoming telephone calls and programming routing options and apparatus that allows incoming calls to be routed according to various criteria programmed by a subscriber.

26 Claims, 58 Drawing Sheets

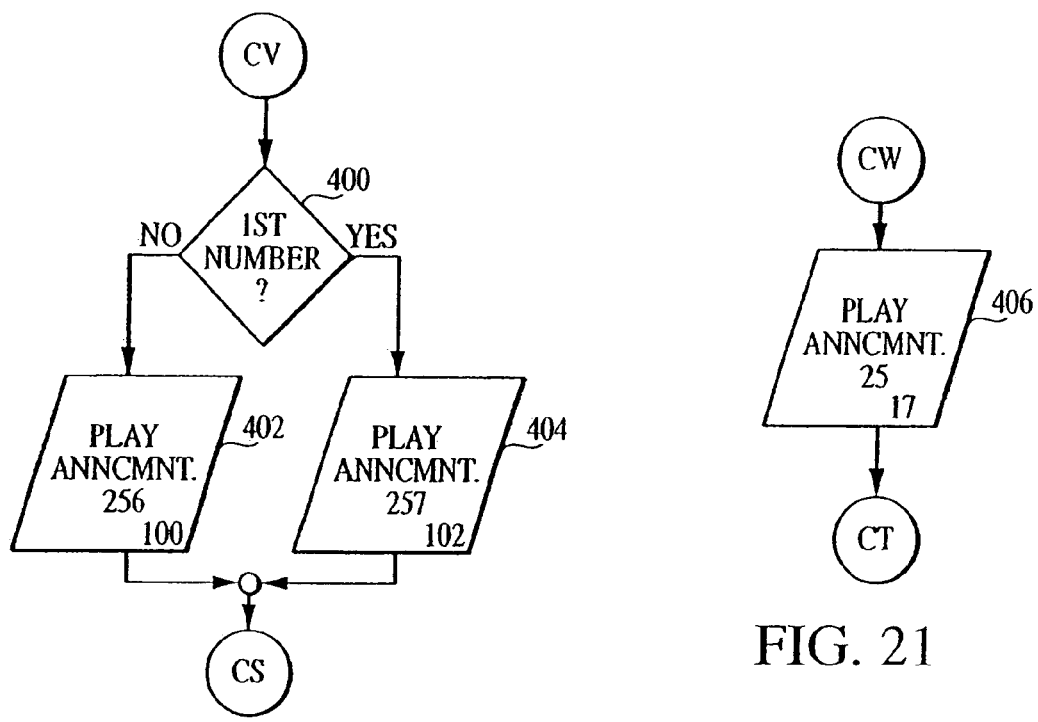
FIG. 20
FIG. 21
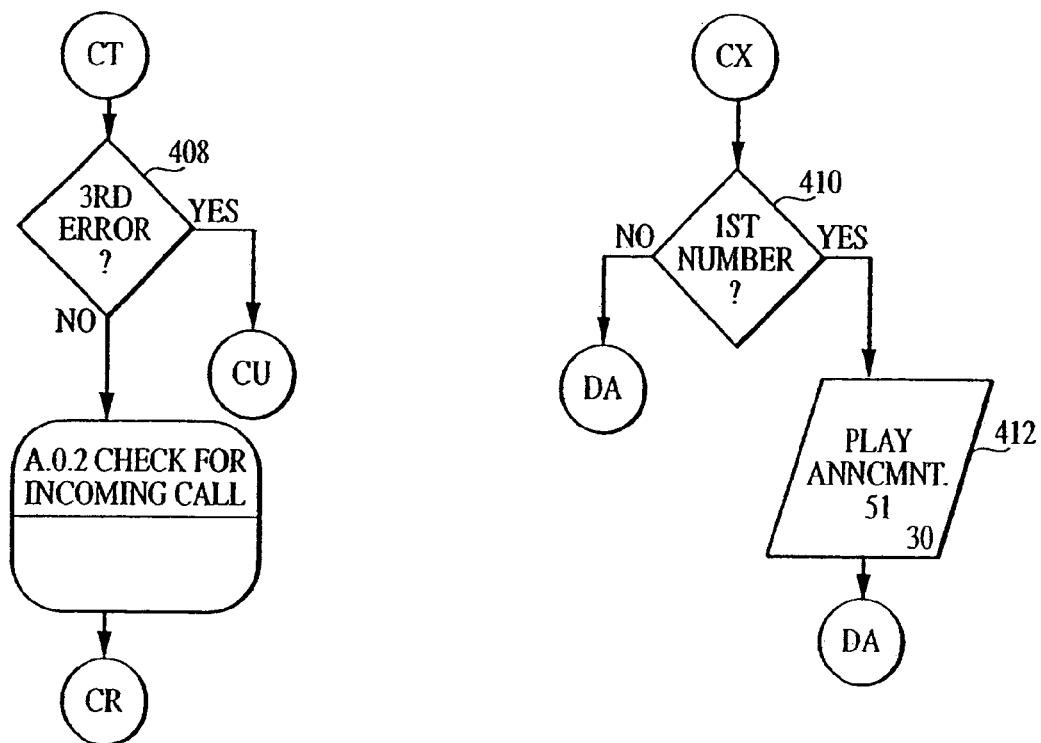
FIG. 22
FIG. 23

CALL PROGRAMMING APPARATUS AND METHOD

RELATED APPLICATIONS

This application is a continuation of U.S. application Ser. No. 11/472,005, filed Jun. 20, 2006, now U.S. Pat. No. 7,254,225, which is a continuation of U.S. application Ser. No. 11/119,573, filed May 2, 2005, now U.S. Pat. No. 7,088,811, which is a continuation of U.S. application Ser. No. 10/370,089, filed Feb. 20, 2003, now U.S. Pat. No. 7,016,483, which is a continuation of U.S. application Ser. No. 10/134,943, filed Apr. 29, 2002, now U.S. Pat. No. 6,597,781, which is a continuation of U.S. application Ser. No. 09/250,686, filed Feb. 16, 1999, now U.S. Pat. No. 6,381,323, all of which applications are hereby incorporated by reference herein.

BACKGROUND

The present invention relates to a call programming apparatus and method, and more particularly, to a call programming apparatus and method that allows subscribers to program a schedule of how their incoming calls should be routed based upon each subscriber's programmed profile.

People are more on the go now than ever before. Because of this, telecommunication needs have become more complicated than merely routing one incoming call to one number. For example, U.S. Pat. No. 5,588,037 (Fuller et al.) discloses a method of call handling that includes remote programmable call forwarding which allows a user to set up a weekly schedule feature that allows calls to be routed depending on the day of the week and the time the call was made. Also disclosed is an override feature where the user can override the weekly schedule should his or her schedule deviate from the programmed sequence.

U.S. Pat. No. 5,487,111 (Slusky) discloses a sequential call routing telecommunication system that allows a caller who is trying to reach a called subscriber to be routed to each of a sequence of telephone numbers specified by the subscriber. The subscriber can indicate call forwarding numbers and can designate the date and/or time during which call forwarding to any particular one of the call forwarding telephone numbers is to be effective.

While these known systems provide increased flexibility, with today's on-the-go society, even more flexibility is desirable.

It is thus desirable to provide a call routing apparatus and method that affords the subscriber great flexibility in determining how incoming calls should be routed. It is also desirable to provide a flexible call routing scheme that is easy to implement and modify.

BRIEF SUMMARY

According to a first aspect of the invention there is provided a method for routing incoming telephone calls. The method includes the steps of:

(a) coupling an incoming call directed to a subscriber to a platform;

(b) determining if a sequential search feature is active;

(c) in response to step (b), if the sequential search feature is active, directing the incoming call to a first number on the subscriber's sequential list stored on the platform and, if there is no answer at the first number directing the incoming call to a second number of the subscriber's sequential list;

(d) in response to step (b), if it is determined that the sequential search feature is not active, determining if a simultaneous search feature is active;

(e) in response to step (d), if it is determined that the simultaneous search feature is active, directing the incoming call to all numbers on the subscriber's simultaneous list stored on the platform;

(f) determining if a programmed schedule feature is active; and (g) in response to step (f), if the programmed schedule feature is active, directing an incoming call according to the programmed schedule.

According to a second aspect of the invention there is provided a method for routing incoming telephone calls. The method includes the steps of:

(a) coupling a call directed to a first telephone station to a service node, said call being initiated by a caller at a second telephone station;

(b) retrieving a subscriber's profile associated with the first telephone station at the service node in response to step (a) wherein the subscriber's profile indicates which routing options have been selected by the subscriber;

(c) routing the call of step (a) in accordance with the subscriber's profile by:

(i) determining if a sequential search feature is active;

(ii) in response to step (i), if the sequential search feature is active, directing the incoming call to a first number on the subscriber's sequential list, and if there is no answer at the first number, directing the incoming call to a second number on the subscriber's sequential list;

(iii) in response to step (i), if it is determined that the sequential search feature is not active, determining if a simultaneous search feature is active;

(iv) in response to step (iii), if it is determined that the simultaneous search feature is active, directing the incoming call to all numbers on the subscriber's simultaneous list;

(v) determining if a programmed schedule feature is active; and (vi) in response to step (v), if the programmed schedule feature is active, directing an incoming call according to the programmed schedule.

According to a third aspect of the invention there is provided a method of programming call routing options. The method includes the steps of (a) coupling an incoming call from a subscriber to a service node;

(b) generating a series of queries to the subscriber in response to the incoming call of step (a) wherein the series of queries includes:

(i) whether a sequential search list should be created and, if so, what telephone numbers should be included on the sequential search list;

(ii) whether a simultaneous search list should be created and, if so, what telephone numbers should be included on the simultaneous search list;

(iii) whether a programmed schedule list should be created and, if so, what telephone numbers should incoming calls be directed based upon the day of the week and time the incoming call is received; and (c) generating a subscriber profile in response to the subscriber's responses to the series of queries generated in step (b).

According to a fourth aspect of the invention there is provided a call routing apparatus for routing incoming telephone calls. The apparatus includes:

a memory for storing a profile for each subscriber wherein each profile indicates the routing options selected by the subscriber associated with the profile;

a platform for receiving an incoming telephone call from a calling party;

a processor located on the platform programmed to route incoming telephone calls according to the following steps:

(a) determining if a sequential search feature is active;

(b) in response to step (a), if the sequential search feature is active, directing an incoming call to a first number on the subscriber's sequential list and, if there is no answer at the first number, directing the incoming call to a second number on the subscriber's sequential list;

(c) in response to step (a), if it is determined that the sequential search feature is not active, determining if a simultaneous search feature is active;

(d) in response to step (c), if it is determined that the simultaneous search feature is active, directing the incoming call to all numbers on the subscriber's simultaneous list;

(e) determining if the subscriber has selected a programmed schedule feature; and (f) in response to step (e), if the programmed schedule feature is active, directing an incoming call according to the programmed schedule.

According to a fifth aspect of the invention there is provided an apparatus for programming call routing options. The apparatus includes:

a platform for receiving an incoming call from a subscriber a processor located on the platform programmed to generate the following queries:

(i) whether a sequential search list should be created and, if so, what telephone numbers should be included on the sequential search list;

(ii) whether a simultaneous search list should be created, and if so, what telephone numbers should be included on the simultaneous search list;

(iii) whether a programmed schedule list should be created and, if so, what telephone numbers should incoming calls be directed based upon the day of the week and time the incoming call is received; and generating a subscriber profile in response to the subscriber's responses to the series of queries generated in steps (i-iii);

a database storing a subscriber profile.

BRIEF DESCRIPTION OF THE DRAWINGS

FIGS. 19-33 illustrate the sequential programming portion of the redo schedule subroutine program.

DETAILED DESCRIPTION OF THE PRESENTLY PREFERRED EMBODIMENTS

Figure 1:
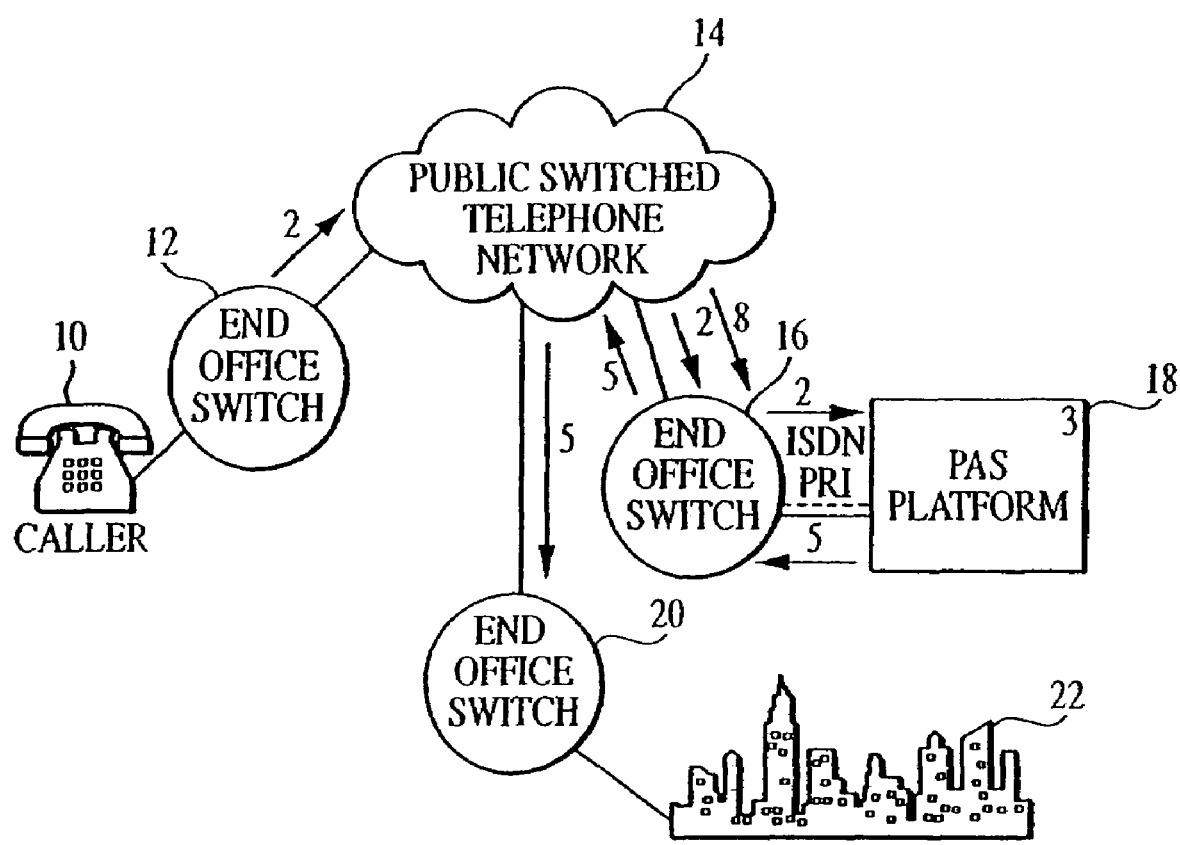
FIG. 1 is a schematic of a call flow pattern illustrating a subscriber's interaction with the platform according to a preferred embodiment of the present invention.

FIG. 1 is a schematic of a call flow pattern illustrating a subscriber's interaction with a platform according to a preferred embodiment of the present invention. In a preferred embodiment the system includes a first end office switch 12, a public switched telephone network 14, a second end office switch 16 and a platform 18. In a preferred embodiment the subscriber is given a personal access service ("PAS") telephone number. The subscriber dials his or her PAS number and the call is routed to the platform 18 through the first and second end office switches 12, 16 and the network 14. The subscriber is presented with a greeting which advises the subscriber of the steps he or she can take to create a new subscriber profile or modify an existing subscriber profile as will be described in detail with reference to the flow charts shown in FIGS. 5-53. A subscriber's profile is a record stored preferably in a database that indicates how a subscriber wants his or her incoming calls to be directed. While the term subscriber is used throughout this application it is interchangeable with the term user and the present invention is not intended to be limited to any particular type of user. While the input media is shown as a touch tone telephone, other input media may be used such as the web or telephones using touch tones, speech, graphical user interfaces or other interfaces.

Basically the subscriber has the following options to process incoming calls. The subscriber may choose to establish a programmed schedule where incoming calls are forwarded based upon the programmed schedule, for example, the time of day and/or day of week the incoming call is received. The subscriber can modify the programmed schedule at any time. The subscriber may choose a sequential ring option where incoming calls are forwarded sequentially to a series of telephone numbers starting with the telephone number given the highest priority until either the call is answered or the call is sent to a default destination such as voice mail, for example. The subscriber may choose a simultaneous ring option where all of the phone numbers selected by the subscriber will ring at the same time until one of the phone numbers is answered. Finally, the subscriber has the option of overriding the schedule with one number programming where all incoming calls are forwarded to one number provided by the subscriber. This option bypasses the programmed schedule, the location sequencing programming and the simultaneous ring programming. All of these options will be described in detail in the flowcharts which will be described in detail hereafter.

Figure 2:
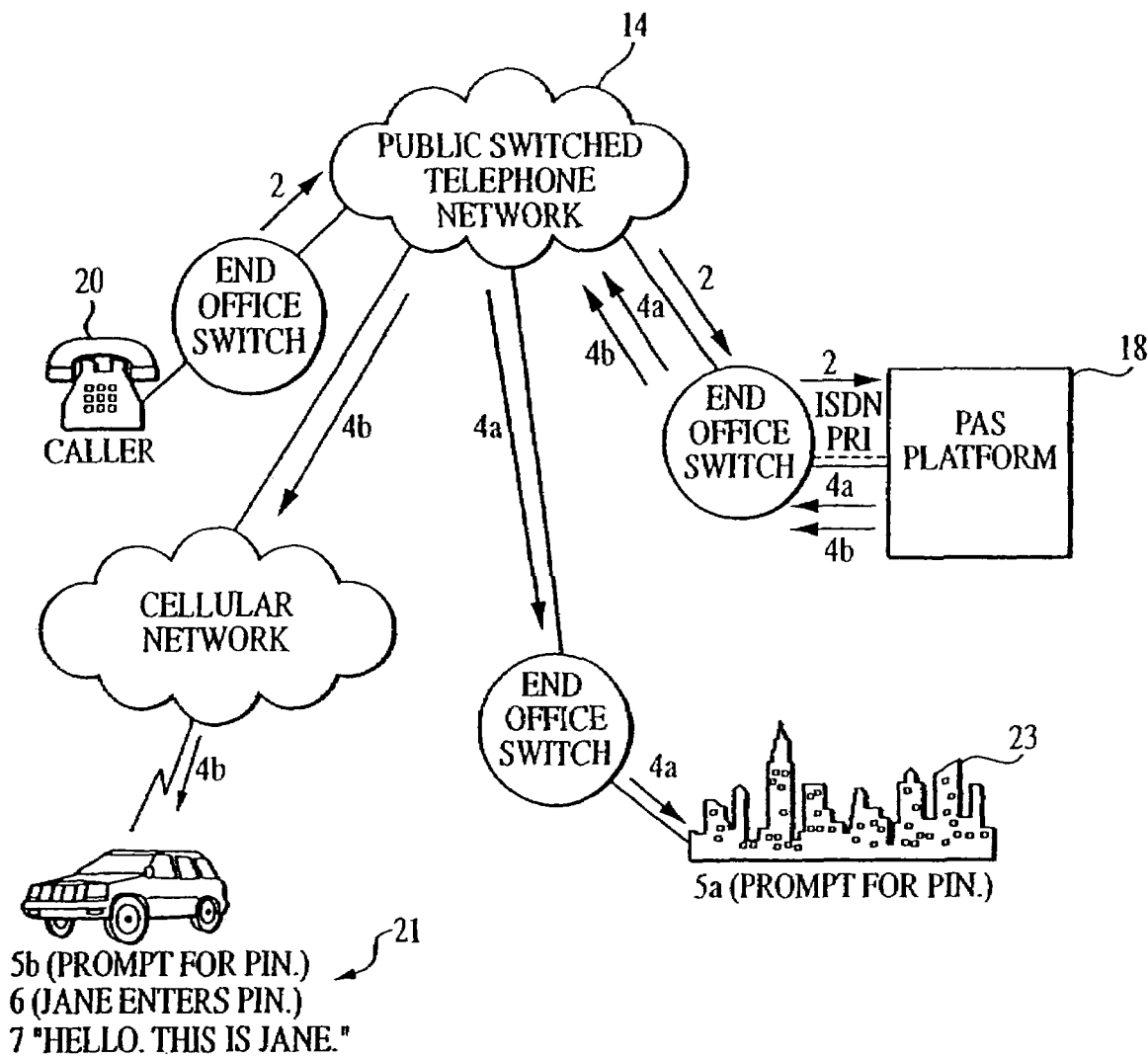
FIG. 2 illustrates the call flow pattern when a subscriber has selected the simultaneous call routing option.

FIG. 2 illustrates the call flow pattern when a subscriber has selected the simultaneous call routing option. A calling party 20 dials a subscriber's PAS telephone number. The call is routed to the platform 18 where the subscriber's profile is retrieved from memory and it is determined that simultaneous routing has been selected and both the subscriber's business and car telephones 21 and 23 respectively should be rung simultaneously. The platform 18 initiates calls simultaneously to the subscriber's business and car telephones. If the phones at both locations are answered and the subscriber has activated a PIN acceptance feature so that someone who answers a call for the subscriber will not be able to intercept the call, the platform will prompt for a PIN entry. Assuming the subscriber answers the phone in her car, she will enter her PIN and the call is completed to the subscriber's car. The platform plays a polite announcement to the person who answered the business phone who did not have the PIN and then disconnects the call.

Figure 3:
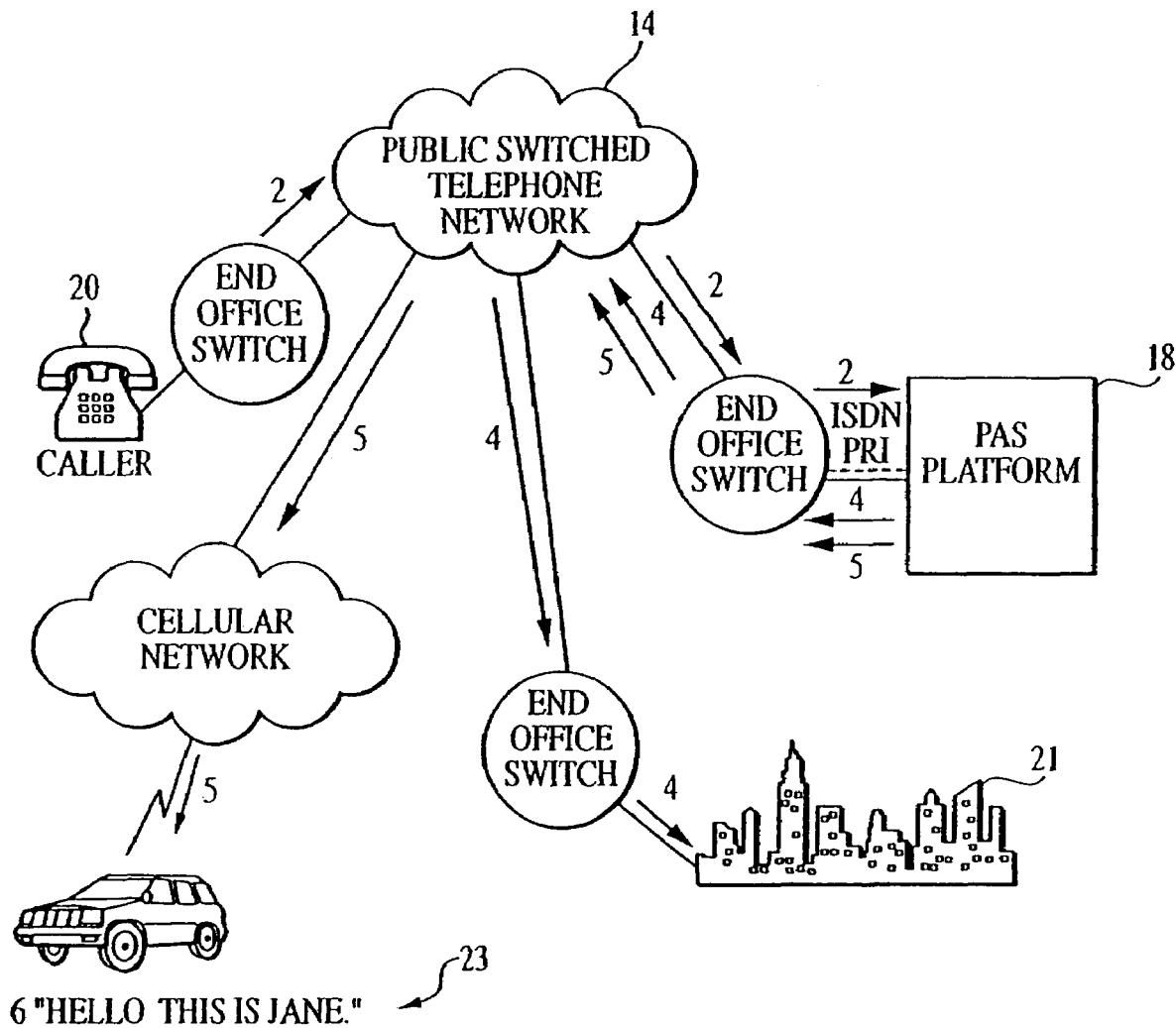
FIG. 3 illustrates the call flow pattern when a subscriber has selected the sequential call routing option.

FIG. 3 illustrates the call flow pattern when a subscriber has selected the sequential call routing option. A calling party 20 dials the subscriber's PAS number and the call is routed through the network 14 to the platform 18. At the platform the subscriber's profile is retrieved and it is determined that the incoming call should be sequentially routed to the following numbers in the following order: business 21, car 23, or default. The platform 18 initiates a call to the subscriber's business, however, if it is either busy or no one answers, the platform 18 next initiates a call to the subscriber's car and the subscriber answers. If the subscriber did not answer the phone in her car, the incoming call would have been sent to a default location.

The call scheduling or routing platform 18, which will be described in detail with reference to FIG. 4, implements the features of call scheduling and routing according to the present invention. The call scheduling and routing platform 18 has a database that contains a profile for each subscriber indicating what options the subscriber has selected as well as any modifications to that profile.

Figure 4:
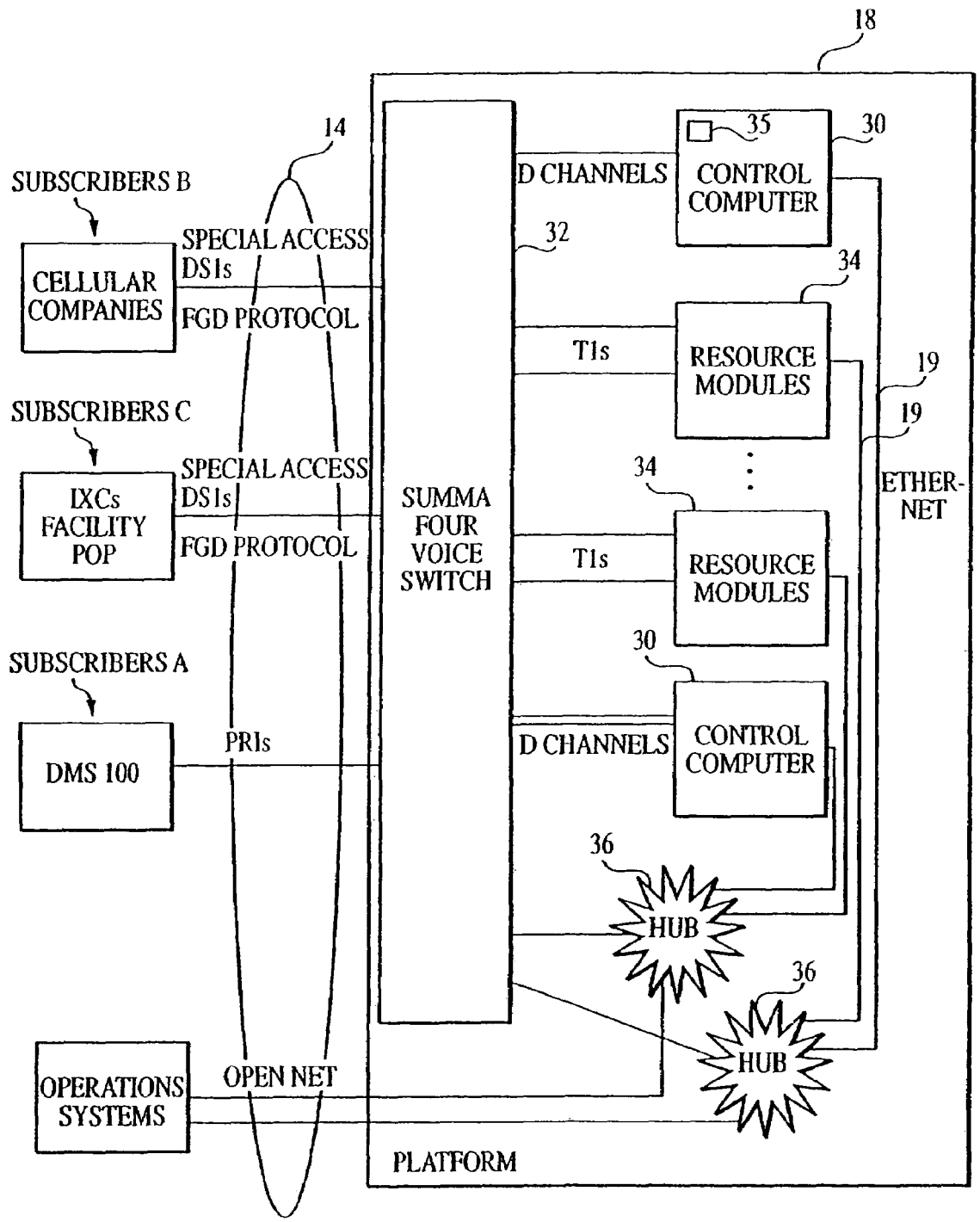
FIG. 4 is a block diagram of the call scheduling and routing platform shown in FIGS. 1-3.

FIG. 4 is a block diagram of the call scheduling and routing platform 18 shown in FIGS. 1-3. The platform 18 is preferably implemented in a standalone service node which can be integrated into an existing network infrastructure. The service supports the platform applications and provides service functionality to a plurality of subscribers. The platform includes several hardware and software components that are integrated into the platform to provide the processing, switching, peripheral control, database of subscribers' profiles and interactive voice response capabilities for implementing the present invention. Specifically, these components include computers 30, a voice switch 32, and multiple resource modules 34 for interactive voice response, voice mail, and voice recognition, all connected within the platform 18 preferably by a dual Ethernet bus 19 through a pair of hubs 36. Preferably voice switch 32 is a Summa Four voice switch available from Suma Four, Inc. of Manchester, N.H. Of course other switches may be used and the present invention is not limited to the illustrated embodiment.

In a preferred embodiment the platform 18 has two types of connections to the public switched telephone network 14 to terminate incoming calls to subscriber telephone numbers stored on the platform, and originate outgoing calls to the subscribers location or voice mail box. These are standard telephone connections which have the ability to pass out of band information as determined by the FCC such as PRI, BRI, for example. Subscribers A may have their calls directed to the platform 18 over PRI lines that connect the platform 18 to end office switches. The PRIs connect through a smart jack (not shown), for example, to DS1 interface ports (not shown) of the Summa Four switch 32 in the platform 18. Subscribers B, for example, cellular/paging users, may have their calls directed to the platform 18 over either over PRI lines that connect the platform 18 to end office switches or they may have their calls carried by DS1 special access facilities with FGD protocol that connect the platform to a cellular company's switch. The PRIs and the special access facilities both connect through a smart jack (not shown), for example, to the DS1 interface ports (not shown) of the Summa Four switch in the platform 18. Subscribers C who are served by Interexchange Carriers (IXCs) may have their calls carried by DS1 special access facilities with FGD protocol that connect the platform 18 to the IXCs facility point of the presence (POP). The special access facilities connect through a smart jack (not shown), for example, to the DS1 interface ports (not shown) of the Summa Four switch in the platform 18.

Preferably, the end office switch or switches that directly connect to the platform 18 terminate ISDN PRI lines, however, this is not necessary to practice the invention. These end office switches provide line-side connections to the platform 18 as they would to any other customer premises equipment, thus they contain the subscriber telephone numbers. In a preferred embodiment, a switch such as Northern Telecom DMS-100 can be used for the end office switches.

While the present invention is described with reference to the illustrated platform shown in FIG. 4, the present invention is not limited to such an architecture.

The subscriber can create and modify his or her own subscriber profile by programming a profile or modifying an existing profile directly from a DTMF telephone set. Alternatively, other interfaces may be used such as speech interfaces, a keyboard or mouse, or touch screen interfaces, for example. In particular, a subscriber can select and later modify which call routing features should be implemented from any location by dialing his or her PAS telephone number. FIGS. 5-53 are flowcharts representing the steps taken by the subscriber to implement call routing features. FIGS. 54-61 are flowcharts of incoming call processing which will be described in greater detail hereinafter.

1. Creating and/or Modifying a Subscriber's Programmed Schedule Subroutine

Figure 5:
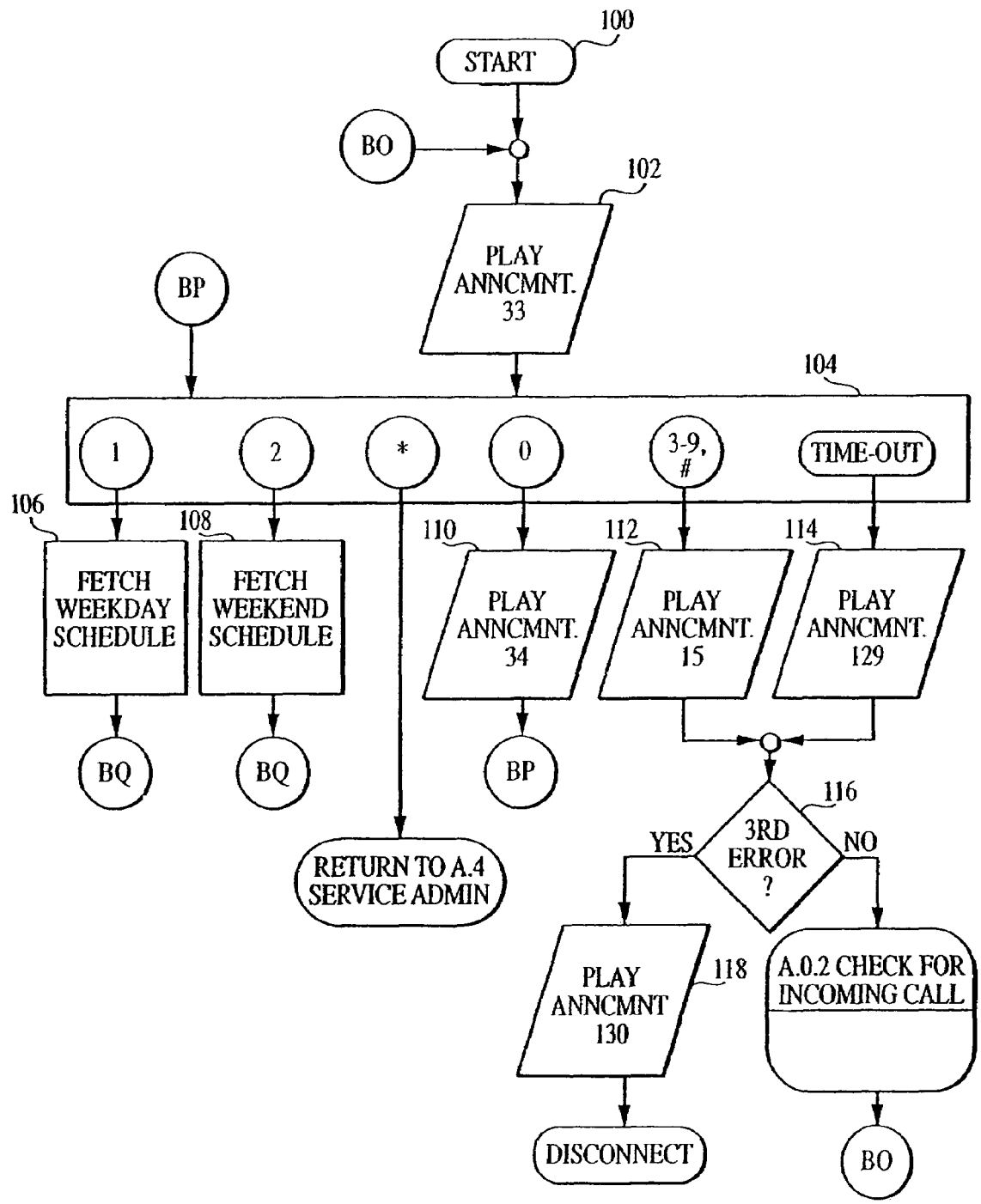
FIGS. 5 and 6 are flowcharts of selecting a schedule and choosing what to do with it.
Figure 6:
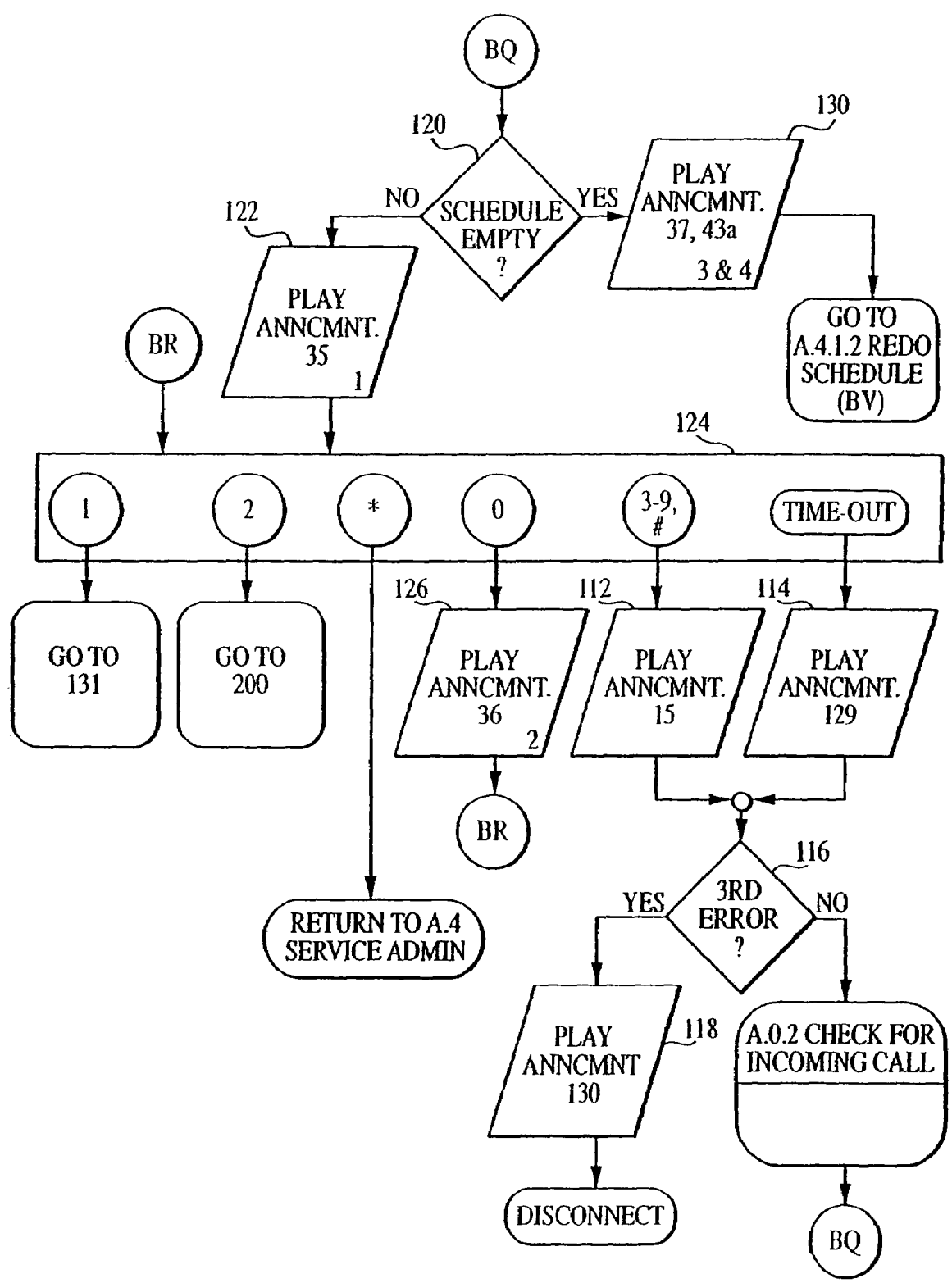

FIGS. 5 and 6 are flowcharts of selecting a schedule to either check it or change it. The program starts at reference 100. At step 102, the following announcement is played:

"Forwarding Schedules. To work with your weekday schedule, press one. To work with your weekend schedule, press two. To return to the previous menu, press star. For help, press zero now."

At step 104, it is determined which key on the keypad is pressed by the subscriber. If key 1 is pressed, then at step 106 the weekday schedule is retrieved. If key 2 is pressed, then at step 108 the weekend schedule is retrieved. If the star key is pressed, then control is transferred to a service administration menu which does not form part of the present invention. If the zero key is pressed, then at step 110 the following announcement is played:

"Help information. You can make your selection while this message is playing. Pressing one will allow you to listen to or change your weekday schedule. Pressing two will allow you to listen to or change your weekend schedule. Pressing star will return you to the Service Administration menu. If you need additional help, please contact your account representative."

Control is then returned to step 104 to determine what selection the subscriber makes. If keys 3-9 or the pound key is pressed, then at step 112 the following announcement is played: "<key pressed> is not a valid menu selection." If no selection is made before the system times out, preferably after about six seconds or any other allotted time period, then at step 114 the following announcement is played: "No keypresses have been received." At step 116 it is determined if this is the third time that the system has timed out before a selection has been made or if keys 3-9 or the pound key have been selected. If so, then at step 118 the following announcement is played: "You are having trouble using your Single Number Service. Please contact an account representative. Thank you. Good-bye." The caller is then disconnected. If it is determined at step 116 that this is not the third time that the system has timed out or an invalid key has been selected, control is returned to step 102.

If it is determined at step 104 that key 1 or 2 was selected, i.e., that the subscriber indicates that he or she would like to work with their weekday or weekend schedule respectively, control is passed to step 120 (FIG. 6), where it is determined if there is an existing schedule. If there is an existing schedule, then at step 122 the following announcement is played:

"<Weekday/Weekend> Schedule. To listen to the schedule, press one. To redo the schedule, press two. To return to the Service Administration menu, press star. For help, press zero now."

If it is determined at step 120 that there is no existing schedule, then at step 130 the following announcements are played: "Your <weekday/weekend> schedule is empty. You will be required to enter your entire <weekday/weekend> schedule. To continue, press one. Otherwise, press two. For help, press zero now." Control is then forwarded to step 206 (FIG. 9) of the redo schedule subroutine program which will be described in detail hereinafter. At step 124 it is determined what key the subscriber presses. If key 1 is pressed, control is passed to step 131 (FIG. 7) of the listen to schedule subroutine program which will be described in detail hereinafter. If key 2 is selected, control is passed to step 200 (FIG. 9) of the redo schedule subroutine program. If the zero key is selected, then at step 126 the following announcement is played:

"Help Information. You can make your selection while this message is playing. Pressing one will allow you to listen to your <weekday/weekend> schedule. Pressing two will allow you to reenter your <weekday/weekend> schedule. You will have to reenter the entire schedule. Pressing star will return you to the Service Administration menu. If you need additional help, please contact your account representative."

Control is then returned to step 124 to determined what selection the subscriber has made. If keys 3-9 or the pound key is selected or the system times out, then the same steps 112, 114, 116 and 118 are carried out as previously described with reference to FIG. 5. If the star key is selected at step 124, then control is returned to the service administration menu.

Figure 7:
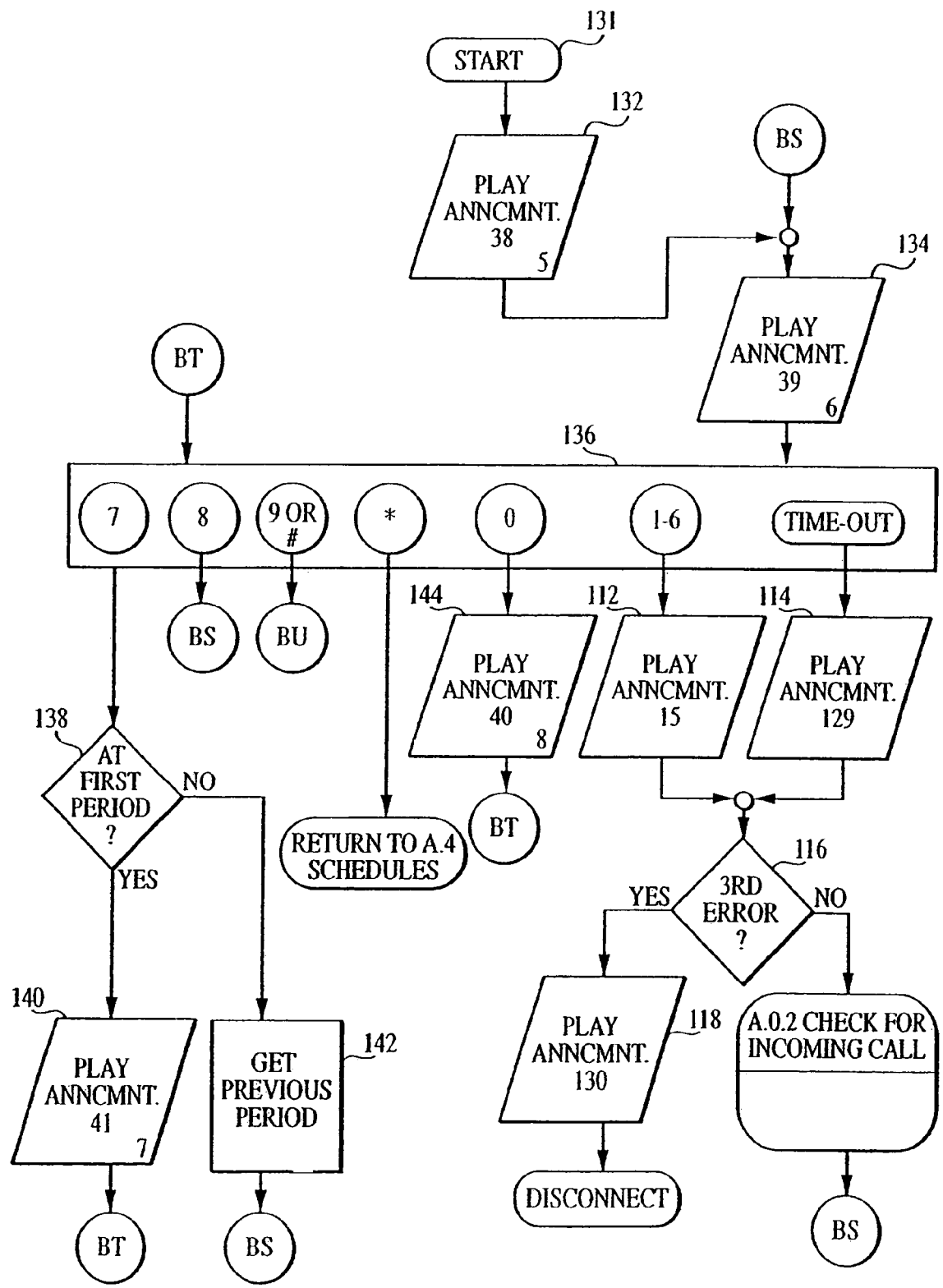
FIGS. 7 and 8 are flowcharts of the listen to schedule subroutine program.
Figure 8:
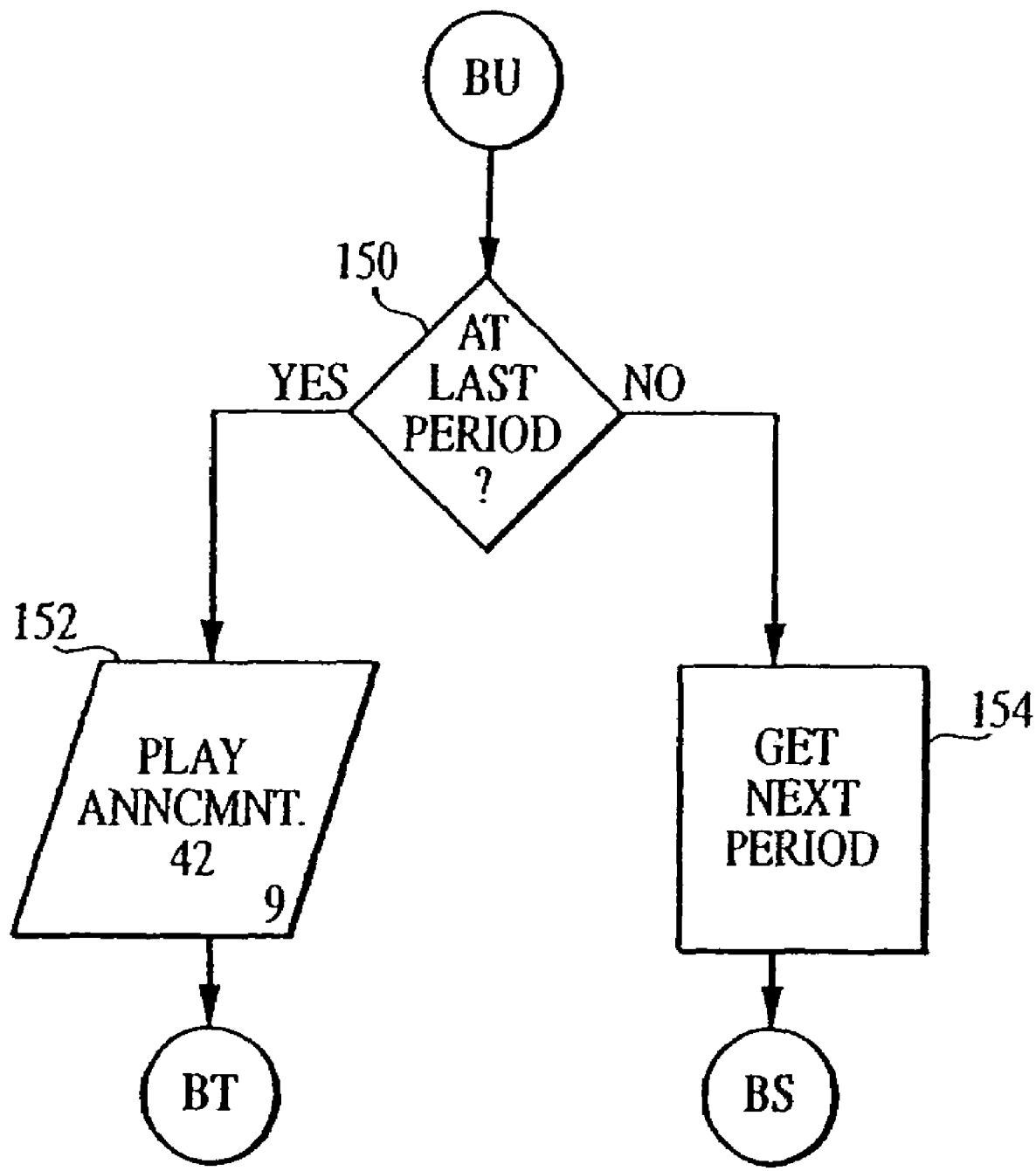
Figure 9:
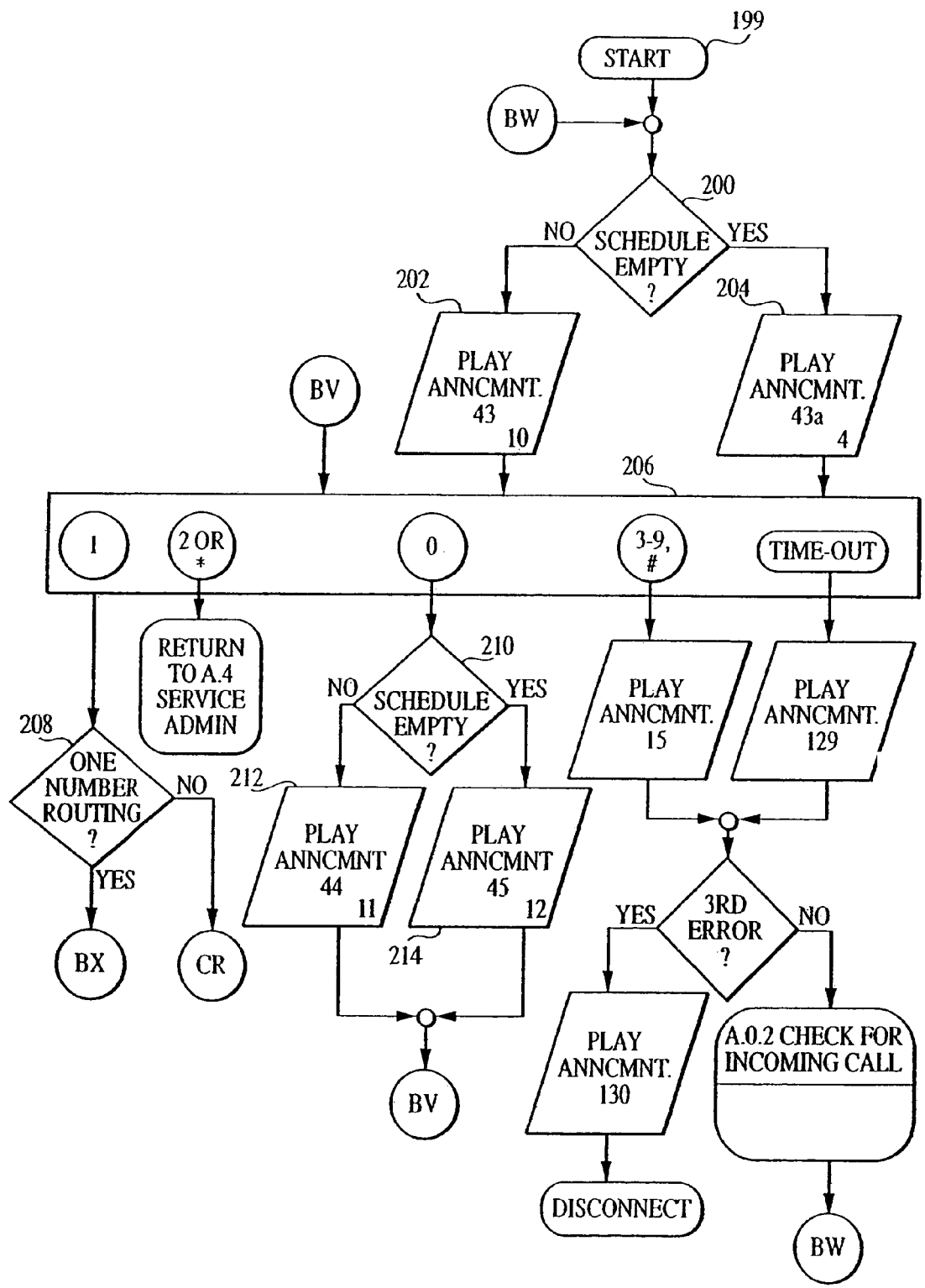
FIGS. 9-18 are flowcharts of the creating and/or modifying a subscriber's programmed schedule.

As previously described, if it is determined at step 124 that key 1 was pressed, then the listen to schedule subroutine program shown in FIGS. 7 and 8 is entered.

2. Listen to Schedule Subroutine Program

FIGS. 7 and 8 are flowcharts of the listen to schedule subroutine program. The program begins at reference 131. At step 132 the following announcement is played: "You can press pound to advance to the next time period and hear the contact numbers assigned to that time period." Then at step 134 the following announcement is played:

"In the time period starting at <starting time> the contact numbers are <contact numbers>. To hear the previous period, press 7. To replay this period, press 8. To hear the next time period, press 9 or pound. To cancel playback and return to the previous menu, press star. For help, press zero now."

At step 136 it is determined what key the subscriber presses. If key 7 is pressed, then at step 138 it is determined if the time period played at step 134 is already at the first period. If it is, then at step 140, the following announcement is played: "You are at the first time period of the day. To replay the first time period, press eight. To return to the <Weekday/Weekend> schedules menu, press star." Control is returned to step 136 to determine what selection the subscriber makes. If the time period was not the first period, then at step 142 the previous period is retrieved. Control is then returned to step 134 where the announcement played at step 134 is played again with the previous time period. If it is determined at step 136 that key 8 is pressed, control is also returned to step 134 and the announcement is replayed. If the star key is pressed, then control is returned to reference point 100 (FIG. 5). If the zero key is pressed, then at step 144 the following announcement is played:

"Help Information. You can make your selection while this message is playing. Pressing seven will take you back to the previous period and play the contact numbers you assigned to that period. Pressing eight will replay the time period and the numbers you just heard. Pressing nine or pound will let you hear the numbers you assigned to the next time period. Pressing star will return you to the previous menu. If you need additional help, please contact your account representative."

Control is then returned to step 136 to determine which key has been pressed. If keys 1-6 is pressed or the system times out, then the same steps 112, 114, 116, 118 are carried out as previously described with reference to FIG. 5. If key 9 or the pound key is selected at step 136 indicating that the subscriber wants to hear the next time period, then at step 150 (FIG. 8) it is determined if the time period listed in the announcement at step 134 was the last period. If it is, then at step 152 the following announcement is played: "You are at the last time period of the day. To replay the last time period, press eight. To return to the <Weekday/Weekend> schedules menu, press star." Control is then returned to step 136 (FIG. 7). If the time period is not the last period, then at step 154 the next period is retrieved. Control is then returned to step 134 (FIG. 7) and the announcement is played indicating the next period.

3. Redo Schedule Subroutine Program

FIGS. 9-48 are flowcharts of the redo schedule subroutine program.

a. One Number Programming Subroutine

FIGS. 9-18 are flowcharts of the one number programmed schedule.

Returning to FIG. 6, if it is determined at step 124 that key 2 is pressed indicating that the subscriber wishes to redo his or her schedule, the redo schedule subroutine program (FIGS. 9-48) is entered at reference point 199. At step 200 it is determined whether the schedule is empty. If it is not empty, then at step 202 the following announcement is played:

"You will be required to redo the entire <weekday/weekend> schedule. To continue, press one. Otherwise, press 2. For help, press zero now."

Figure 10:
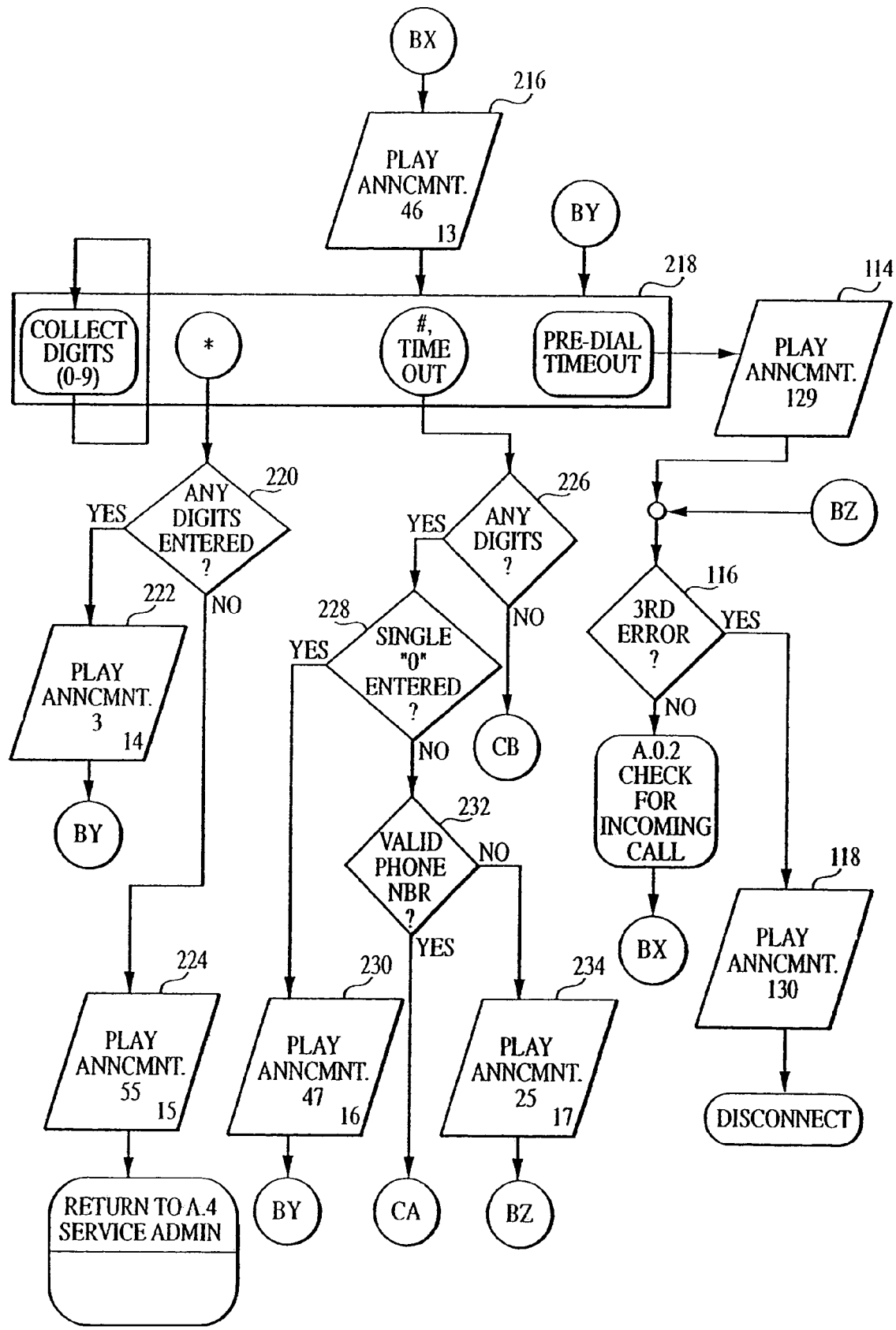

If it is determined that the schedule is empty, then at step 204 the following announcement is played: "You will be required to enter your entire <weekday/weekend> schedule." At step 206 it is determined what key the subscriber has pressed. If key 1 is pressed, then at step 208 it is determined whether one number routing is activated. If it is, then control is passed to step 216 (FIG. 10). If one number routing is not activated, then control is passed to step 370 (FIG. 19) where it will be determined if sequential programming is active, which will be described hereinafter. If either key 2 or the star key is pressed, control is returned to the administrative menu. If the zero key is pressed, then at step 210 it is determined whether the schedule is empty. If it is not, then at step 212 the following announcement is played:

"Help Information. You can make your selection while this message is playing. Pressing one will let you redo your <weekday/weekend> schedule. You will have to reenter the entire schedule once you begin. Pressing two will return you row to the Service administration menu without changing your schedule. If you need additional help, please contact your account representative."

Control is then returned to step 206 to determine what selection the subscriber makes. If it is determined that the schedule is empty, then at step 214 the following announcement is played:

"Help Information. You can make your selection while this message is playing. Pressing one will let you enter your <weekday/weekend> schedule. You will have to enter the entire schedule once you begin. Pressing two will return you to the Service administration menu without setting up your schedule. If you need additional help, please contact your account representative."

Control is then returned to step 206 to determine what key is selected by the subscriber. If the pound key is selected or the system times out, the same steps already described with reference to FIG. 5 are carried out.

If it is determined at step 208 that one number routing is activated, then at step 216 (FIG. 10) the following announcement is played:

"Enter the number to which you would like your voice calls forwarded in the time period starting at midnight. To forward calls to <default destination> just press pound."

At step 218 it is determined what key(s) is (are) pressed by the subscriber. If keys 0-9 is pressed, those numbers are stored in a memory. If the star key is pressed, then at step 220 it is determined whether any digits have been entered. If digits have been entered into memory, then at step 222 the following announcement is played: "Entry cleared." Control is then returned to step 218 to determine what keys are pressed. If it is determined at step 220 that no digits have been entered, then at step 224 the following announcement is played: "Schedule update canceled." Control is then returned to the service administrative menu. If the pound key is pressed or the system times out, then at step 226 it is determined whether any digits have been selected. If some digits have been selected, then at step 228 it is determined whether the zero key has been pressed once. If it has, then at step 230 the following announcement is played:

"Help Information. Enter the ten-digit number to which you would like your voice calls forwarded during the time period starting at midnight. It is not necessary to enter a one before the area code. If you want to forward your calls to <default destination>, just press pound. If you make a mistake while entering the number, pressing star will dear what you have entered and let you start over. Pressing star without entering any digits will return you to the Service Administration menu. If you need additional help, please contact your account representative."

Figure 11:
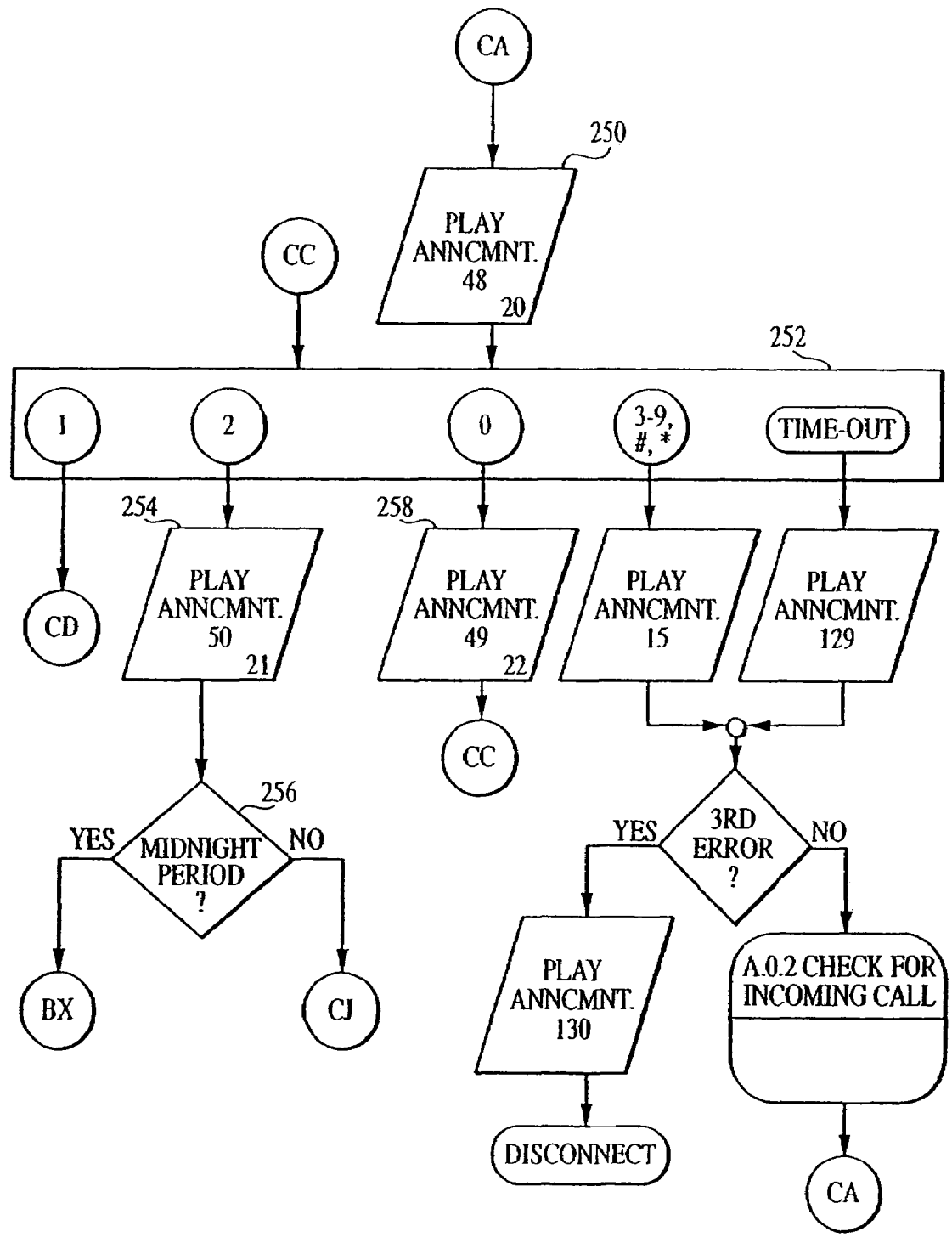
Figure 12:
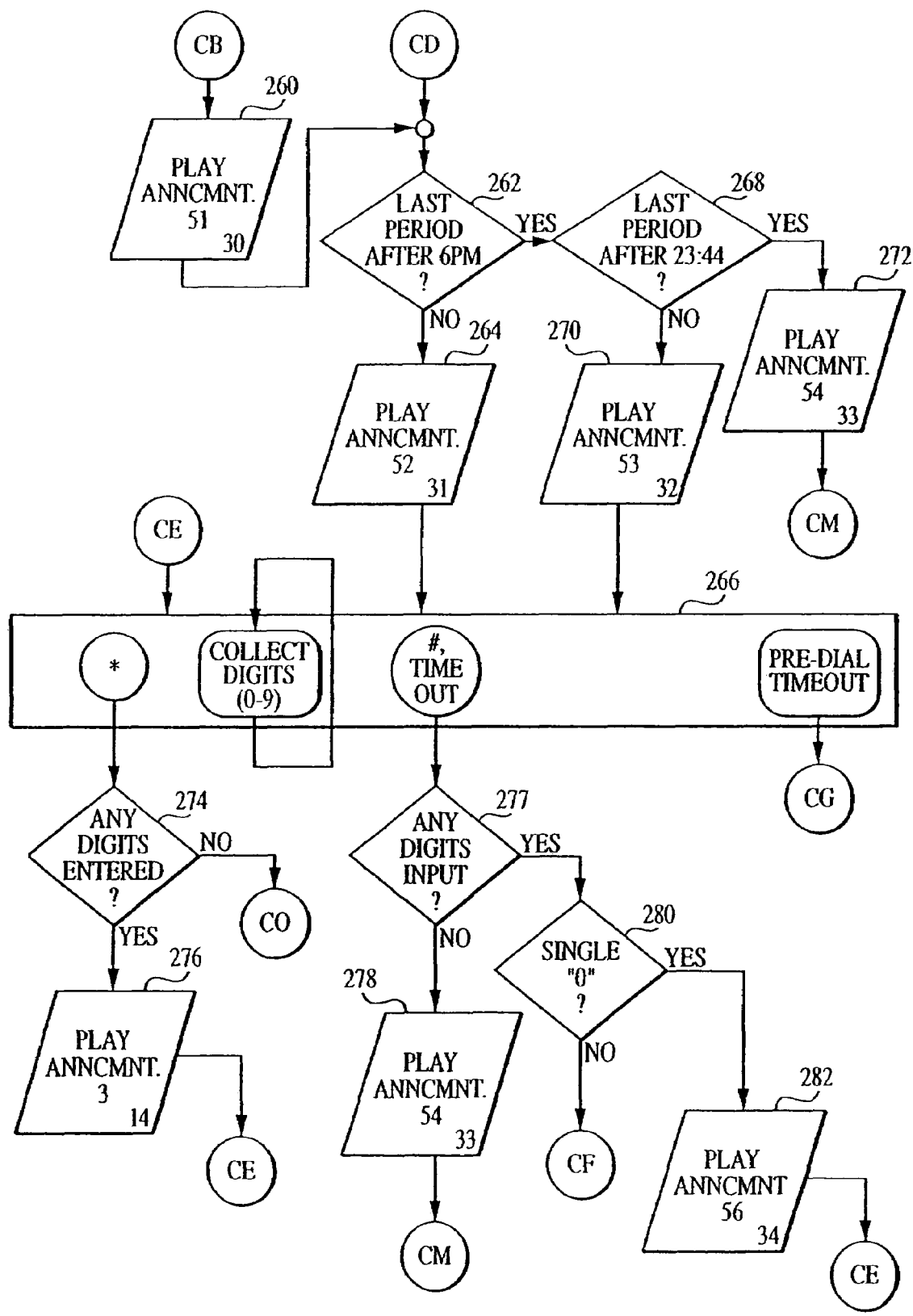
Figure 13:
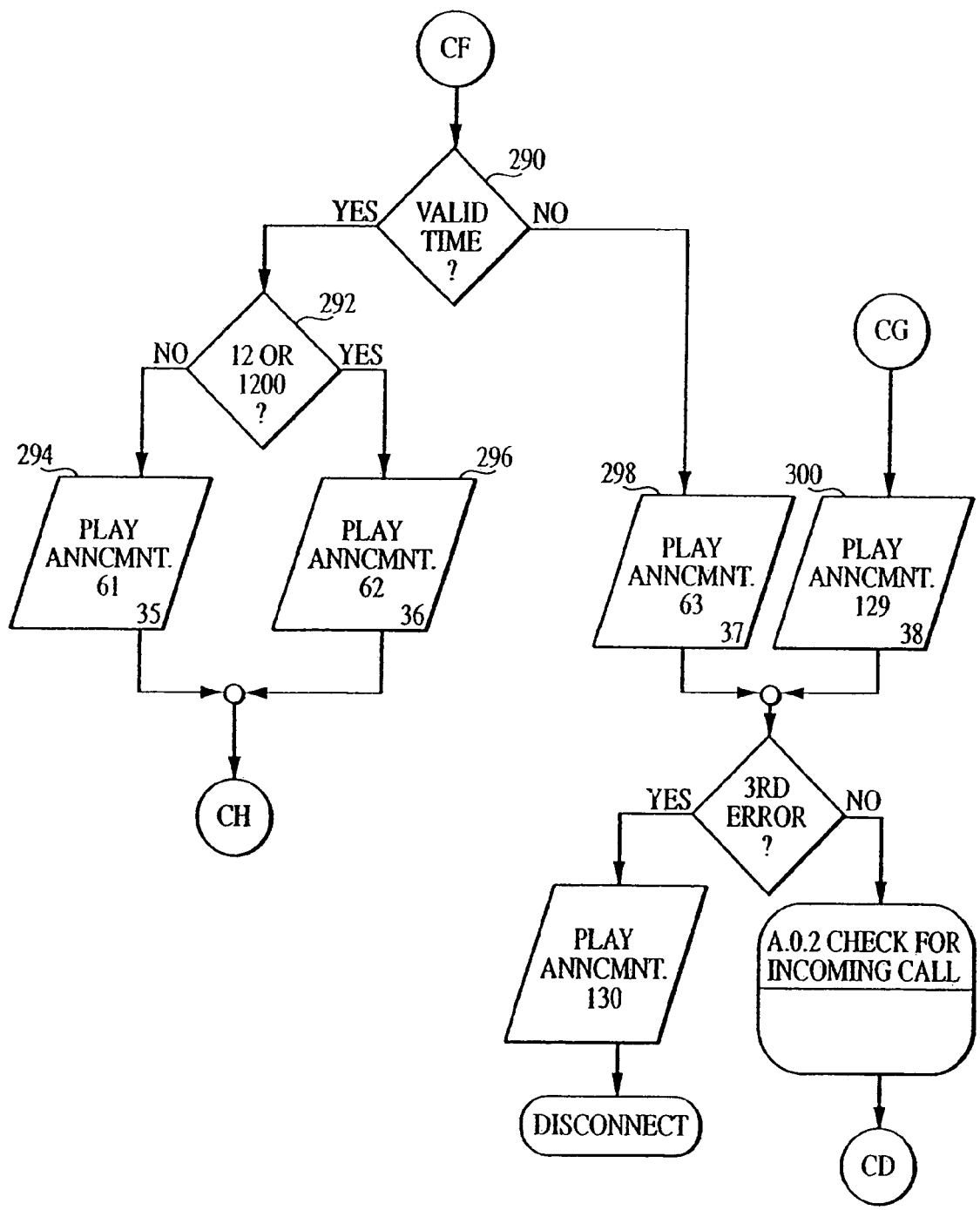
Figure 14:
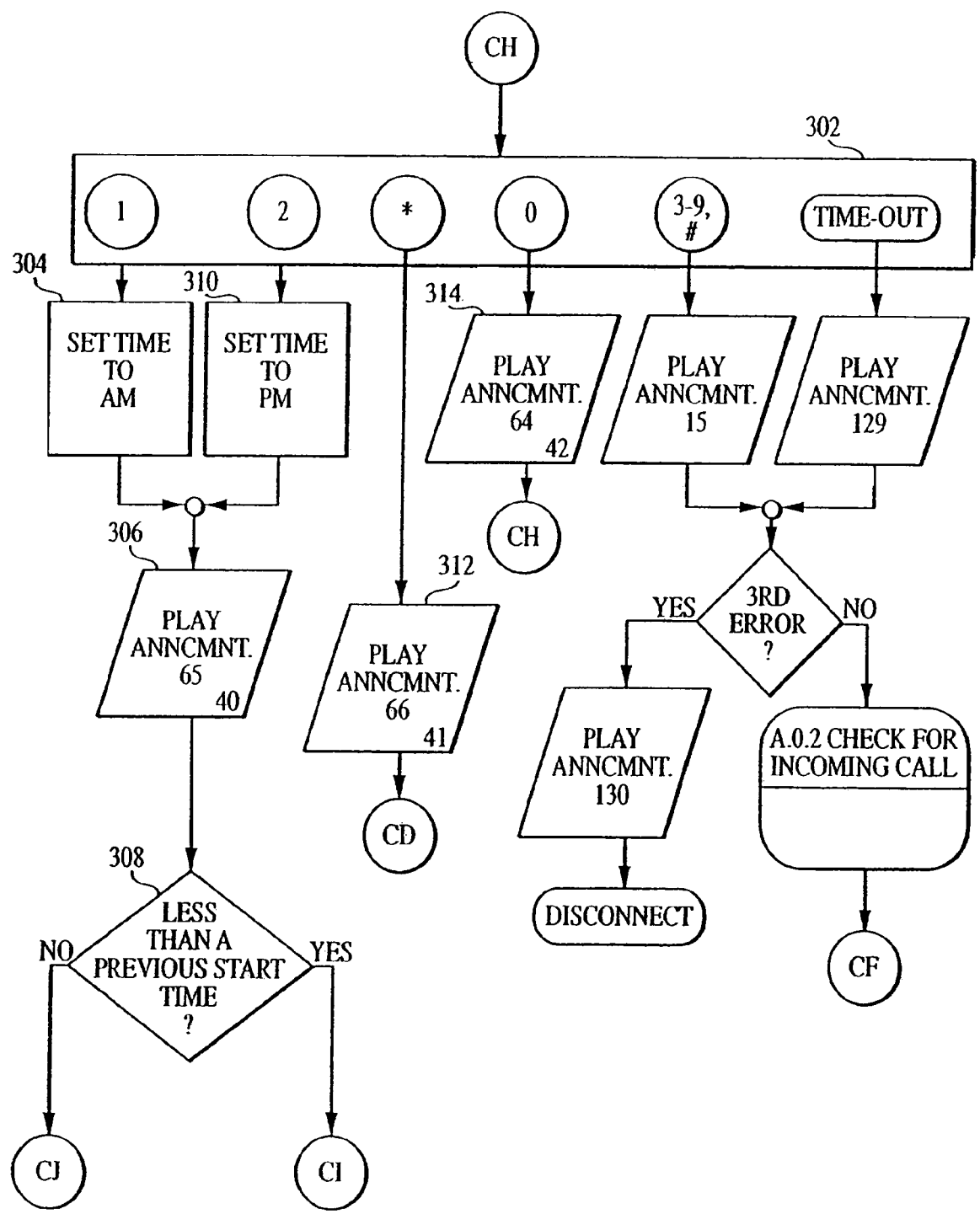
Figure 15:
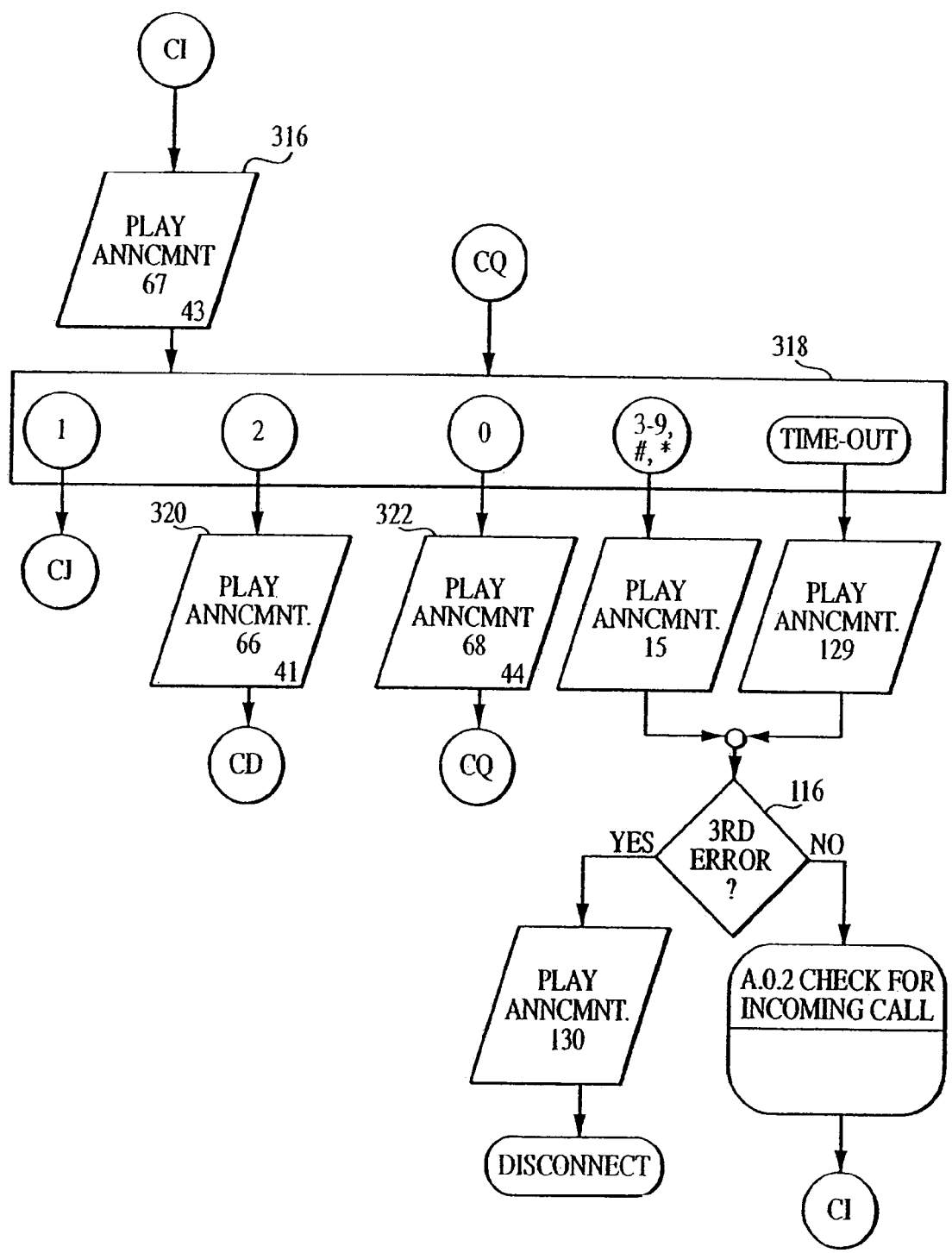

Control is then returned to step 218 to determine what key is pressed. If it is determined at step 228 that the zero key has not been pressed, then at step 232 it is determined whether a valid phone number has been entered. If no valid phone number has been entered, then at step 234 the following announcement is played: "<entered number>, is not a valid ten-digit telephone number." Control is then transferred to step 116. If it is determined at step 232 that a valid phone number had been entered, then at step 250 (FIG. 11) the following announcement is played: "<entered telephone number>. If this is correct, press one. To reenter the number, press two." At step 252, it is determined what keys are pressed by the subscriber. If key 1 is pressed indicating that the entered telephone number is correct, then control is passed to step 262 (FIG. 12). If key 2 is pressed, then at step 254 the following announcement is played: "Entry canceled." Then at step 256 it is determined whether the time period is in the midnight period. If it is, control is returned to step 216 (FIG. 10) where the subscriber is asked to enter the number to which voice calls should be forwarded in the time period starting at midnight. If not, control is transferred to step 330 (FIG. 16) to be described hereinafter. If the zero key is pressed, then at step 258 the following announcement is played:

"Help Information. You can make your selection while this message is playing. Pressing one will accept the number you have entered for this time period. Pressing two will cancel the number and let you reenter it. If you need additional help, please contact your account representative."

Control is then returned to step 252 to determine what keys are pressed. If it is determined at step 226 (FIG. 10) that no digits have been entered or the pound key was pressed indicating that the subscriber wished her or his calls routed to a default destination, then at step 260 (FIG. 12) the following announcement is played: "Calls in the period starting at midnight will be forwarded to <default destination>." At steps 262 and 268, the prompts the subscriber will receive vary depending upon the time period the schedule is working with. For example, at step 262, it is determined whether the last period was after 6 p.m. If not, then at step 264 the following announcement is played: "Enter the start time of the next time period. To have the last period continue until midnight, just press pound. (1 second pause) For help, press zero now." If the last period was after 6 p.m., then at step 268 it is determined if the last period was after 23:44. If it is not, then at step 270 the following announcement is played: "To have the last period continue until midnight, press pound. Otherwise, enter the start time of the next time period. (1 second pause). For help, press zero now." If it is, then at step 272 the following announcement is played: "The last period will extend until midnight." Control is then passed to step 350 (FIG. 17) which will be described hereinafter. At step 266, it is determined what key is pressed by the subscriber indicating that the subscriber wants the entry cleared. If the star key is pressed, then at step 274 it is determined whether any digits have been entered before the star key is pressed. If some digits have been entered, then at step 276 the following announcement is played: "Entry cleared." Control is then returned to step 266. If it is determined at step 274 that no digits have been entered, then control is passed to step 360 (FIG. 18) which will be described hereinafter. If anyone of the numeric keys 09 has been pressed, these numbers are stored in a memory. If the pound key is pressed or the system times out (i.e., an inter-digit time out), then at step 277 it is determined whether any digits have been entered. If none have, then at step 278 the following announcement is played: "The last period will extend until midnight." If digits have been entered, then at step 280 it is determined whether the zero key has been pressed once. If it has, then at step 282 the following announcement is played:

"Help Information. Enter the start time of the next schedule period as a one to four digit number. If you make a mistake while entering the time, pressing star will let you start over. Just pressing pound will indicate you do not want to add another period. Just pressing star, will allow you to cancel updating your schedule."

Control is then returned to step 266 to determine what keys are pressed. If it is determined at step 280 that the zero key has not been pressed once, then at step 290 (FIG. 13) it is determined whether or not a valid time has been entered. If one has, then at step 292 it is determined whether the number 12 or 1200 has been entered. If not, then at step 294 the following announcement is played: "For <entered time> AM, press one. For <entered time> PM, press two." If the number 12 or 1200 was entered at step 292, then at step 296 the following announcement is played: "For twelve midnight, press one. For twelve noon, press two."

If it is determined at step 290 that a valid time has not been entered, then at step 298 the following announcement is played: "<Entered time> is not a valid time." Then the following steps 116 and 118, as already described with reference to FIG. 5, are carried out.

Returning to FIG. 12, if it is determined at step 266 that a pre-dial time out occurred (i.e., the subscriber has not entered any digits, as opposed to an inter-digit time out as described at step 276), then at step 300 (FIG. 13) the following announcement is played: "No key presses have been received." Steps 116-118, as already described, follow.

If it is determined at step 292 (FIG. 13) that number 12 or 1200 is not entered and the various announcements at steps 294 or 296 are played, then at step 302 (FIG. 14) it is determined what key is pressed by the subscriber. If key 1 is pressed, then at step 304 the time period is set to a.m. If key 2 is pressed, then at step 310 the time period is set to p.m. In either case at step 306 the following announcement is played: "Start Time set to <start time>." At step 308 it is determined whether the time period is less than the previous start time. If it is, then at step 316 (FIG. 15) the following announcement is played:

"The time entered is prior to the start of the previous time period. If you mean to overwrite any affected previous time periods, press one. To reenter the time, press two. For help, press zero now."

If it is determined at step 308 that the period was not less than the previous start time, then at step 330 (FIG. 16) the following announcement is played:

"Enter the number to which you would like your voice calls forwarded in the time period starting at <start time>. To forward calls to <default destination>, just press pound."

Returning to step 302 (FIG. 14), if the star key is pressed, then at step 312 the following announcement is played: "Entry canceled." Control is then returned to step 262 (FIG. 12). If at step 302 the zero key is pressed, then at step 314 the following announcement is played:

"Help information. Pressing one will mark the time as midnight or after, but before noon. Pressing two will mark it as noon or after, up until eleven fifty-nine at night. If the time is incorrect, press star and reenter it. If you need additional help, please contact your account representative."

Control is then returned to step 302 to determine which keys the subscriber presses. The other selections at block 302 have already been described with respect to other embodiments. The same will be true in all of the remaining flow charts.

Figure 16:
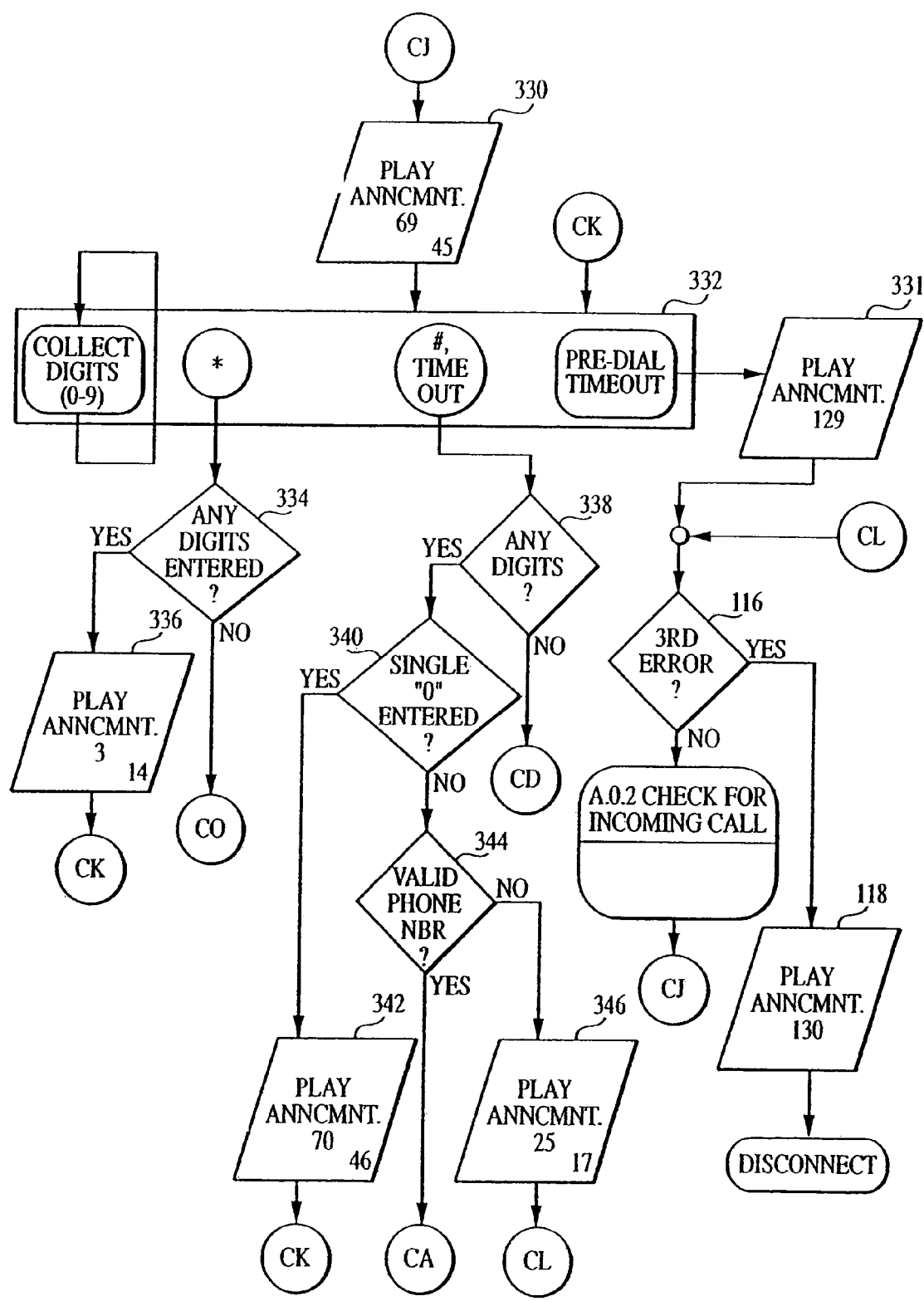
Figure 17:
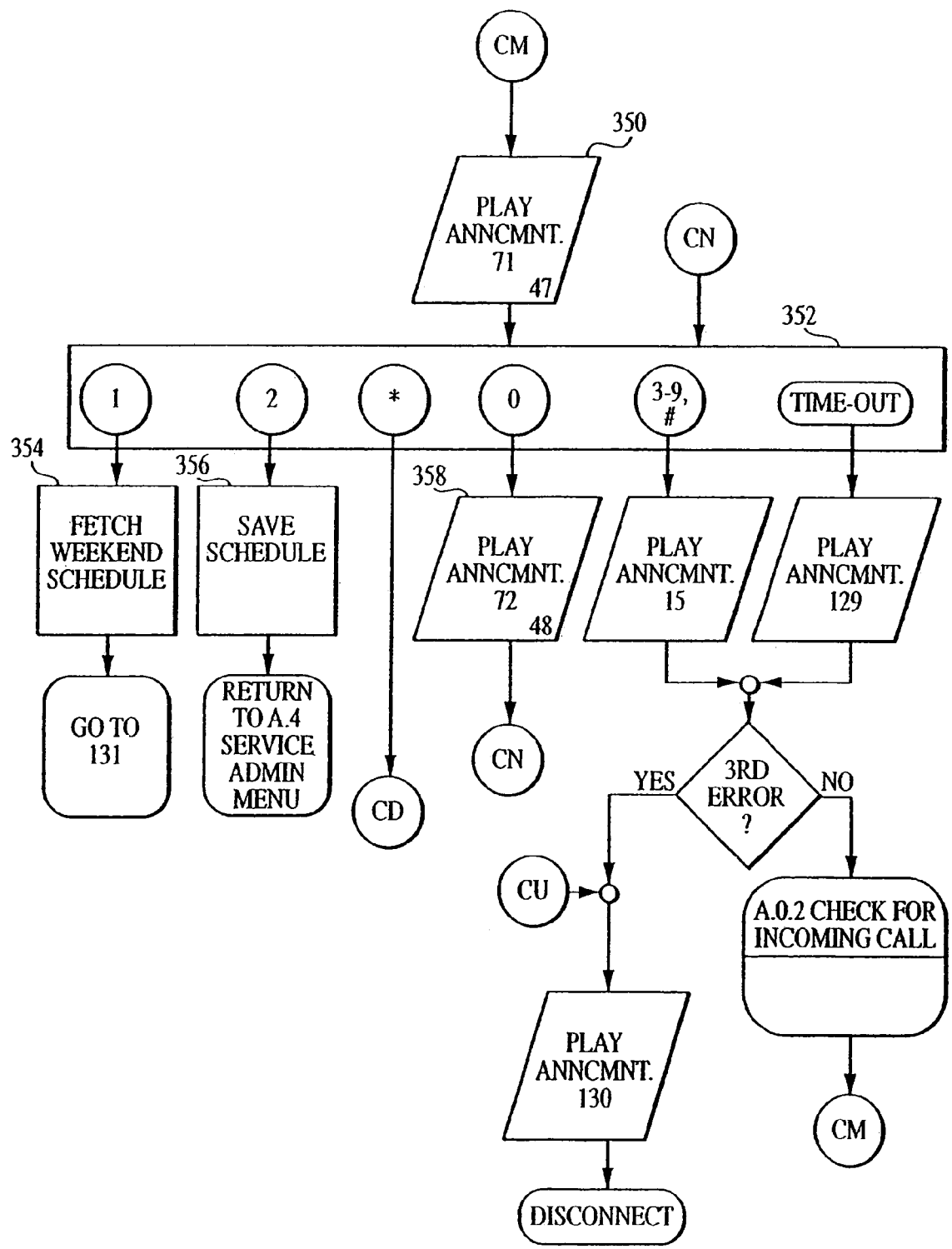
Figure 18:
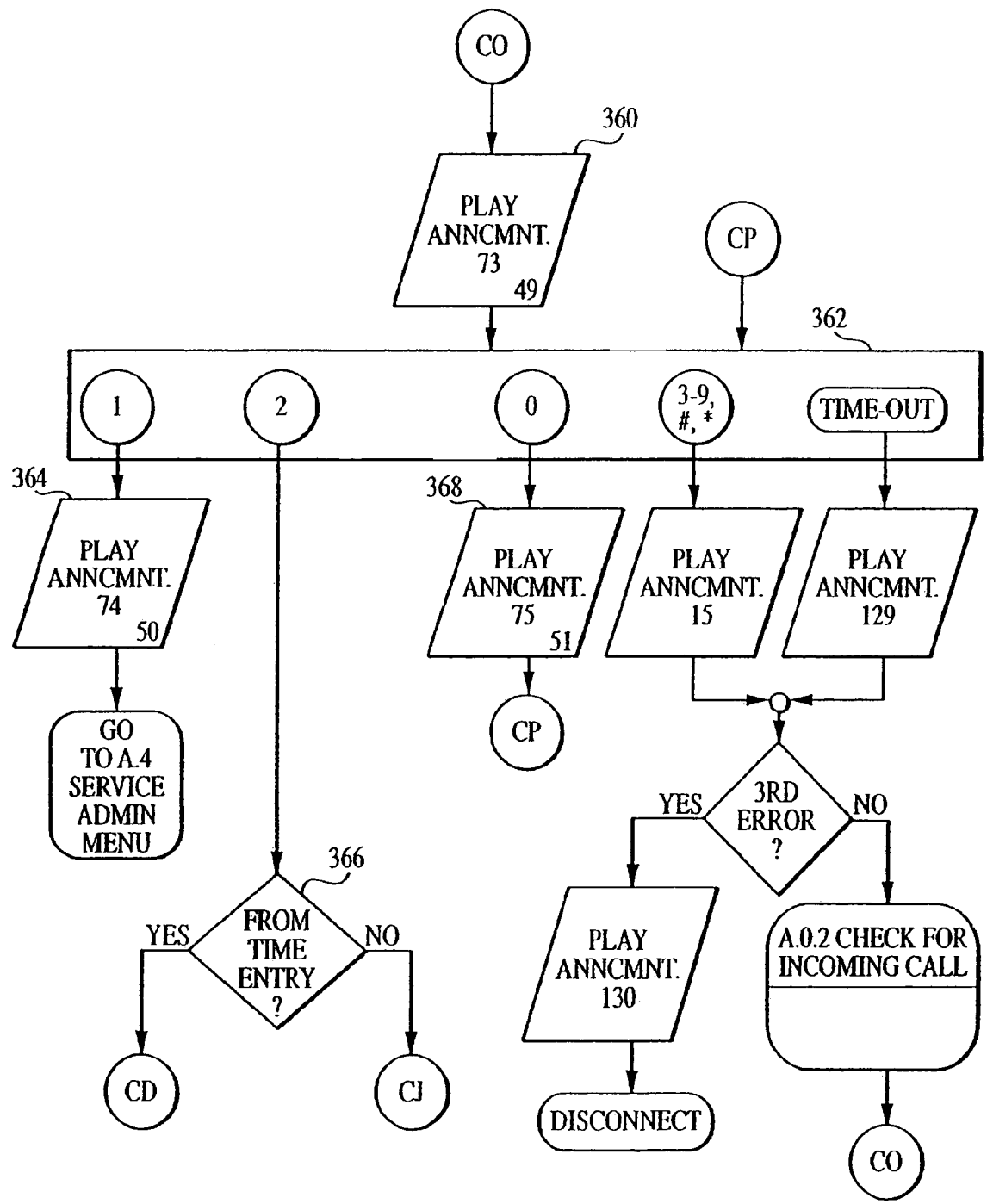

If it is determined at step 308 that the time period was less than the previous start time and after the announcement of step 316 (FIG. 15) is played, control is then passed to step 318 to determine what key is pressed. If key 1 is pressed, then control is transferred to step 330 (FIG. 16). If key 2 is pressed, than at step 320 the following announcement is played: "Entry canceled". Control is then returned to step 262 (FIG. 12). If at step 318 the zero key is pressed, then at step 322 the following announcement is played:

"Help Information. You can make your selection while this message is playing, pressing one will delete any time periods that you previously entered which would occur after the currently entered time. Pressing two will allow you to reenter the currently entered start time and will not delete any prior time periods. If you need additional help, please contact your account representative."

Control is then returned to step 318 to determine what key is pressed.

If at step 318 key 1 is pressed, then at step 330 (FIG. 16) the following announcement is played:

"Enter the number to which you would like your voice calls forwarded in the time period starting at <start time>. To forward calls to <default destination>, just press pound."

At step 332 it is determined what keys are pressed by the subscriber. If keys 0-9 are pressed, those numbers are collected and stored in a memory. If the star key is pressed, then at step 334 it is determined whether any digits have been entered. If some digits have been entered, then at step 336 the following announcement is played: "Entry cleared". Control is then returned back to step 332 to determine what keys are pressed. If it is determined at step 334 that no digits have been entered, control is passed to step 360 (FIG. 18), to be described hereinafter. If at step 332 the pound key is pressed or the inter-digit time out has occurred, then at step 338 it is determined whether any digits have been entered. If no digits (0-9) have been entered, then control is returned to step 262 (FIG. 12). If digits have been entered, then at 340 it is determined whether the zero key has been pressed once. If it has, then at step 342 the following announcement is played:

"Help Information. Enter the ten-digit number to which you would like your voice calls forwarded during the time period starting at <start time>. It is not necessary to enter a one before the area code. Pressing pound will forward your calls to <default destination>. If you make a mistake while entering the number, pressing star will clear what you entered and let you start over. Pressing star without entering any digits will allow you to cancel entering a new schedule. If you need additional help, please contact you account representative."

Control is then returned to step 332 to determine what keys are pressed by the subscriber. If it is determined at step 340 that the zero key has not been pressed, then at step 344 it is determined whether a valid phone number has been entered. If a valid phone number had been entered, control is returned to step 250 (FIG. 11). If a valid phone number was not entered, then at step 346 the following announcement is played:

"<entered number>, is not a valid ten-digit telephone number."

Control is transferred to step 116. If at step 332, a pre-dial time out occurs, then at step 331, the following announcement is played: "No key presses have been received."

Returning to FIG. 12, if it is determined at step 277 that no digits have been entered, then at step 278 the following announcement is played:

"The last period will extend until midnight."

Control is then transferred to step 350 (FIG. 17) where the following announcement is played:

"To save this schedule and then listen to it, press one. To save it and return to the Service Administration menu, press two. To continue entering time periods, press star. For help, press zero now."

At step 352 it is determined what key is pressed. If key 1 is pressed, then at step 354 the schedule is saved and control is transferred to step 131 (FIG. 7). If key 2 is pressed, then at step 356 the schedule is saved and control is returned to the service administration menu. If the star key is pressed, then control is returned to step 262 (FIG. 12). If the zero key is pressed, then at step 358 the following announcement is played:

"Help Information. You can make a selection while this message is playing. Pressing one will save the schedule you have entered and allow you to review it. Pressing two will save it and then return you to the Service Administration menu. Pressing star will return you to entering a new time period. If you need additional help, please contact your account representative.

Control is then returned to step 352 to determine what keys have been pressed.

Returning to FIG. 16, if it is determined at step 334 that no digits have been entered, then at step 360 (FIG. 18) the following announcement is played:

"To quit without saving the schedule you just entered, press one. To return to entering the schedule, press two. (1 second pause) For help, press zero now."

At step 362 it is determined what key has been pressed. If key 1 is pressed, then at step 364 the following announcement is played. "Schedule not saved." Control is then returned to the service administration menu. If key 2 is pressed, then at step 366 it is determined whether the selection is made from the time entry. If it is, then control is returned to step 262 (FIG. 12). If it is not, control is passed to 330 (FIG. 16). If the zero key is pressed, then at step 368 the following announcement is played.

"Help Information. You can make a selection while this message is playing. Pressing one will abandon the schedule you have just been entering without saving it and return you to the Service Administration menu. Pressing two will return you to entering the current schedule. If you need additional help, please contact your account representative."

Control is then returned to step 362 to determine what key has been pressed.

b. Sequential Programming Subroutine

FIGS. 19-33 illustrate the sequential programming portion of the redo schedule subroutine program.

Returning back to FIG. 9, if it is determined at step 208 that one number routing was not selected, then control is transferred to step 370 (FIG. 19) where it is determined whether sequential programming has been selected. If it has not, then control is transferred to step 600 (FIG. 34).*where it is assumed that simultaneous programming is selected.* If it is determined at step 370 that sequential programming has been activated, then at step 372 it is determined rid 20 what is the first telephone number that should be tried. If a first number is to be entered, then at step 374 the following announcement is played.

"Enter the first number we should use to try to contact you in the time period starting at midnight. If you want us to forward all callers to <default destination>, just press pound."

If it is determined at step 372 that a first number has already been selected, then at step 376 it is determined what second number should be entered, then at step 378 the following announcement is played:

"Enter the second number you would like us to try if the call is not accepted at the first number. If you do not want us to try any more numbers, just press pound."

If it is determined that a second number has already been entered, then at step 380 it is determined if a third number should be entered. If so, then at step 382 the following announcement is played:

"Enter the third number you would like us to try. If you do not want us to try any other number, just press pound."

If a third number has been entered, then control is transferred to step 440 (FIG. 25) to set up time periods as will be described in detail hereinafter. Returning to FIG. 19, at step 384 it is determined what keys are pressed. If keys 0-9 are pressed, they are collected and stored in a memory. If the star key is pressed, then at step 386 it is determined whether any digits have been entered. If digits have been entered, then at step 388 the following announcement is played: "Entry cleared." Control is then returned to step 384 to determine what keys have been selected. If it is determined at step 386 that no digits have been entered, then at step 390 the following announcement is played:

"Schedule update canceled." Control is then returned to the service administration menu. If it is determined at step 384 that the pound key is pressed or the system times out, then at step 392 it is determined whether any digits have been entered. If digits have been entered, then at step 394 it is determined whether a single zero has been entered. If it has been, then control is transferred to step 400 (FIG. 20). At step 400 it is determined whether this is the first number. If it is, then at step 402 the following announcement is played:

"Help Information. Beginning at midnight, what ten-digit telephone number should we use to try to contact you? It is not necessary to enter a one before the area code. Pressing just a pound will forward your calls to <default destination>. If you make a mistake while entering the number, pressing star will clear what you entered and let you start over. Pressing star without entering any digits will allow you to cancel entering a new schedule. If you need additional help, please contact your account representative."

If a first number has already been entered, then at 404 the following announcement is played:

"Help Information. What other telephone number should we use to try to contact you? Pressing pound will indicate you do not want us to try any other numbers. If you make a mistake while entering another contact number, pressing star will clear what you entered and let you start over. If you need additional help, please contact your account representative."

Figure 19:
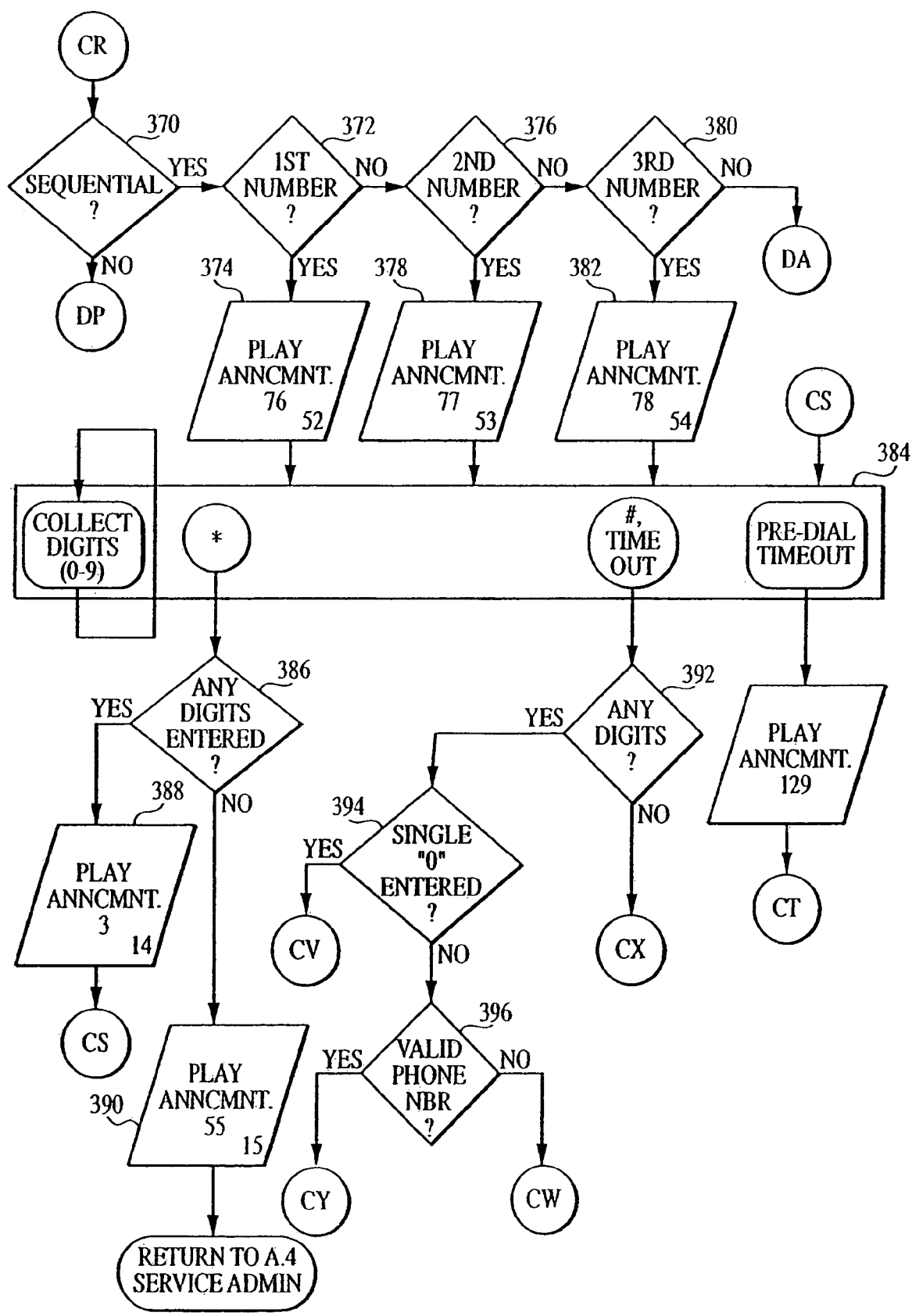
Figure 24:
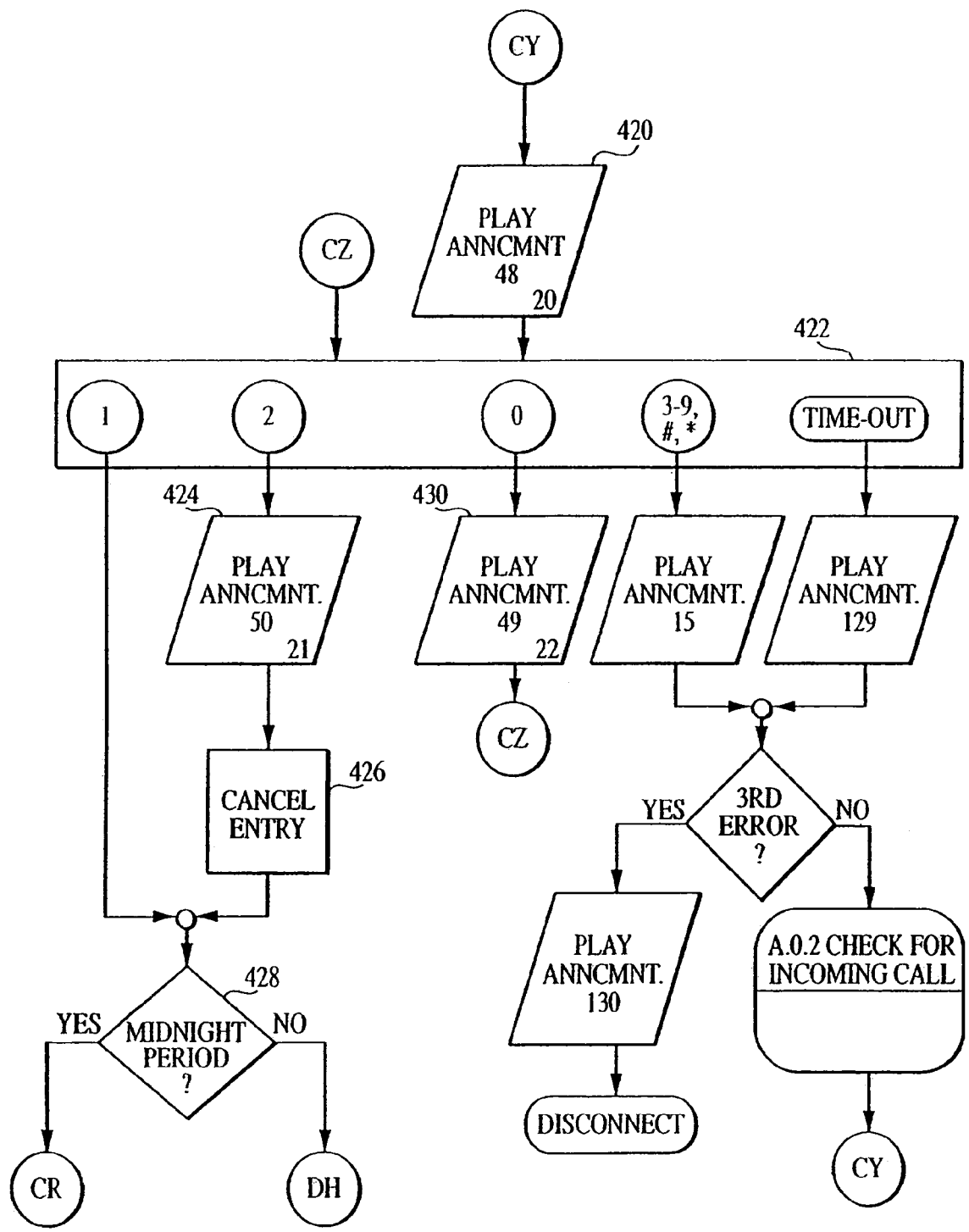

In either case control is then returned to step 384 (FIG. 19). If a single zero has not be entered at step 394, then at step 396 it is determined whether a valid phone number has been entered. If a valid number was not entered, then at step 406 (FIG. 21) the following announcement is played:

"<entering number>, is not a valid ten-digit telephone number."

Control is transferred to step 408 (FIG. 22) where it is determined if an error has been made as previously discussed with reference to FIG. 5. If it is determined at step 392 (FIG. 19) that no digits have been entered, then at step 410 (FIG. 23) it is determined whether this is the first number. If it is, then at step 412 the following announcement is played:

"Calls in the period starting at midnight will be forwarded to <default destination>."

Returning to FIG. 19, if a valid number was entered at step 396, then at step 420 (FIG. 24) the following announcement is played:

"<entered telephone number>. If this is correct, press one. To reenter the number, press two."

Then at step 422 it is determined what keys are pressed. If key 1 is pressed, then at step 428 it is determined whether the midnight period has been selected. If key 2 is pressed, then at step 424 the following announcement is played: "Entry canceled." Then at step 426 the entry is canceled and at step 428 it is determined whether the midnight period has been selected. If at step 422 it is determined that the zero key is selected, then at step 430 the following announcement is played:

"Help Information. You can make your selection while this message is playing. Pressing one will accept the number you have entered for this time period. Pressing two will cancel the number and let you reenter it. If you need additional help, please contact your account representative."

Figure 25:
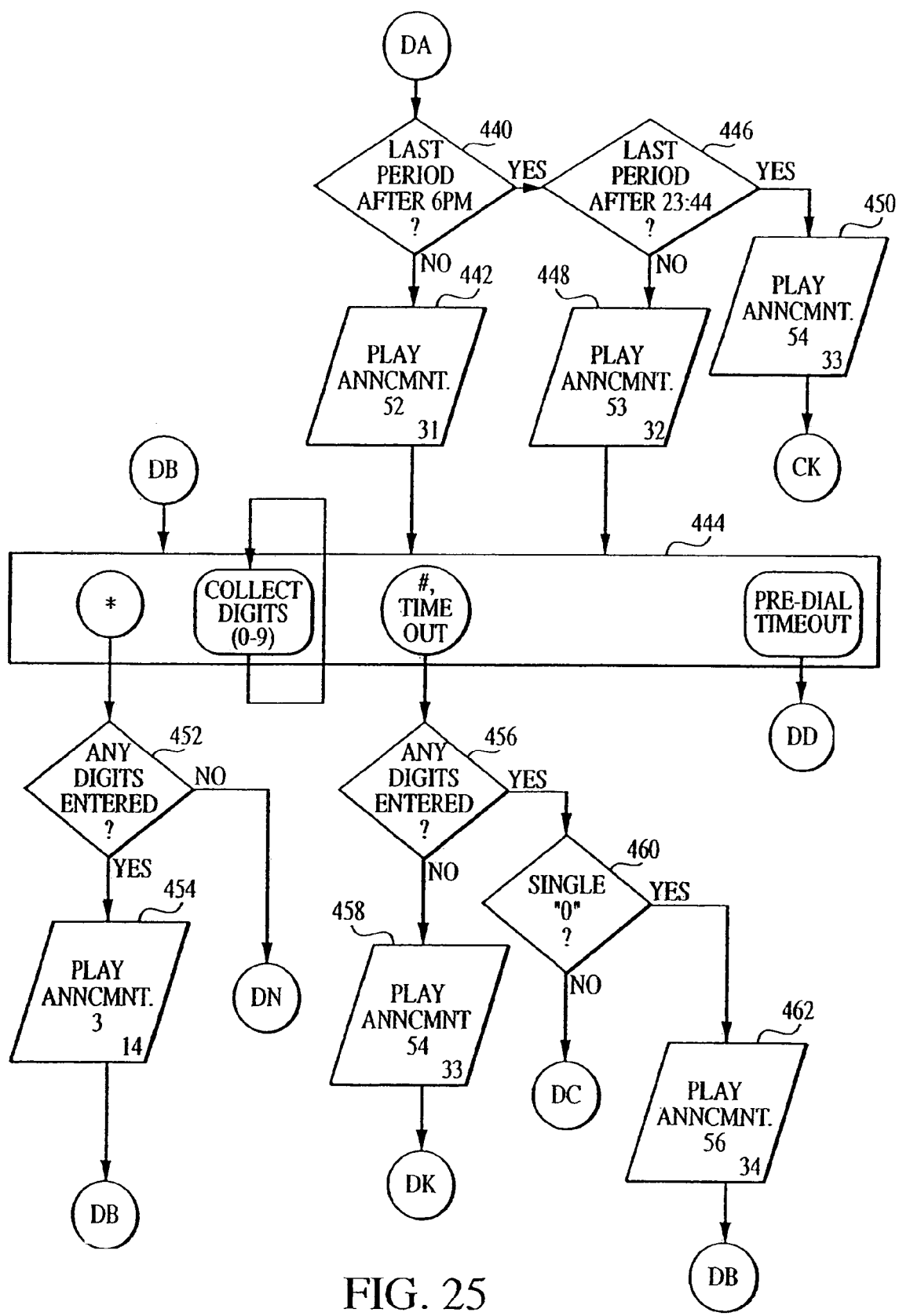
Figure 26:
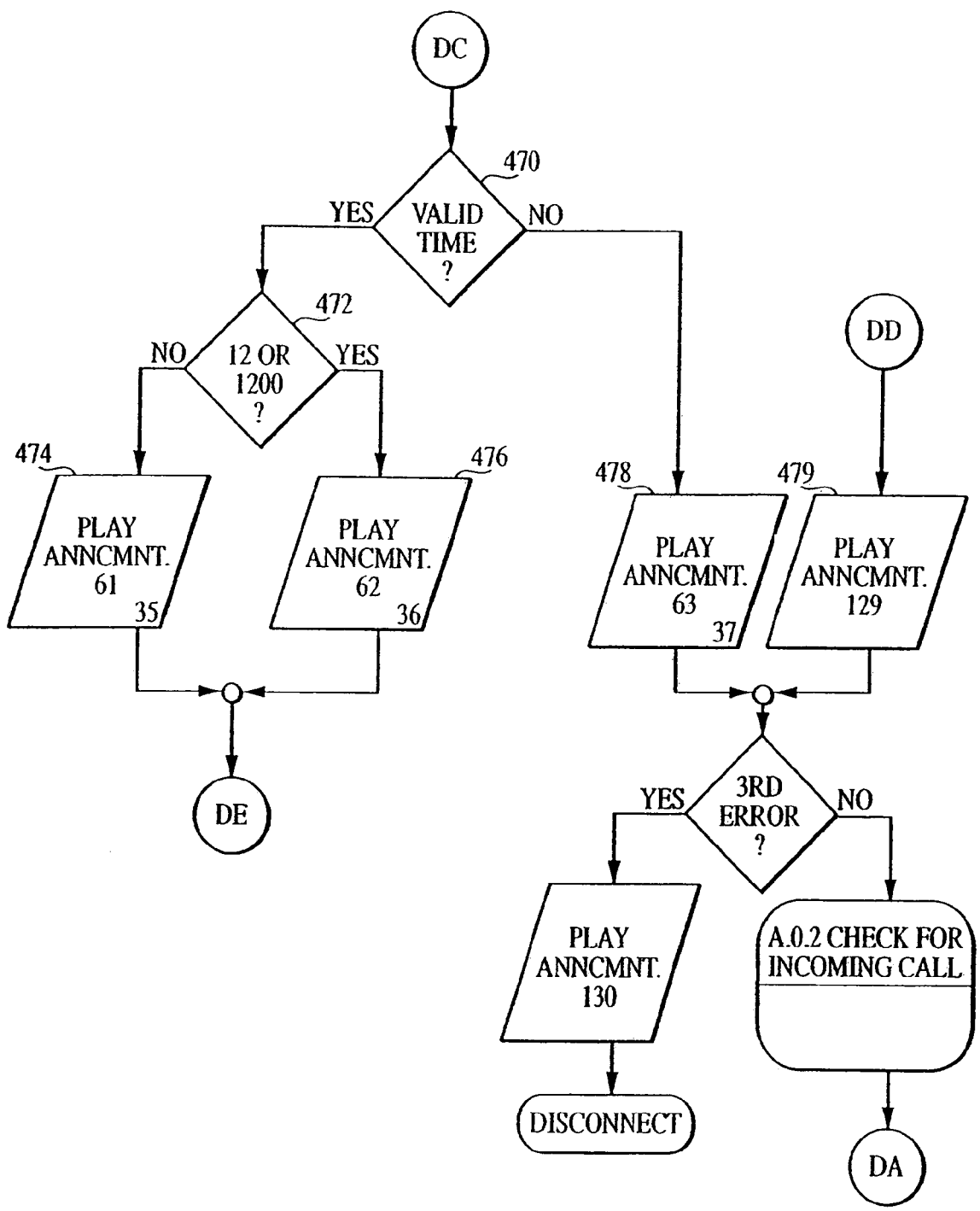
Figure 27:
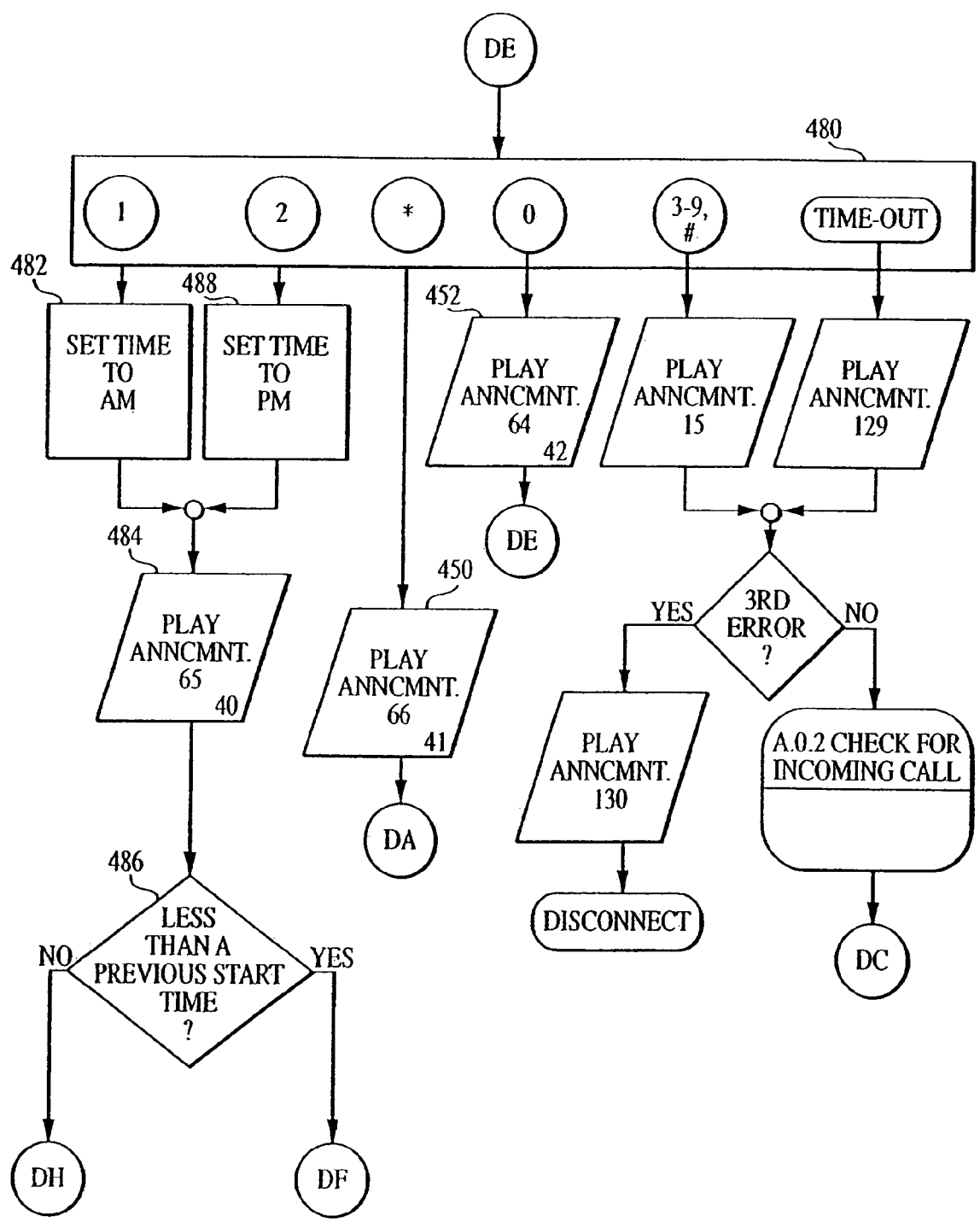
Figures 31, 32:
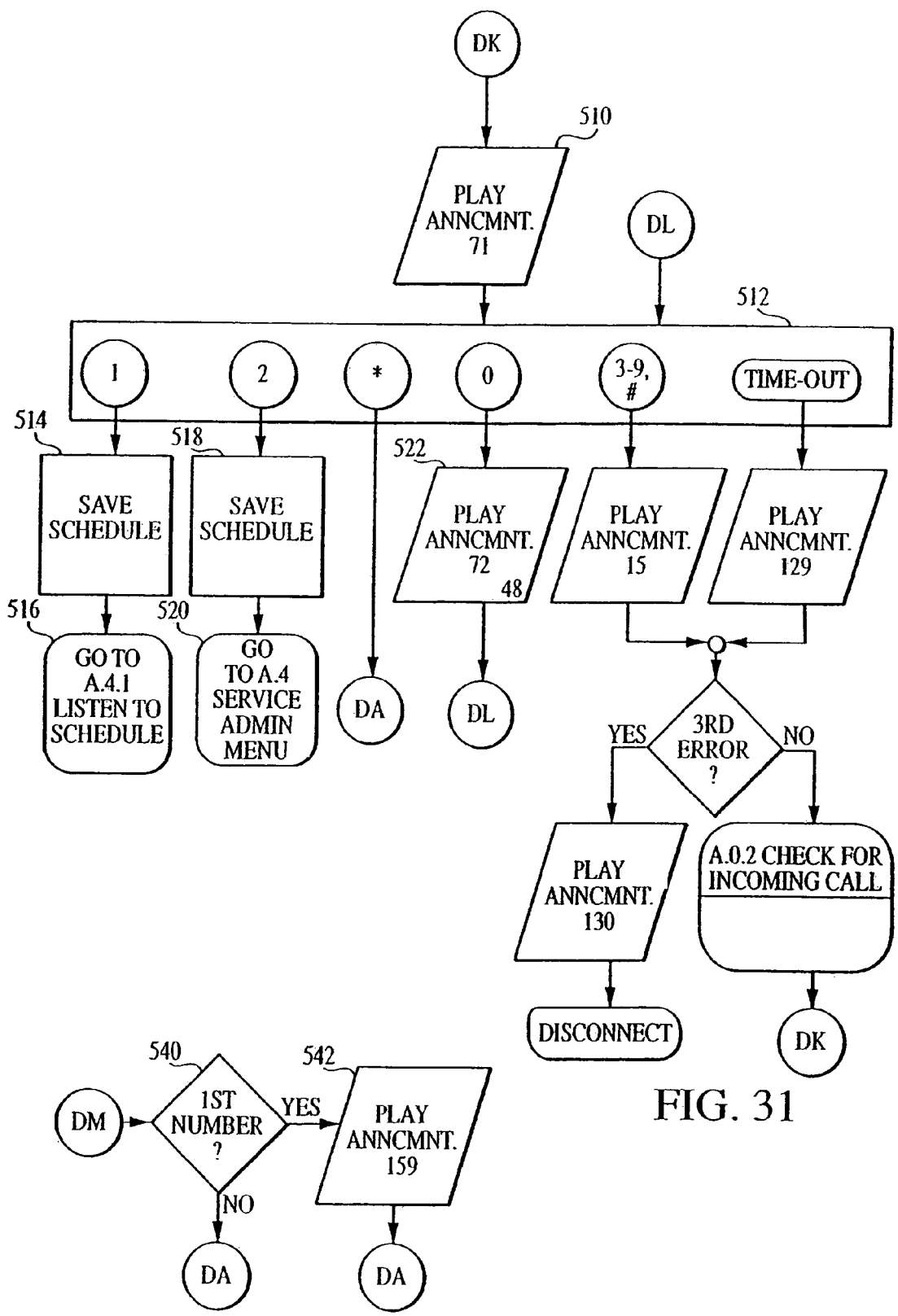
Figure 33:
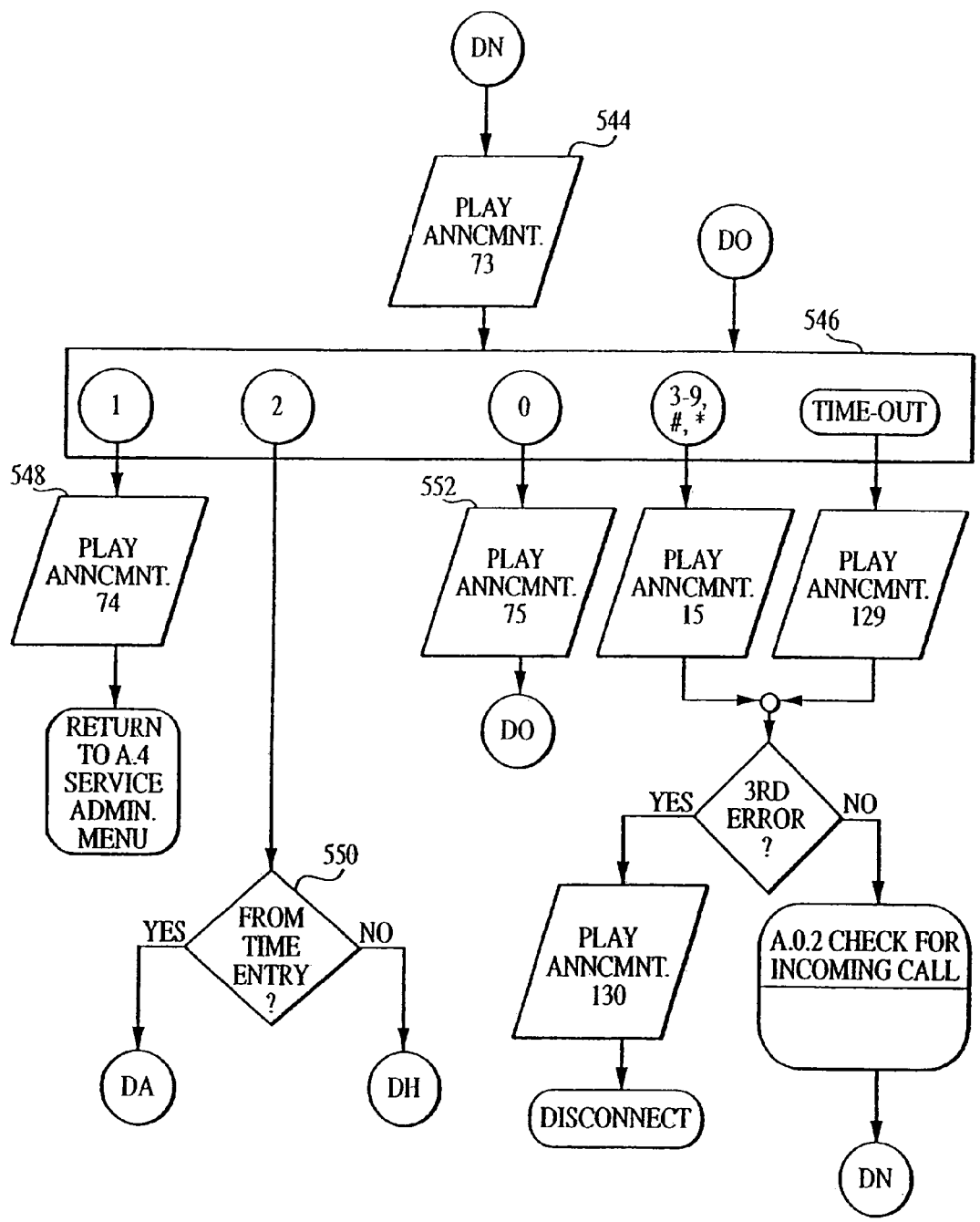

As previously described with reference to FIG. 19, if at step 380 it is determined that a third number has already been entered, then control is passed to step 440 (FIG. 25). At step 440, it is determined whether the last time period started after 6 p.m. If not, then at step 442 the following announcement is played: "Enter the start time of the next time period. To have the last period continue until midnight, just press pound. (1 second pause) For help, press zero now." If the last time period started after 6 p.m., then at step 446 it is determined if the last time period started after 23:44. If not, then at step 448 the following announcement is played: "To have the last period continue until midnight, press pound. Otherwise, enter the start time of the next time period. (1 second pause) For help, press zero now." If the last time period started after 23:44, then at step 450 the following announcement is played: "The last period will extend until midnight." Control is then passed to step 510 (FIG. 31). At step 444, it is determined what key is pressed by the subscriber. If the star key is pressed, then at step 452 it is determined whether any digits have been entered. If not, control is transferred to step 544 (FIG. 33). Otherwise the following announcement is played at step 454 "Entry cleared" and control is returned to step 444.

If anyone of the numeric keys 0-9 is pressed, these numbers are stored in a memory. If the pound key is pressed or the system times out, then at step 456 it is determined whether any digits have been entered. If none have, then at step 458 the following announcement is played: "The last period will extend until midnight." If digits have been entered, then at step 460 it is determined whether the zero key has been pressed once. If it has, then at step 462 the following announcement is played:

"Help Information. Enter the start time of the next schedule period as a one to four digit number. If you make a mistake while entering the time, pressing star will let you start over. Just pressing pound will indicate you do not want to add another period. Just pressing star, will allow you to cancel updating your schedule."

Control is then returned to step 444 to determine what keys are pressed. If it is determined at step 460 that the zero key had not been pressed, then at step 470 (FIG. 26) it is determined whether or not a valid time has been entered. If one has, then at step 472 it is determined whether the number 12 or 1200 has been entered. If it is not, then at step 474 the following announcement is played: "For <entered time> AM, press one. For <entered time> PM, press two." If the number 12 or 1200 was entered at step 472, then at step 476 the following announcement is played: "For twelve midnight, press one. For twelve noon, press two." If it is determined at step 470 that a valid time had not been entered, then at step 478 the following announcement is played: "<Entered time> is not a valid time." Then at the following steps 116 and 118 as already described with reference to FIG. 5 are carried out.

Returning to FIG. 25, if it is determined at step 444 that a pre-dial time out occurred, then at step 479 (FIG. 26) the following announcement is played: "No key presses have been received".

If it is determined at step 472 (FIG. 26) that either number 12 or 1200 was or was not entered and the various announcements at steps 474 or 476 are played, then at step 480 (FIG. 27) it is determined what key is pressed by the subscriber. If key 1 is pressed, then at step 482 the time period is set to a.m. If key 2 is pressed, then at step 488 the time period is set to p.m. In either case at step 484 the following announcement is played: "Start Time set to <start time>." At step 486 it is determined whether the time period is less than the previous start time. If it is, then at step 460 (FIG. 28) the following announcement is played:

"The time entered is prior to the start of the previous time period. If you mean to overwrite any affected previous time periods, press one. To reenter the time, press two. For help, press zero now."

Figure 30:
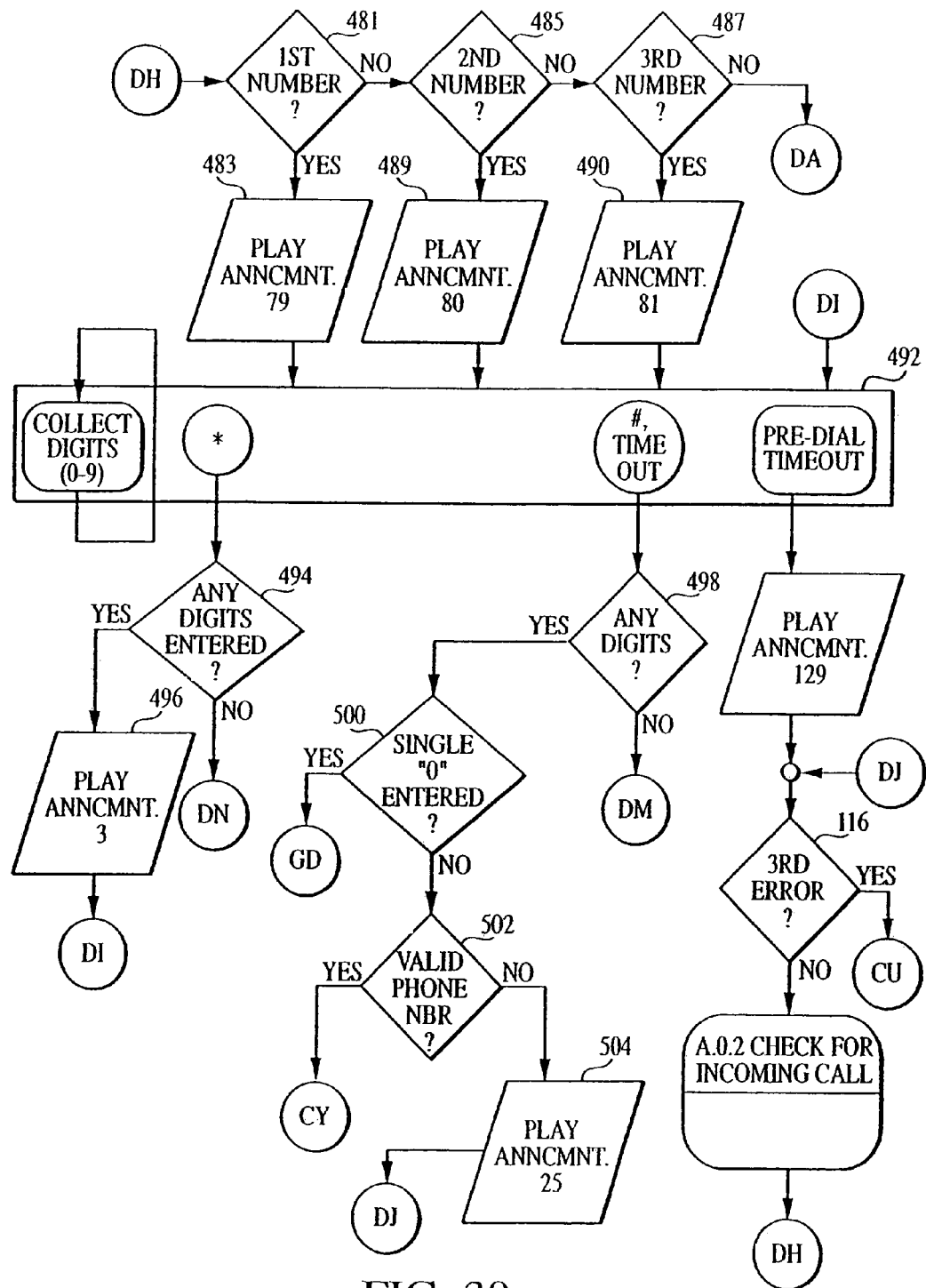

If it is determined at step 486 that the period was not less than the previous start time, then control is passed to step 481 (FIG. 30). At step 481 it is determined if this is the first telephone number that should be tried. If it is, then at step 483 the following announcement is played.

"Enter the first number we should use to try to contact you in the time period starting at <starting time>. If you want us to forward all callers to <default destination>, just press pound."

If it is determined at step 481 that a first number has already been selected, then at step 485 it is determined what second number should be entered, then at step 489 the following announcement is played:

"Enter the second number you would like us to try if the call is not accepted at the first number. If you do not want us to try any more numbers, just press pound."

If it is determined that a second number has already been entered, then at step 487 it is determined if a third number should be entered, then at step 490 the following announcement is played:

"Enter the third number you would like us to try. If you do not want us to try any other number, just press pound."

If a third number has been entered, then control is transferred to step 440 (FIG. 25) to set up time periods as previously described.

At step 492 it is determined what keys are pressed. If keys 0-9 are pressed, they are collected and stored in a memory. If the star key is pressed, then at step 494 it is determined whether any digits have been entered. If digits have been entered, then at step 496 the following announcement is played: "Entry cleared." Control is then returned to step 492 to determine what keys are selected. If it is determined at step 494 that no digits have been entered, then control is passed to step 544 (FIG. 33) and the following announcement is played:

"To quit without saving the schedule you just entered, press one. To return to entering the schedule, press two. (1 second pause) For help, press zero now."

Figures 28, 29:
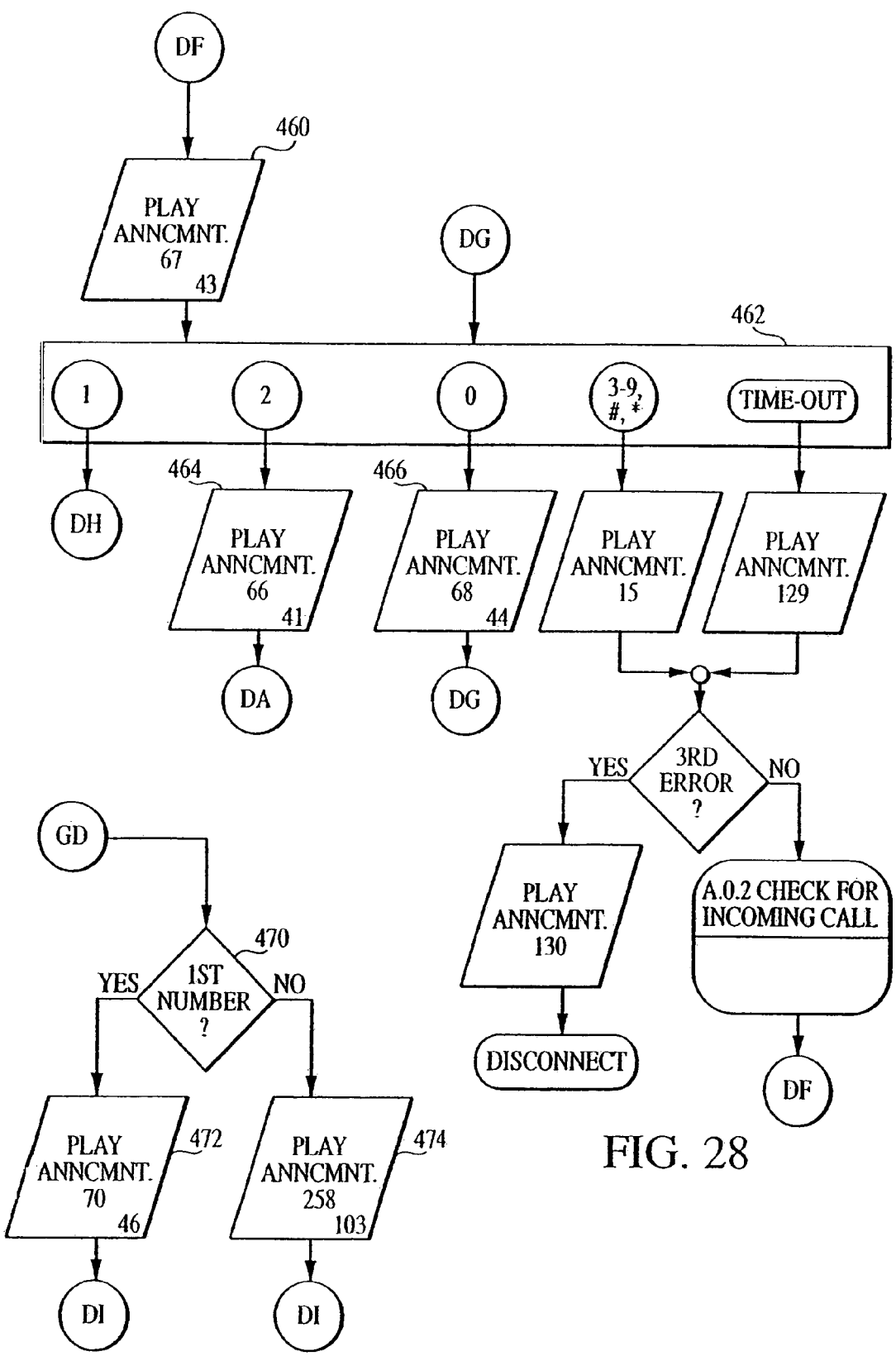

If it is determined at step 492 that the pound key is pressed or the system times out, then at step 498 it is determined whether any digits have been entered. If digits have been entered, then at step 500 it is determined whether a single zero has been entered. If it has, then control is transferred to step 470 (FIG. 29). At step 470 it is determined if this is the first number to be entered. If it is, then at step 472 the following announcement is played:

"Help Information. Beginning at <starting time>, what ten-digit telephone number should we use to try to contact you? It is not necessary to enter a one before the area code. Pressing just a pound will forward your calls to <default destination>. If you make a mistake while entering the number, pressing star will clear what you entered and let you start over. Pressing star without entering any digits will allow you to cancel entering a new schedule. If you need additional help, please contact your account representative."

If a first number was already entered, then at 474 the following announcement is played:

"Help Information. What other telephone number should we use to try to contact you? Pressing pound will indicate you do not want us to try any other numbers. If you make a mistake while entering another contact number, pressing star will clear what you entered and let you start over. If you need additional help, please contact your account representative."

In either case control is then returned to step 492 (FIG. 30). If a single zero has not been entered at step 500, then at step 502 it is determined whether a valid phone number has been entered. If a valid number is not entered, then at step 504 the following announcement is played:

"<entered number>, is not a valid ten-digit telephone number."

Control is transferred to step 116 where it is determined if an error has been made as previously discussed with reference to FIG. 5. If it is determined at step 498 that no digits have been entered, then at step 540 (FIG. 32) it is determined whether this is the first number to be entered. If it is, then at step 542 the following announcement is played:

"Starting at <starting time> calls will be forwarded to <default destination>."

Control is then returned to step 440 (FIG. 25). If it is determined at step 540 that a first number has been entered, then control is simply transferred to step 440 (FIG. 25). Returning to FIG. 30, if a valid number was entered at step 502, then at step 420 (FIG. 24) the following announcement is played:

"<entered telephone number>. If this is correct, press one. To reenter the number, press two."

And the remaining steps as previously described are carried out.

Returning to FIG. 33, at step 544, the following message is played:

"To quit without saving the schedule you just entered, press one. To return to entering the schedule, press two (1 second pause). For help, press zero now."

At step 546 it is determined what key is pressed. If key 1 is pressed, then at step 548 the following announcement is played "schedule not saved," and control is returned to the service menu. If key 2 is pressed, then at step 550 it is determined whether the return to entering the schedule at the time entry stage or not. If not, control is passed to step 481 (FIG. 30). If yes, control is passed to step 440 (FIG. 25). If the zero key is pressed at step 546, then at step 552 the following announcement is played:

"Help Information. You can make a selection while this message is playing. Pressing one will abandon the schedule you have just been entering without saving it and return you to the Service Administration menu. Pressing two will return you to entering the current schedule. If you need additional help, please contact your Single Number Service account representative."

Control is returned to step 546.

Returning to FIG. 25, if at step 446 it is determined that the last period is after 23:44, or if at step 456 it is determined that no digits were entered and the message at steps 438 or 450, respectively, are played, control is passed to step 510 (FIG. 31) where the following announcement is played:

"To save this schedule and then listen to it, press 1. To save it and return to the Service Administration menu, press two. To continue entering time periods, press star. For help, press zero now."

Control is passed to step 512 where it is determined what digit is pressed. If 1 is pressed, the schedule is saved and control is transferred to step 516. If 2 is pressed, the schedule is saved and control is passed to step 520. If a star is pressed, control is returned to step 440 (FIG. 25). If 0 is pressed, step 522 plays the following announcement and then returns control to step 512.

"Help Information. You can make a selection while this message is playing. Pressing one will save the schedule you have entered and allow you to review it. Pressing two will save it and then return you to the Service Administration menu. Pressing star will return you to entering a new time period. If you need additional help, please contact your account representative."

The digits 3-9 or pound are errors treated as previously discussed in FIG. 5.

c. Simultaneous Programming Subroutine

FIGS. 34-48 illustrate the simultaneous programming portion of the redo schedule subroutine program.

Returning to FIG. 19, if it is determined at step 370 that sequential programming was not selected, then control is transferred to step 600 (FIG. 34) where it is determined whether this is the first telephone number to be entered. If a first number is to be entered, then at step 602 the following announcement is played.

"Enter the first number we should use to try to contact you in the time period starting at midnight. If you want us to forward all callers to <default destination>, just press pound."

If it is determined at step 600 that a first number has already been entered, then at step 604 it is determined what second number should be entered, then at step 606 the following announcement is played:

"Enter another number you would like us to try. If you do not want us to try any more numbers, just press pound."

If it is determined that a second number has already been entered, then at step 608 it is determined if a third number should be entered, then at step 610 the following announcement is played:

"Enter the last number you would like us to try. If you do not want us to try any other number, just press pound."

If a third number has been entered, then control is transferred to step 656 (FIG. 40) to set up time periods as will be described in detail hereinafter. Returning to FIG. 34, at step 612 it is determined what keys are pressed. If keys 0-9 are pressed, they are collected and stored in a memory. If the star key is pressed, then at step 614 it is determined whether any digits have been entered. If digits have been entered, then at step 616 the following announcement is played: "Entry cleared." Control is then returned to step 612 to determine what keys have been selected. If it is determined at step 614 that no digits have been entered, then at step 618 the following announcement is played: "Schedule update canceled."

Figure 35:
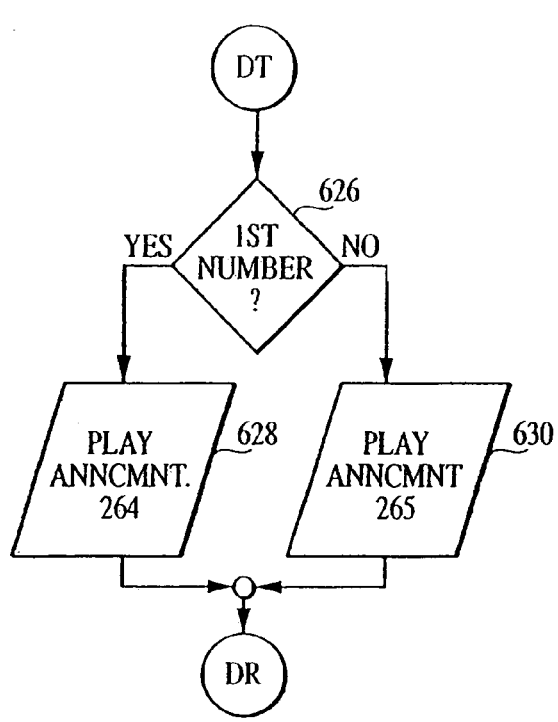
Figure 36:
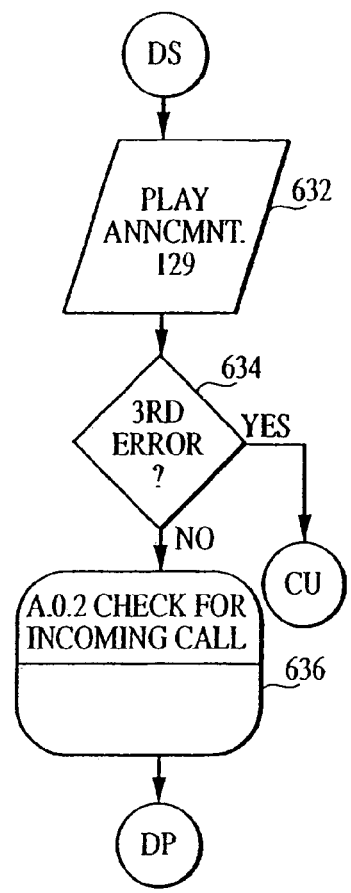
Figure 37:
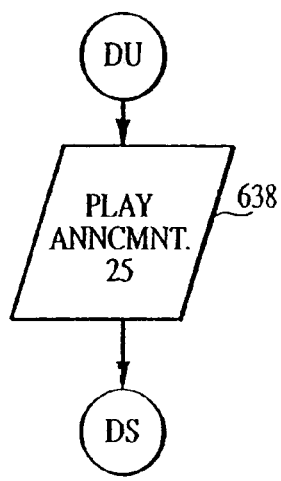
Figure 38:
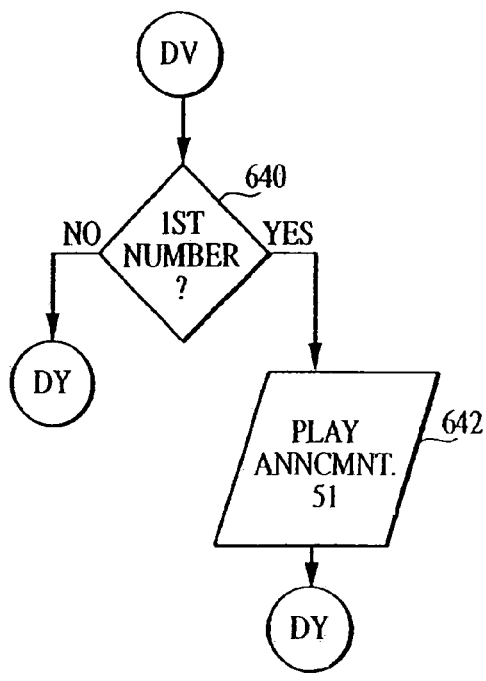
Figure 39:
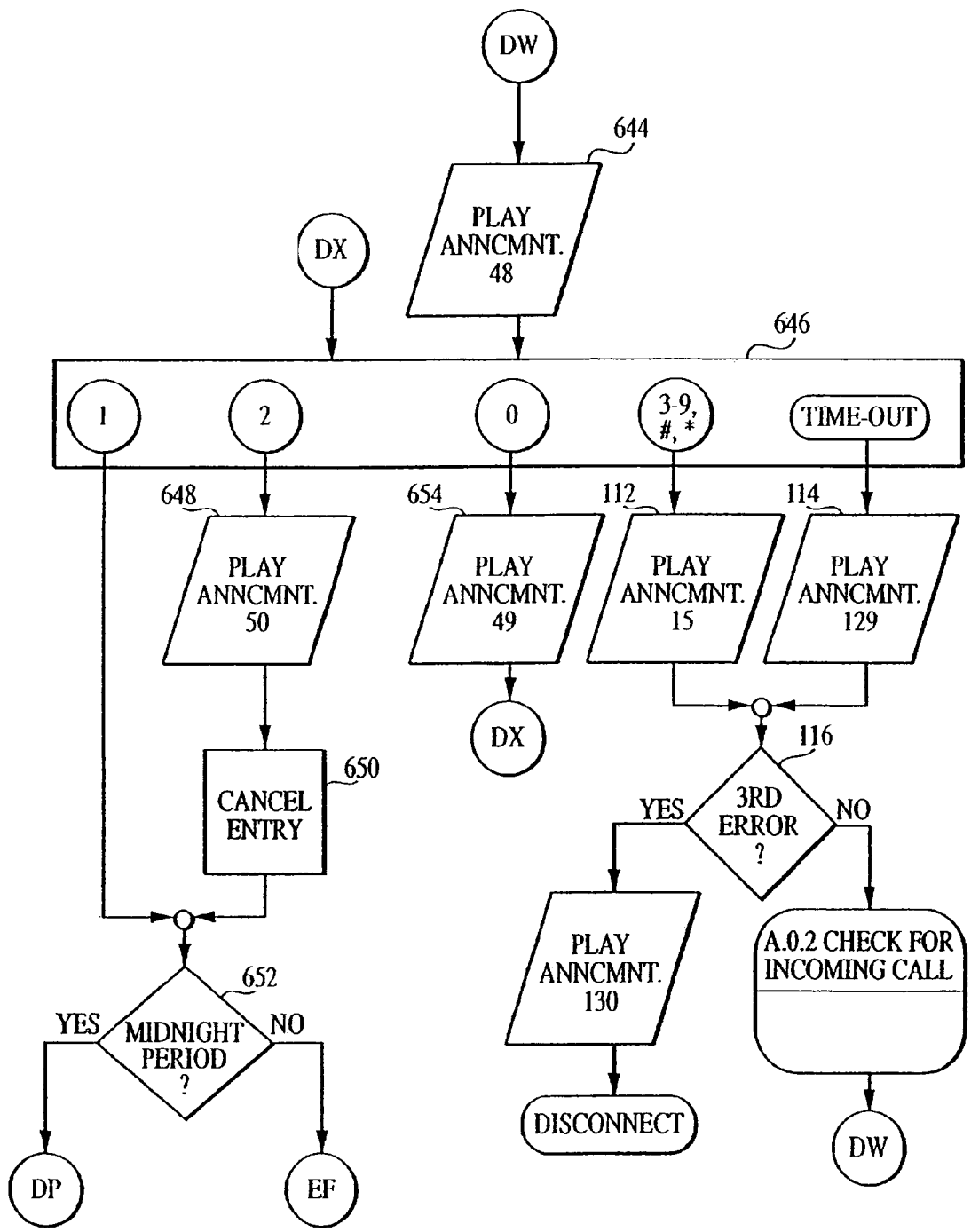

Control is then returned to the service administration menu. If it is determined at step 612 that the pound key is pressed or the system times out, then at step 620 it is determined whether any digits have been entered. If digits have been entered, then at step 622 it is determined whether a single zero has been entered. If it has, then control is transferred to step 626 (FIG. 35). At step 626 it is determined if this is the first number being entered. If it has, then at step 628 the following announcement is played:

"Help Information. Beginning at midnight, we will try to contact you at up to three telephone numbers. Please enter one of the ten-digit numbers we should use. It is not necessary to enter a one before the area code. Pressing just a pound will forward your calls to <default destination>. If you make a mistake while entering the number, pressing star will clear what you entered and let you start over. Pressing star without entering any digits will allow you to cancel entering a new schedule. If you need additional help, please contact your account representative."

If a first number has already been entered, then at 630 the following announcement is played:

"Help Information. What other telephone number should we use to try to contact you after midnight? Pressing pound will indicate you do not want us to try any other numbers. If you make a mistake while entering another contact number, pressing star will clear what you entered and let you start over. If you need additional help, please contact your account representative."

Figure 34:
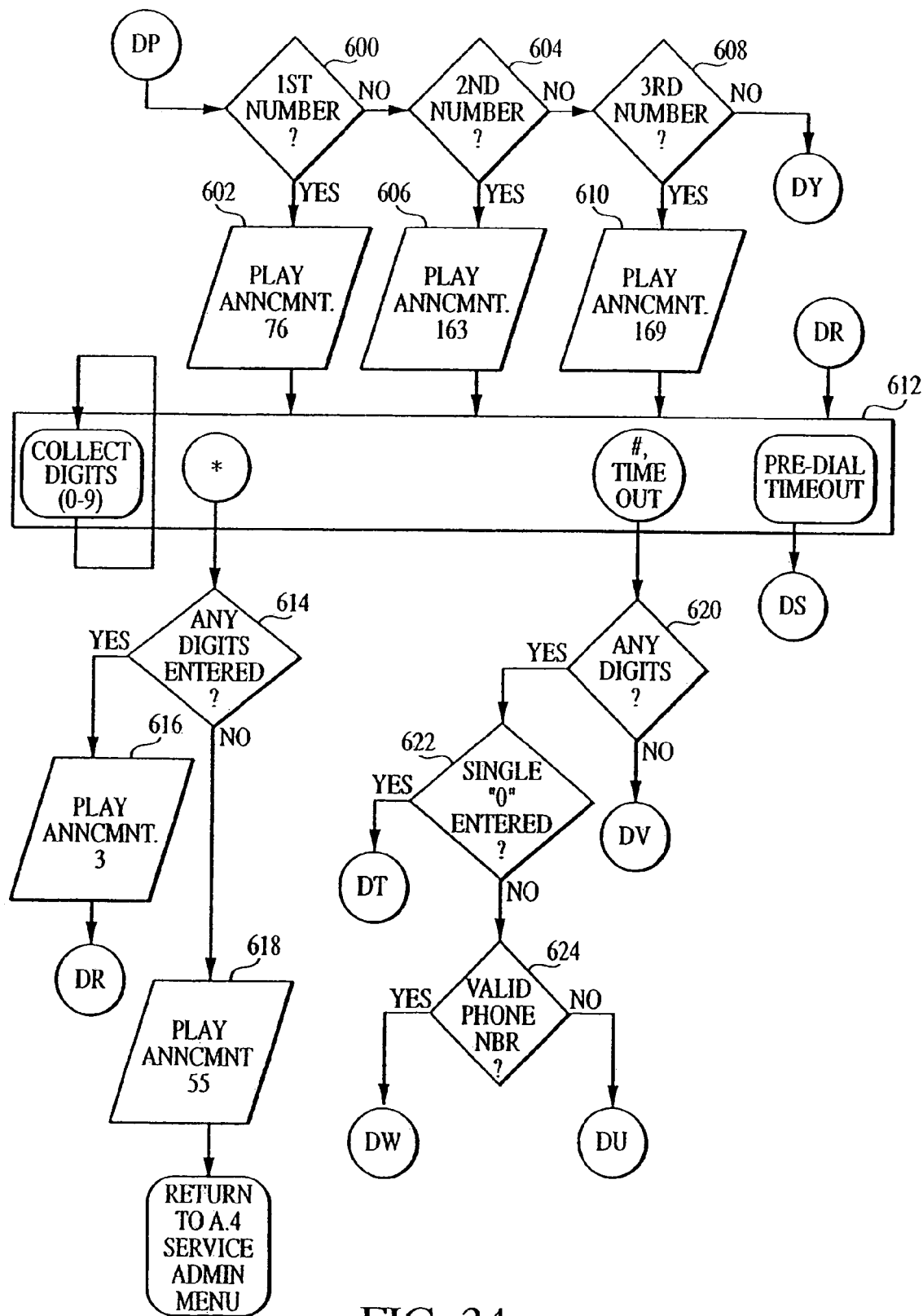
FIGS. 34-48 illustrate the simultaneous programming portion of the redo schedule subroutine program.

In either case control is then returned to step 612 (FIG. 34). If a single zero has not be entered at step 622, then at step 624 it is determined whether a valid phone number has been entered. If a valid number was not entered, then at step 638 (FIG. 37) the following announcement is played:

"<entered number> is not a valid ten-digit telephone number."

Figure 40:
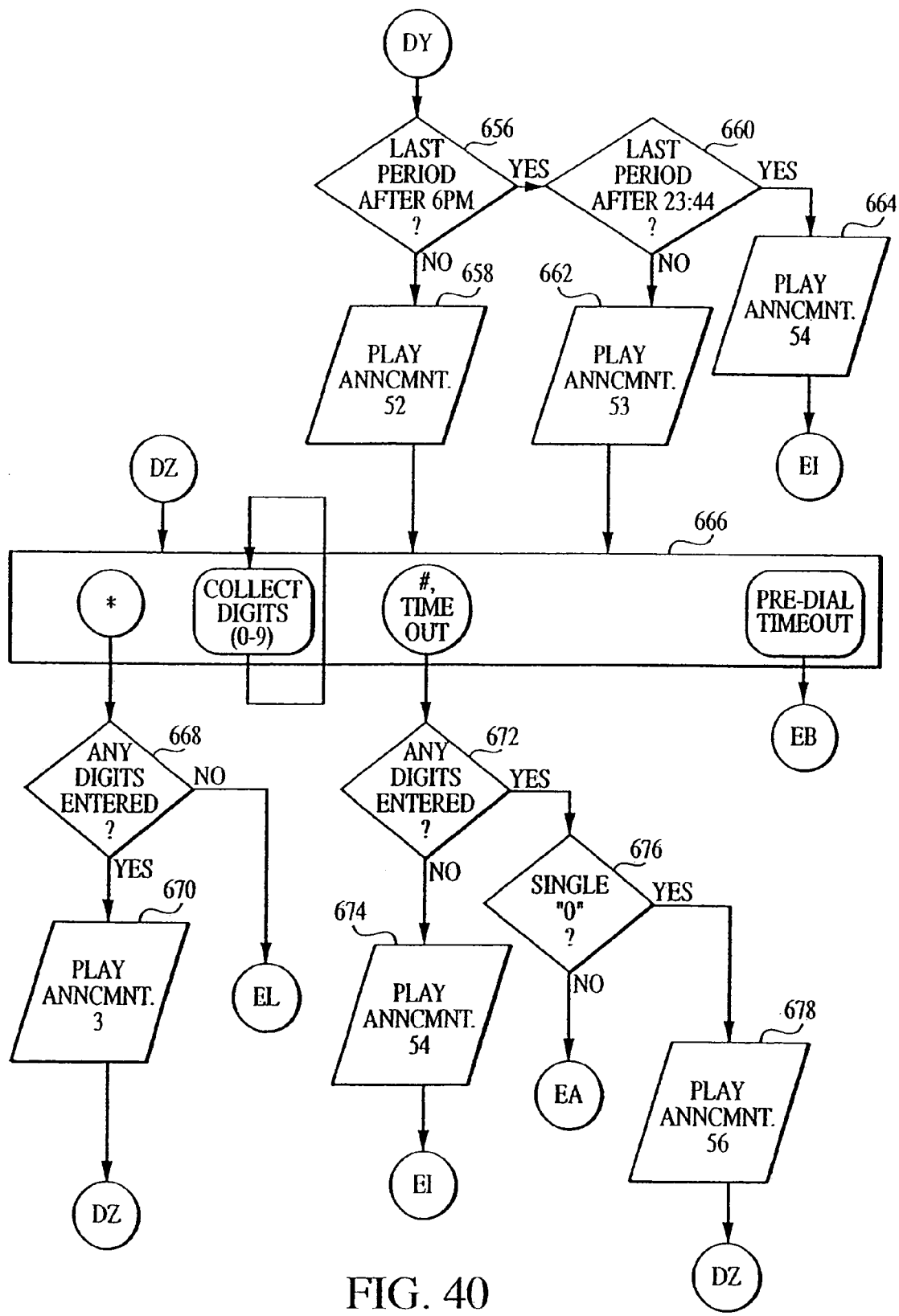
Figure 41:
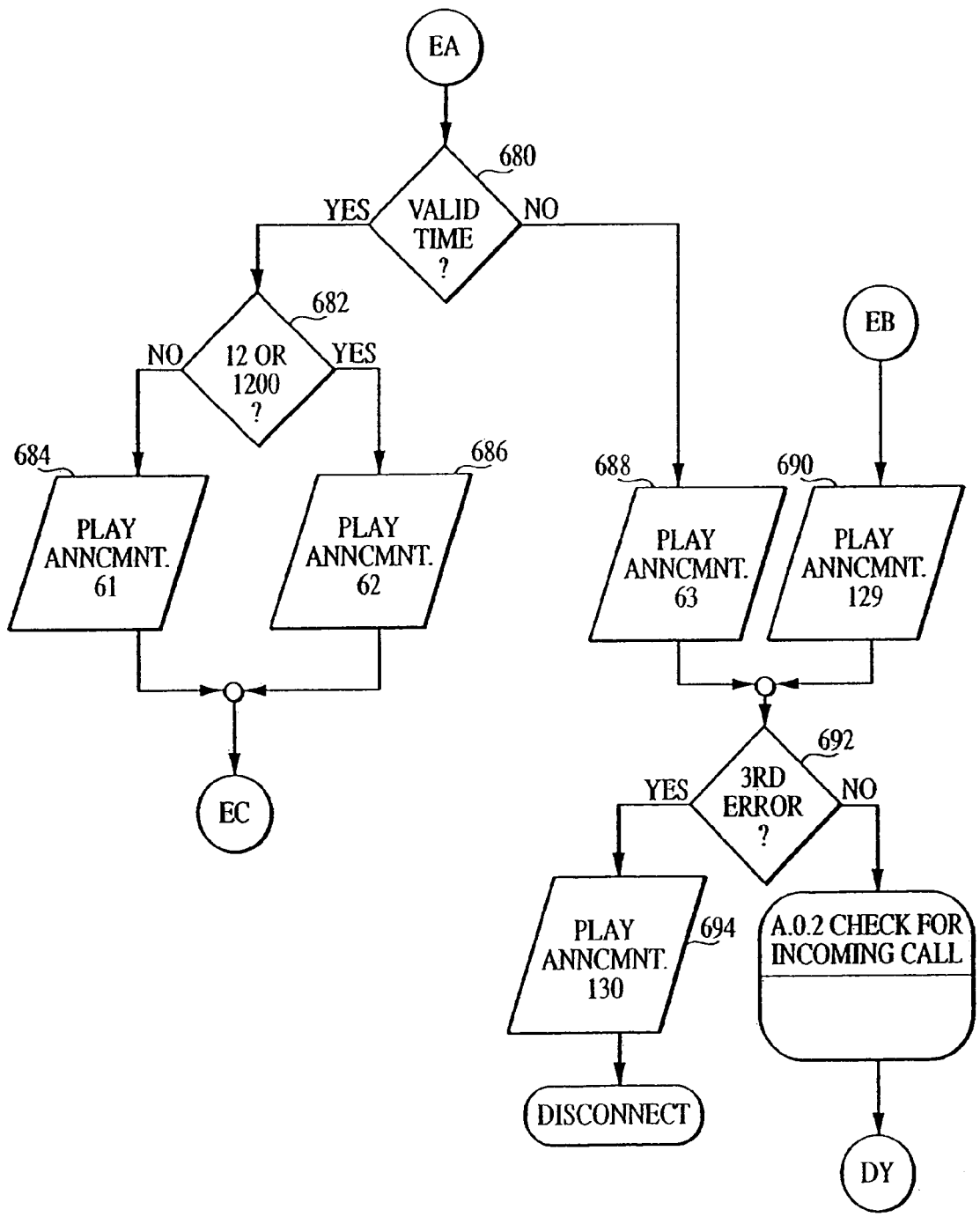
Figure 42:
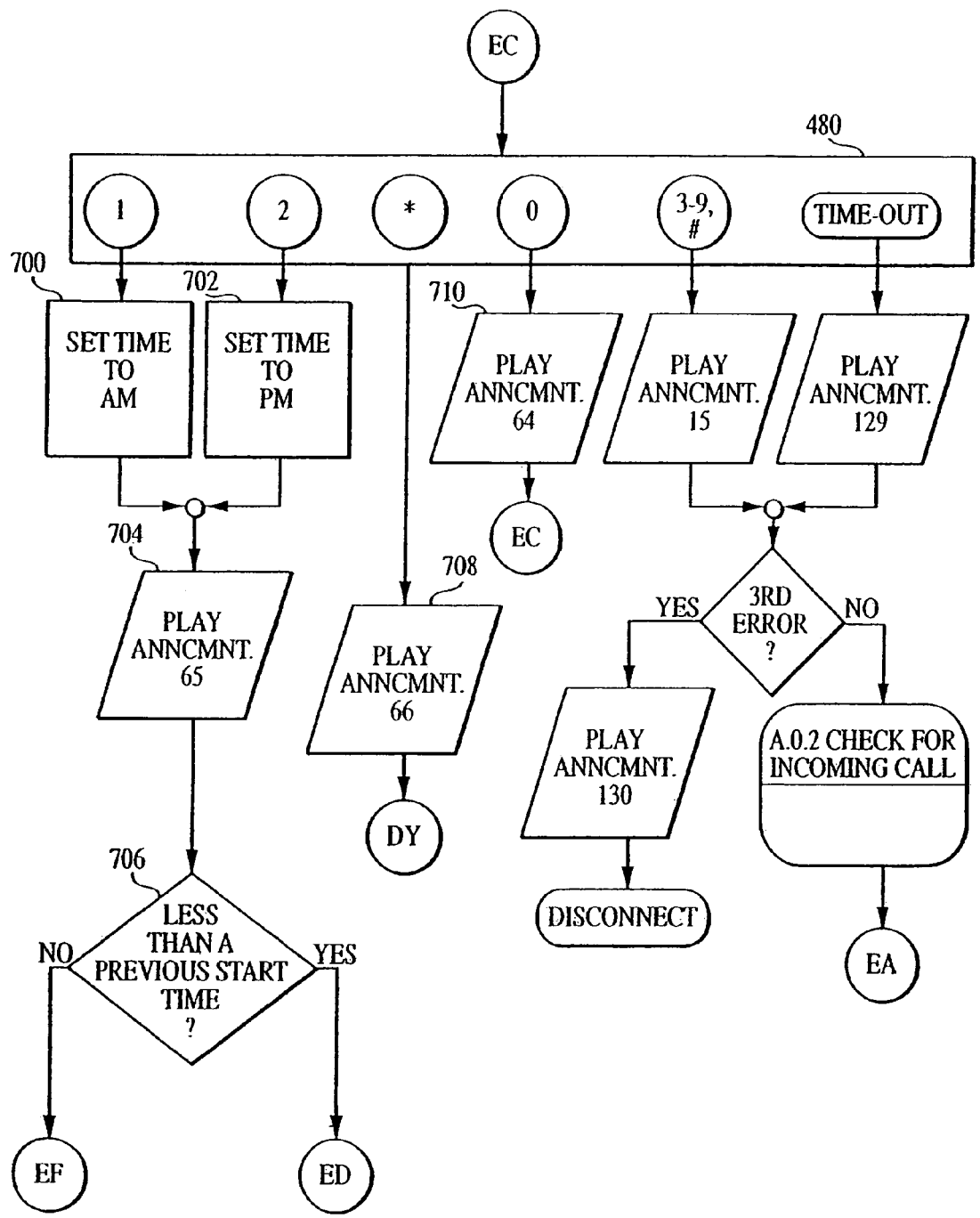
Figure 43:
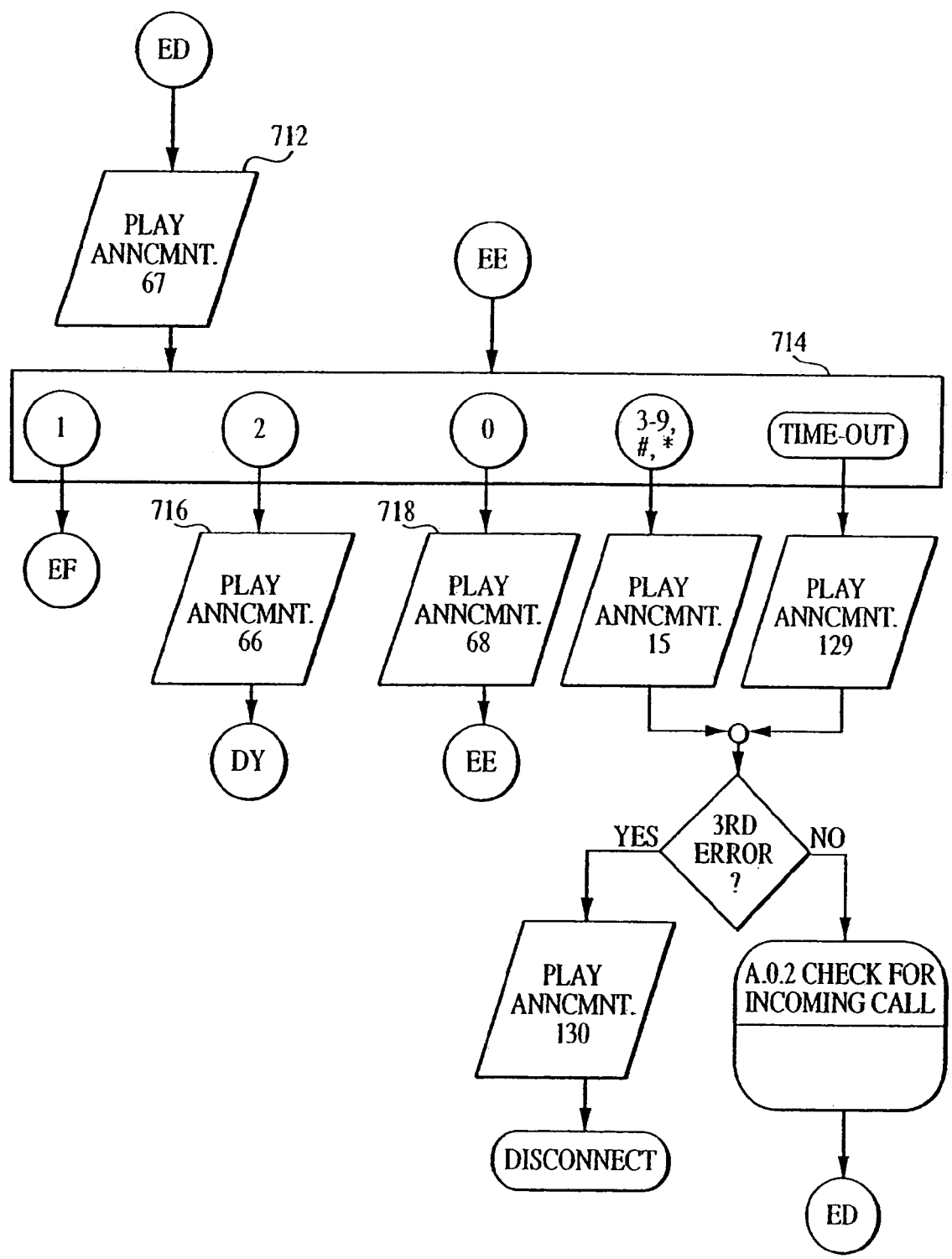

If it is determined at step 620 (FIG. 34) that no digits have been entered, control is passed to step 640 (FIG. 38) where it is determined whether a first number has been entered. If one has, the following announcement is played at step 642, "Calls in the period starting at midnight will be forwarded to <default destination>." In either case, control is then passed to step 656 (FIG. 40).

If a pre-dial timeout occurred at step 612, control is passed to step 632 (FIG. 36) where the following announcement is played: "No key presses have been received." Then, at step 634, it is determined whether this was the third time the message of step 632 was played. The error treatment as previously described follows.

Control is returned to the service menu. If a valid number was entered at step 624, then at step 644 (FIG. 39) the following announcement is played:

"<entered telephone number>. If this is correct, press one. To reenter the number, press two."

Then at step 646 it is determined what keys the subscriber has pressed. If key 1 is pressed, then at step 652 it is determined whether the midnight period has been selected. If key 2 is pressed, then at step 648 the following announcement is played: "Entry canceled." Then at step 650 the entry is canceled and at step 652 it is determined whether the midnight period has been selected. If at step 646 it is determined that the zero key is selected, then at step 654 the following announcement is played:

"Help Information. You can make your selection while this message is playing. Pressing one will accept the number you have entered for this time period. Pressing two will cancel the number and let you reenter it. If you need additional help, please contact your account representative."

Control is then returned to step 646 to determine what selection the subscriber makes. If at step 652 it is determined that the midnight period was selected, then at step 600 (FIG. 34) it is determined what telephone number is being entered (first, second or third) as previously discussed. If at step 652 it is determined that the midnight period was not selected, then at step 720 (FIG. 44) it is determined if this is the first telephone number that is being entered. If keys 0-9 pound, star or the system times out, the error steps as previously described with reference to FIG. 5 occur.

Figure 47:
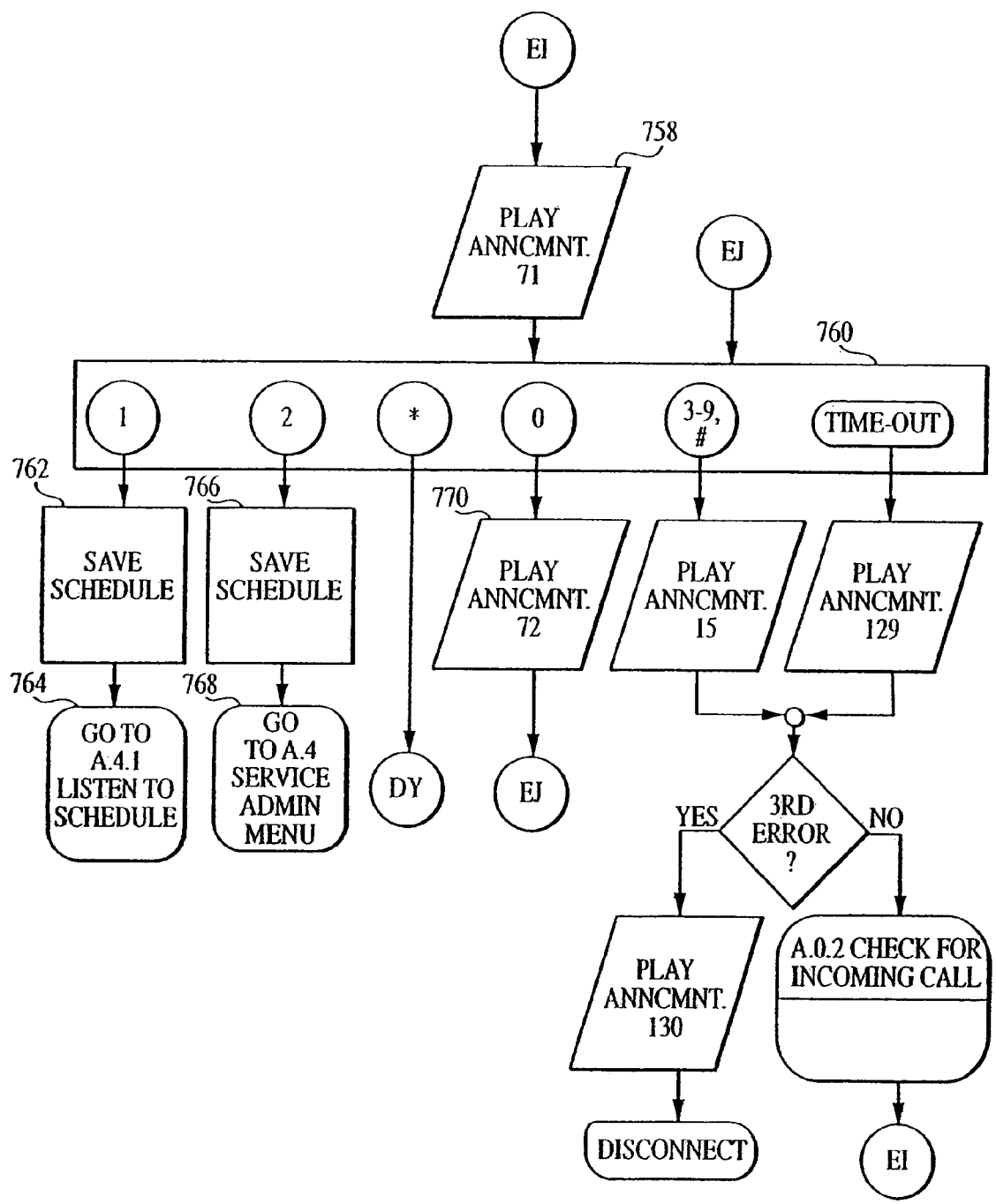
Figure 48:
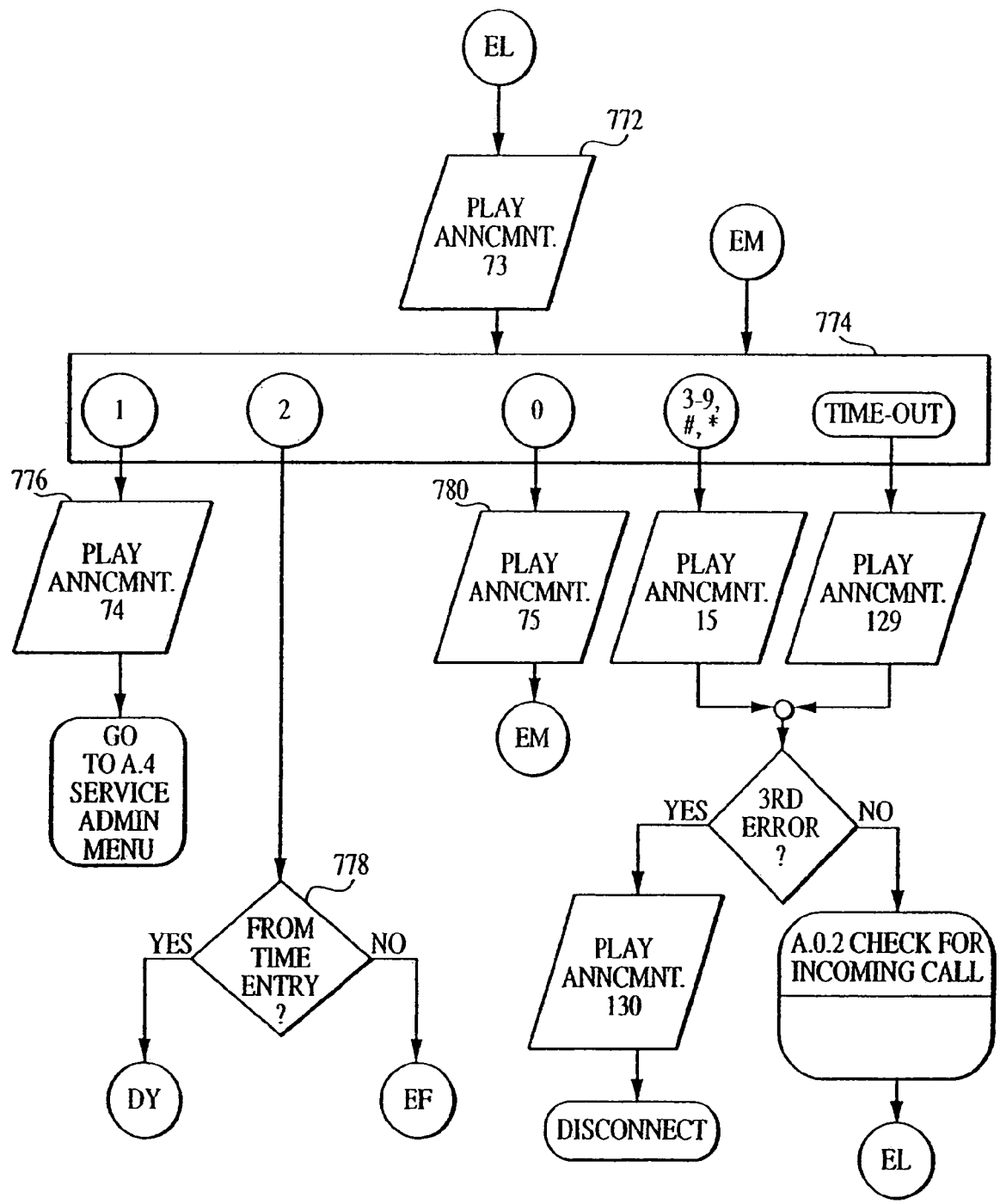
Figure 49:
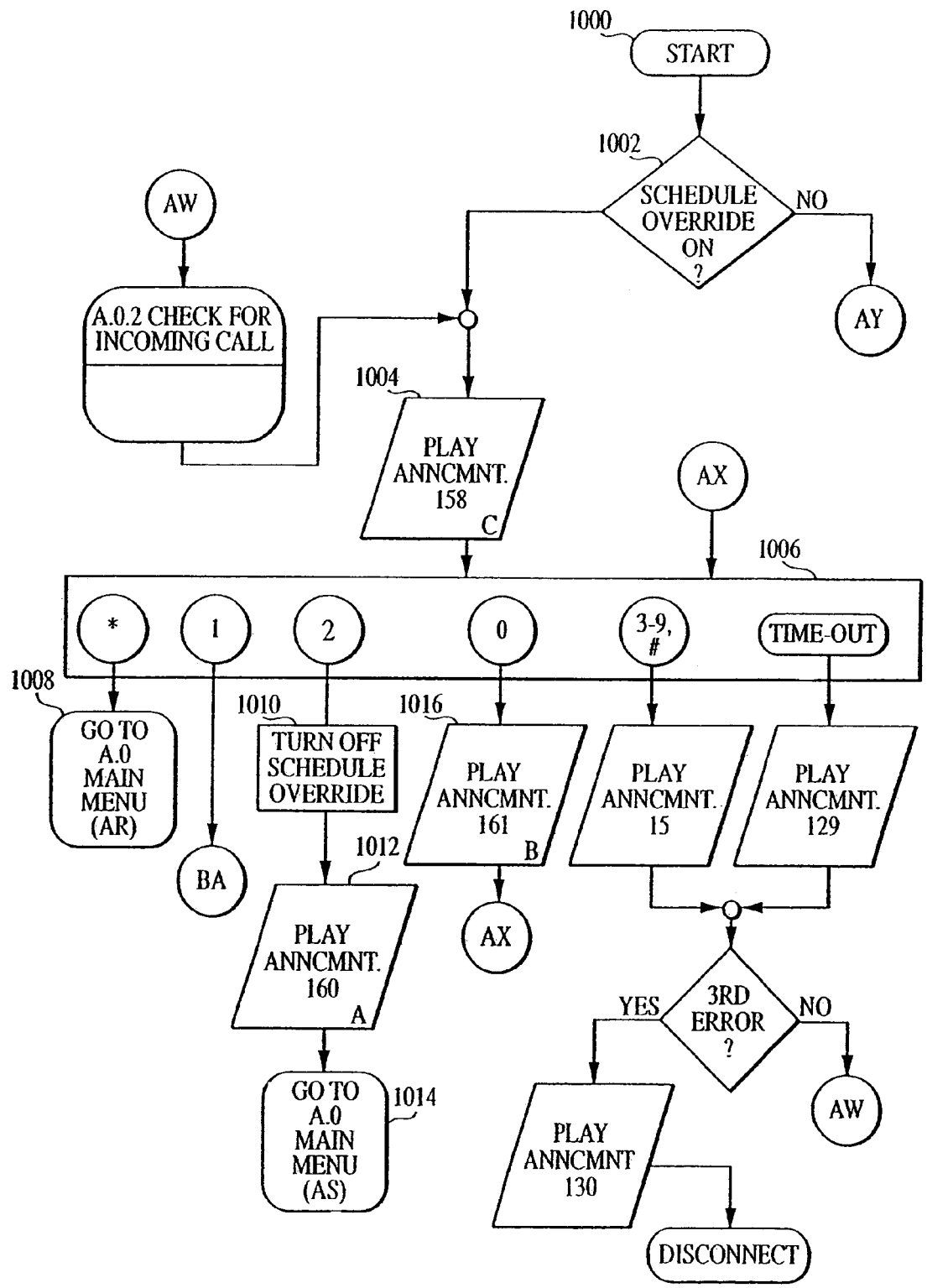
FIGS. 49-53 illustrate the schedule override subroutine program.
Figure 50:
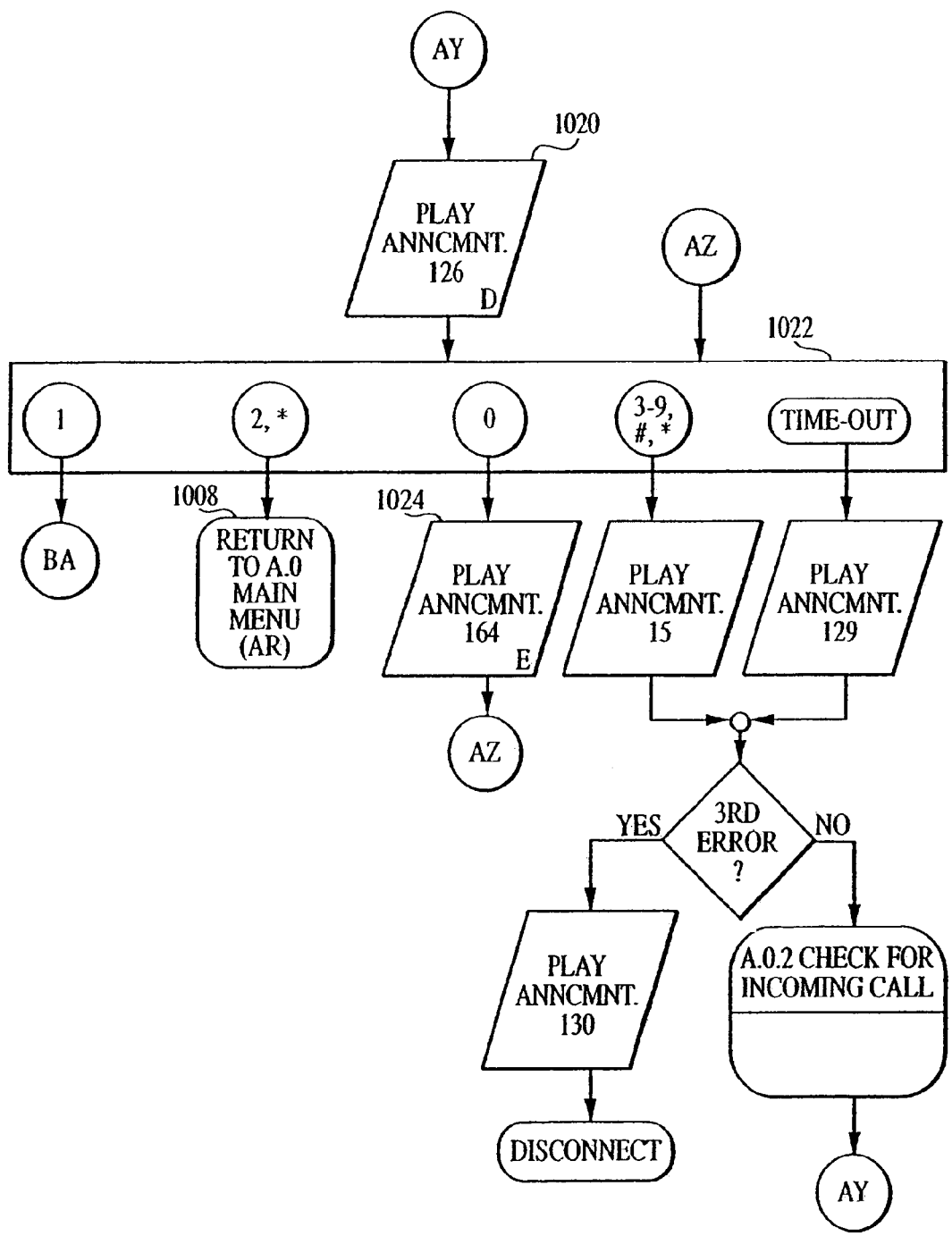
Figure 51:
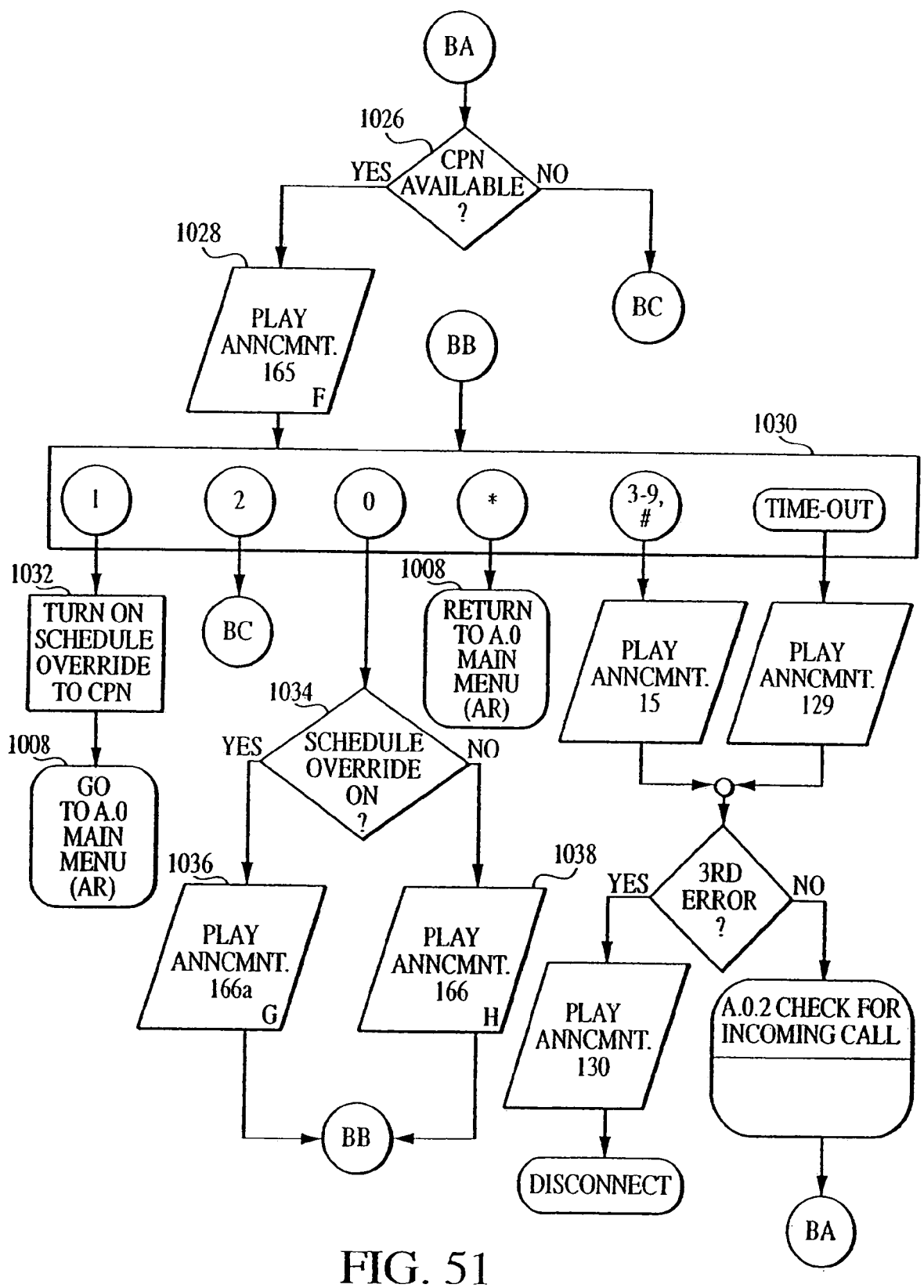

Returning to FIG. 34, if another number is not to be tried (no to step 608 or no to first number in step 640 (FIG. 38)), control is passed to step 656 (FIG. 40). At step 656, it is determined whether the last period started after 6 p.m. If not, then at step 658 the following announcement is played: "Enter the start time of the next time period. To have the last period continue until midnight, just press pound. (1 second pause) For help, press zero now." If the last period was after 6 p.m., then at step 660 it is determined if the last period was after 23:44. If it was not, then at step 662 the following announcement is played: "To have the last period continue until midnight, press pound. Otherwise, enter the start time of the next time period. (1 second pause) For help, press zero now." If it was after 23:44, then at step 664 the following announcement is played: "The last period will extend until midnight." Control is then passed to step 758 (FIG. 47). At step 666, it is determined what key has been pressed by the subscriber. If the star key is pressed, then at step 668 it is determined whether any digits have been entered. If not, control is transferred to step 772 (FIG. 48). If so, at step 670, the following announcement is played "Entry cleared" and control is returned to step 666. If any of the numeric keys 0-9 has been pressed, these numbers are stored in a memory. If the pound key is pressed or the system times out, then at step 672 it is determined whether any digits have been entered. If none have, then at step 674 the following announcement is played: "The last period will extend until midnight." If digits have been entered, then at step 676 it is determined whether the zero key has been pressed once. If it has, then at step 678 the following announcement is played:

"Help Information. Enter the start time of the next schedule period as a one to four digit number. If you make a mistake while entering the time, pressing star will let you start over. Just pressing pound will indicate you do not want to add another period. Just pressing star, will allow you to cancel updating your schedule."

Control is then returned to step 666 to determine what keys are pressed. If it is determined at step 676 that the zero key had not been pressed, then at step 680 (FIG. 41) it is determined whether or not a valid time has been entered. If one has, then at step 682 it is determined whether the number 12 or 1200 has been entered. If it is not, then at step 684 the following announcement is played: "For <entered time> AM, press one. For <entered time> PM, press two." If the number 12 or 1200 was entered at step 682, then at step 686 the following announcement is played: "For twelve midnight, press one. For twelve noon, press two." If it is determined at step 680 that a valid time had not been entered, then at step 688 the following announcement is played: "<Entered time> is not a valid time." Then at the following steps 116 and 118 as already described with reference to FIG. 5 are carried out.

Returning to FIG. 40, if it is determined at step 666 that a pre-dial time out occurred then at step 690 (FIG. 41) the following announcement is played: "No key presses have been received".

If it is determined at step 682 (FIG. 41) that either number 12 or 1200 was or was not entered and the various announcements at step 684 or 686 are played, then at step 698 (FIG. 42) it is determined what key has been pressed by the subscriber. If key 1 is pressed, then at step 700 the time period is set to a.m. If key 2 is pressed, then at step 702 the time period is set to p.m. In either case at step 704 the following announcement is played: "Start Time set to <start time>." At step 706 it is determined whether the time period is less than the previous start time. If it is, then at step 712 (FIG. 43) the following announcement is played:

"The time entered is prior to the start of the previous time period. If you mean to overwrite any affected previous time periods, press one. To reenter the time, press two. For help, press zero now."

Figure 44:
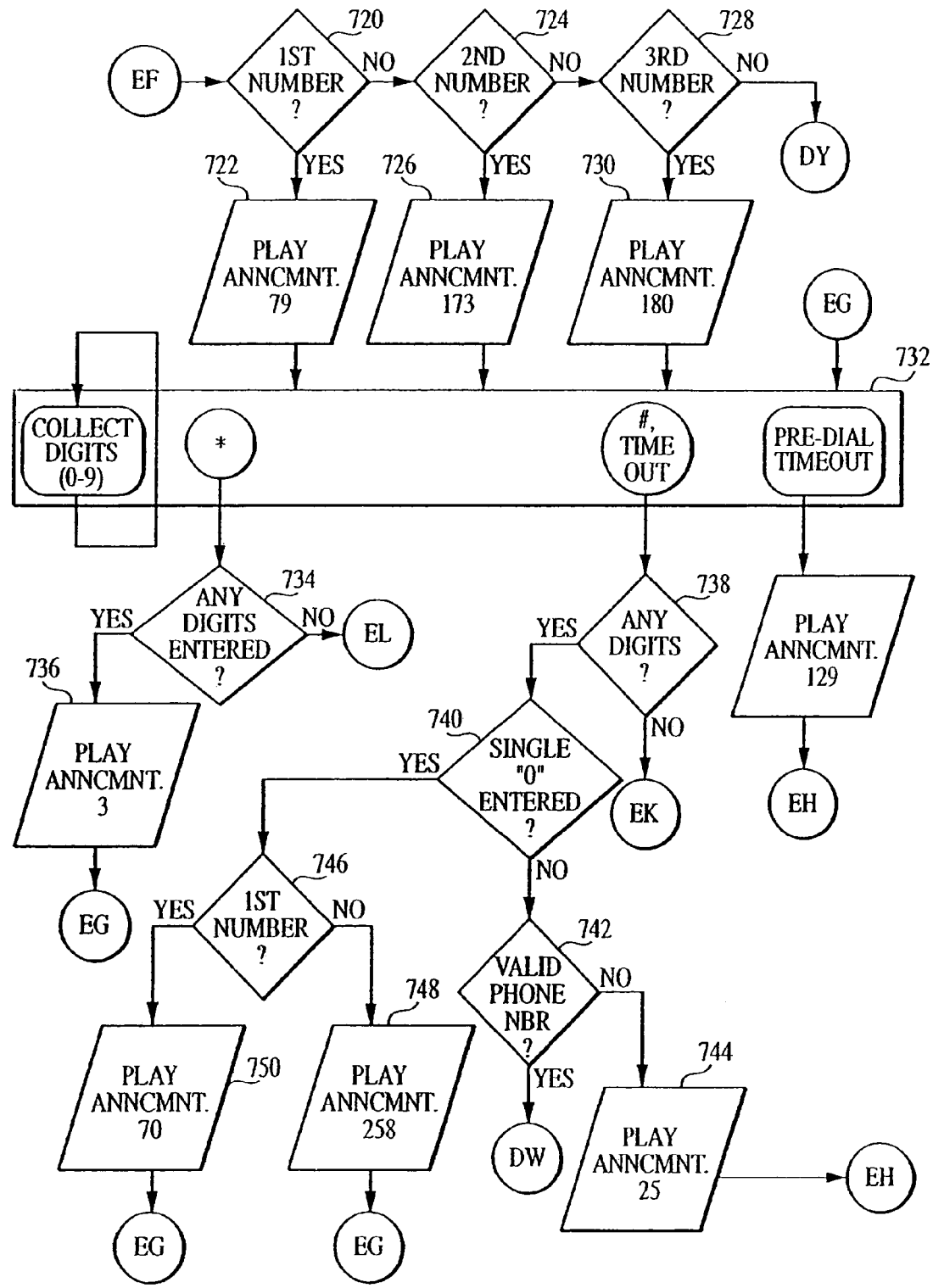
Figure 45:
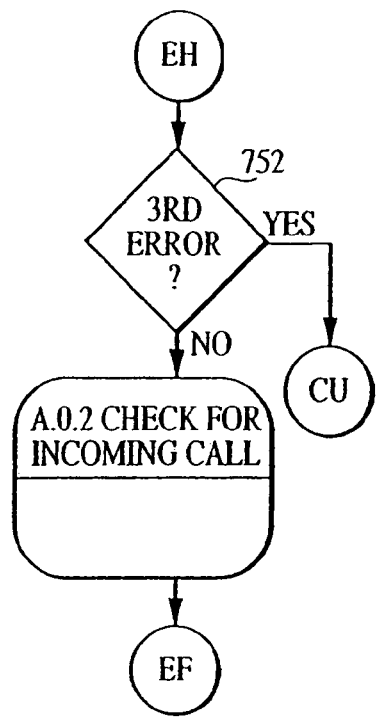

If it is determined at step 706 that the period was not less than the previous start time, then control moves to step 720 (FIG. 44). If a first number is to be tried, then control moves to step 722 the following announcement is played.

"Enter the first number we should use to try to contact you in the time period starting at <starting time>. If you want us to forward all callers to <default destination>, just press pound."

If it is determined at step 720 that a first number has already been entered, then at step 724 it is determined what second number should be tried, then at step 726 the following announcement is played:

"Enter another number you would like us to try. If you do not want us to try any more numbers, just press pound."

If it is determined that a second number has already been entered, then at step 728 it is determined if a third number should be tried, then at step 730 the following announcement is played:

"Enter the last number you would like us to try. If you do not want us to try any other number, just press pound."

If a third number has been entered, then control is transferred to step 656 (FIG. 40) to set up time periods as was discussed earlier. At step 732 it is determined what keys are pressed. If keys 0-9 are pressed they are collected and stored in a memory. If the star key is pressed, then at step 734 it is determined whether any digits have been entered. If digits have been entered, then at step 736 the following announcement is played: "Entry cleared." Control is then returned to step 732 to determine what keys have been selected. If it is determined at step 734 that no digits have been entered, then control is transferred to step 772 (FIG. 48) which will be described in detail hereinafter. If it is determined at step 732 that the pound key is pressed or the system times out, then at step 738 it is determined whether any digits have been entered. If digits have been entered, then at step 740 it is determined whether a single zero has been entered. If not, then at step 742 it is determined whether a valid phone number has been entered. If it is determined at step 742 that a valid number was not entered, then at step 744 the following announcement is played:

"<entered number>, is not a valid ten-digit telephone number."

Figure 46:
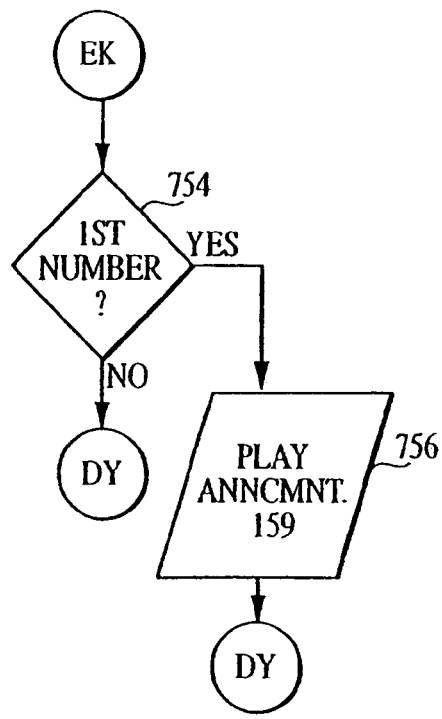

If it is determined at step 738 that no digits have been entered, then control is transferred to step 754 (FIG. 46). At step 754 it is determined if a first number is being designated. If it is, then at step 756 the following announcement is played:

Starting at "<starting time> calls will be forwarded to <default destination>."

In either case, control is then returned to step 656 (FIG. 40).

Returning to FIG. 40, if at step 660 it is determined that the last period is after 23:44, or if at step 672 it is determined that no digits were entered, control is passed to step 758 (FIG. 47) where the following announcement is played:

"To save this schedule and then listen to it, press 1. To save it and return to the Service Administration menu, press two. To continue entering time periods, press star. For help, press zero now."

Control is passed to step 760 where it is determined what digit is pressed. If 1 is pressed, the schedule is saved and control is transferred to step 764. If 2 is pressed, the schedule is saved and control is passed to step 768. If a star is pressed, control is returned to step 656 (FIG. 40). If 0 is pressed, step 770 plays the following announcement and then returns control to step 760.

"Help Information. You can make a selection while this message is playing. Pressing one will save the schedule you have entered and allow you to review it. Pressing two will save it and then return you to the Service Administration menu. Pressing star will return you to entering a new time period. If you need additional help, please contact your account representative."

The digits 3-9 and pound are errors treated as previously discussed in FIG. 5.

Returning to FIG. 48, at step 772 the following message is played:

"To quit without saving the schedule you just entered, press one. To return to entering the schedule, press two. (1 second pause) For help, press zero now."

At step 774, it is determined what key is pressed. If key 1 is pressed, then at step 776 the following announcement is played: "Schedule not saved," and control is returned to the service menu. If key 2is pressed, then at step 778 it is determined whether to return to entering the schedule at the time entry stage or not. If not, control is passed to step 720 (FIG. 44). If yes, control is passed to step 656 (FIG. 40). If the zero key is pressed at step 774, then at step 780 the following announcement is played:

"Help Information. You can make a selection while this message is playing. Pressing one will abandon the schedule you have just been entering without saving it and return you to the Service Administration menu. Pressing two will return you to entering the current schedule. If you need additional help, please contact your account representative."

Control is returned to step 774.

4. Schedule Override Subroutine Program

Next the schedule override subroutine program will be described with reference to FIGS. 49-53. The treatment of errors is the same as has already been described with reference to FIG. 5 and thus will not be described herein. The program begins at reference point 1000. At step 1002 it is determined whether the schedule override is on. If it is, then at step 1004 the following announcement is played:

"All calls are forwarded to <Schedule Override DN>. To change the override number, press one. To turn override off, press two. (One second pause) To retain the current override number and return to the main menu, press star. For help, press zero."

At step 1006 it is determined what keys the subscriber has pressed. If the star key is pressed, then control is returned to the main menu. If key 2 is pressed, then at step 1010 the schedule override is turned off. At step 1012 the following announcement is played:

"Schedule override has been turned off. You are now using your normal forwarding schedule."

Control is then returned to the main menu. If the zero key is pressed, then at step 1016 the following announcement is played:

"Help Information. You can make your selection while this message is playing. Pressing one will let you enter a new override number. Pressing two will turn off override and return to using your normal forwarding schedule. Pressing star will leave override activated with the current number and return you to the main menu. If you need additional help, please contact your account representative."

Control is then returned to step 1006 to determine what selection the subscriber has made. If it is determined at step 1002 that the schedule override feature is not activated, then at step 1020 (FIG. 50) the following announcement is played:

"To activate override, press one. To leave override off, press two. (One second pause) For help, press zero."

At step 1022 it is determined what keys the subscriber has pressed, if either key 2 or the star key are pressed, then control is returned to the main menu. If the zero key is pressed, then at step 1024 the following announcement is played:

"Help Information. You can make your selection while this message is playing. Pressing one will activate your schedule override and let you enter the number to which you would like your calls forwarded. When override is activated, your normal schedule will be ignored and all calls will be forwarded to your override number. Pressing two will leave schedule override off. If you need additional help, please contact your account representative."

Control is then returned to step 1022 to determine what selection the subscriber has made. If it is determined at step 1006 (FIG. 49) or step 1022 (FIG. 50) that key 1 is pressed, then at step 1026 (FIG. 51) it is determined whether the calling party number is available. If it is, then at step 1028 the following announcement is played:

"To have your calls forwarded to your current location, <CPN>, press one. To enter a different number, press two. (One second pause) For help, press zero."

Then at step 1030 it is determined what keys the subscriber has pressed. If key 1 is pressed, then at step 1032 the schedule override to the calling party number is activated. Control is then returned to the main menu. If the zero key is selected, then at step 1034 it is determined whether the schedule override is on. If it is, then at step 1036 the following announcement is played:

"Help Information. You can make your selection while this message is playing. Pressing star will leave schedule override activated without changing the number your calls are forwarded to. Pressing one will forward your calls to the telephone from which you are currently calling. Pressing two will let you enter the telephone number at which you will receive calls. If you need additional help, please contact your account representative."

If it is not, then at step 1038 the following announcement is played:

"Help Information. You can make your selection while this message is playing. Pressing one will forward your calls to the telephone from which you are currently calling. Pressing two will let you enter the telephone number at which you will receive calls. Pressing star will leave schedule override off and return to the main menu. If you need additional help, please contact your account representative."

In either case control is returned to step 1030 to determine what selection the subscriber has made. If the star key is pressed then control is returned to the main menu. If it is determined at step 1026 that the calling party number is not available or if at step 1030 key 2 is pressed, then at step 1040 (FIG. 52) the following announcement is played:

"Please enter the telephone number to which you would like your calls forwarded. If you make a mistake while entering the number, press start to clear what you have entered and start over. To leave schedule override off, just press star. For help, press zero now."

Then at step 1042 it is determined what keys the subscriber has pressed. If 0-9 are pressed, those numbers are collected and stored in a memory. If the star key is pressed, then at step 1044 it is determined whether any digits have been entered. If no digits have been entered, then control is returned to the main menu. If digits have been entered, then at step 1046 the following announcement is played: "Entry cleared." Control is returned to step 1042 to determine what selection the subscriber has made. If at step 1042 the pound key is pressed or the system times out, then at step 1048 it is determined whether any digits have been entered. If digits have been entered, then at step 1050 it is determined whether the zero key has been pressed. If it has, then at step 1052 it is determined whether the schedule override is activated. If it is not, then at step 1056 the following announcement is played:

"Help Information. Enter the ten-digit number to which you would like your voice calls forwarded. It is not necessary to enter a one before the area code. If you make a mistake during entry of the number, pressing star will clear what you have entered and let you star over. Pressing star without entering any digits will leave schedule override off and return you to the main menu. If you need additional help, please contact your account representative."

If the schedule override is activated, then at step 1054 the following announcement is played:

"Help Information. Enter the ten-digit number to which you would like your voice calls forwarded. It is not necessary to enter a one before the area code. If you make a mistake during entry of the number, pressing star will clear what you have entered and let you star over. Pressing star without entering any digits will leave schedule override activated without changing the number your calls are forwarded to. If you need additional help, please contact your account representative."

In either case control is returned to step 1042 to determine what selection the subscriber has made. If it is determined at step 1050 that the zero key had not been pressed, then at step 1058 it is determined whether a valid phone number has been entered. If no valid phone number has been entered, then at step 1060 the following announcement is played:

"<entered number>, is not a valid ten-digit telephone number."

If a valid phone number has been entered at step 1058, then at step 1062 (FIG. 53) it is determined whether the override feature is on. If it is not, then at step 1064 the following announcement is played:

"<entered DN>. If this is correct, press one. To re-enter the telephone number, press two (One second pause) To cancel activating schedule override, press star. For help, press zero."

If the schedule override is activated, then at step 1066 the following announcement is played:

"<entered DN>. If this is correct, press one. To re-enter the telephone number, press two (One second pause) To leave the current override number active, and leave override on, press star. For help, press zero."

Figure 52:
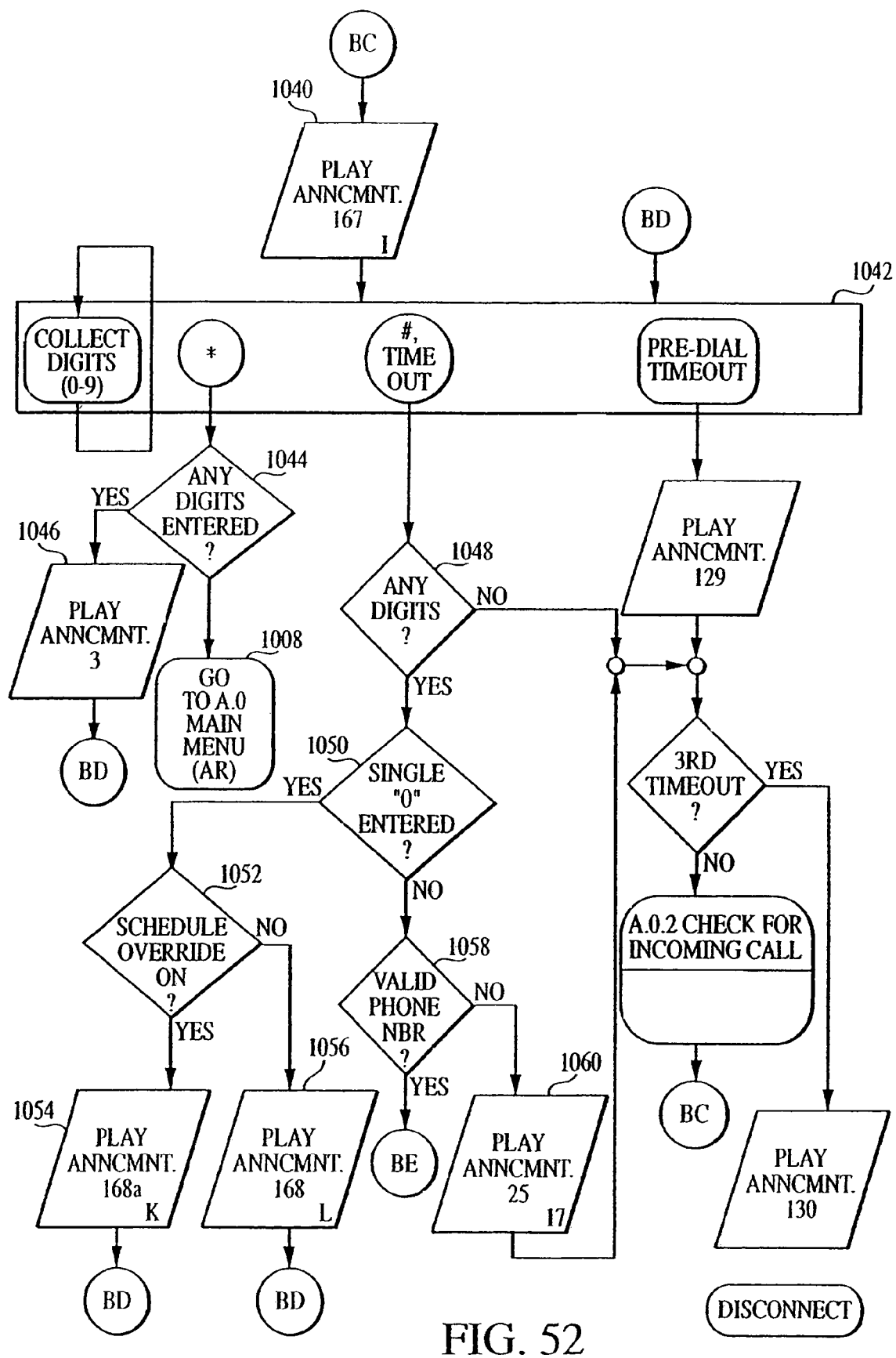
Figure 53:
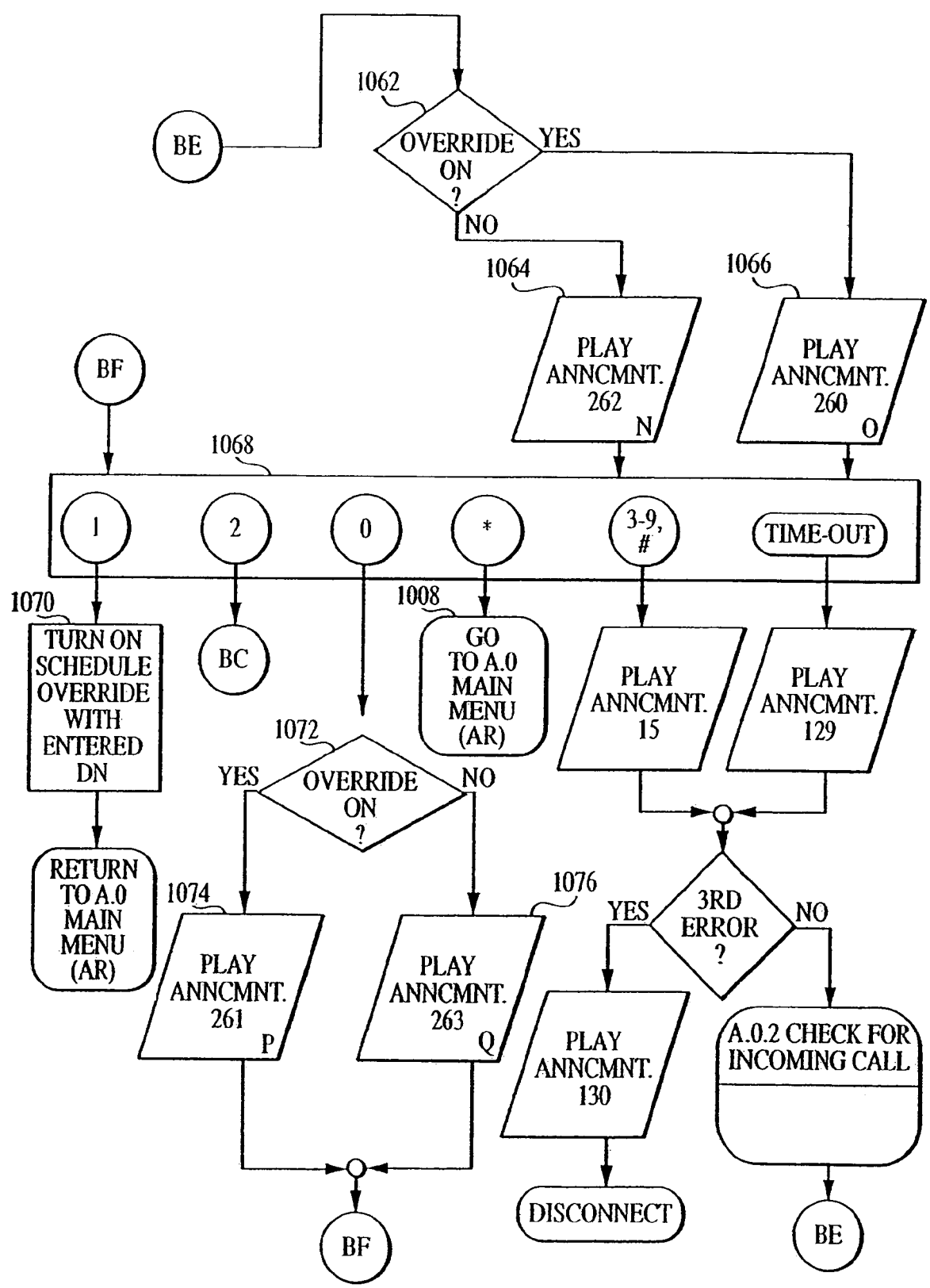
Figure 54:
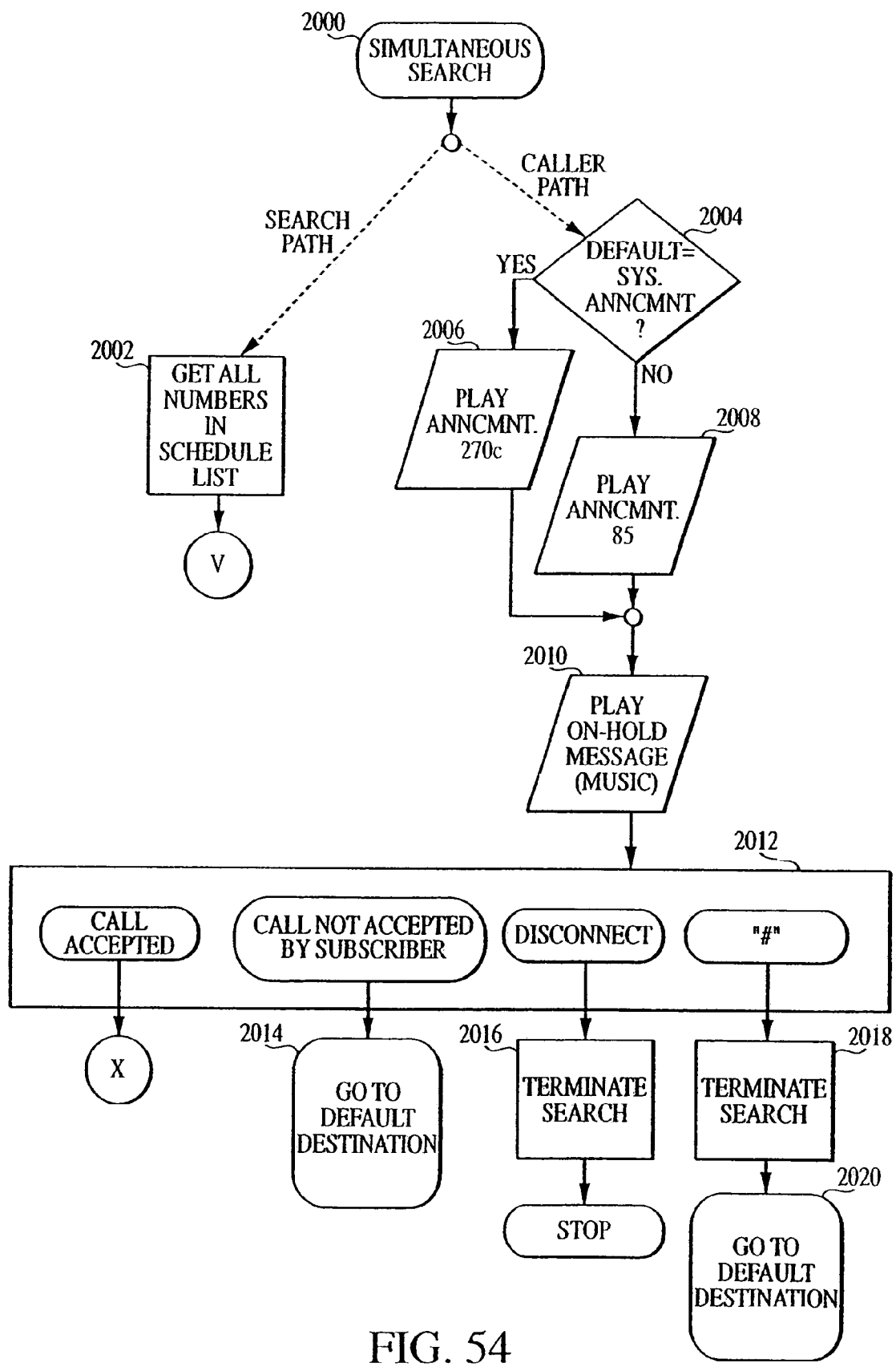
FIGS. 54-57 are flowcharts illustrating the simultaneous search subroutine program.

At step 1068 it is determined what keys are pressed by the subscriber. If key 1 is pressed, then at step 1070 the override feature is activated with the entered dialed number. Control is then returned to the main menu. If key 2 is selected control is returned to step 1040 (FIG. 52). If the zero key is pressed, then at step 1072 it is determined whether the override feature is activated. If it is, then at step 1074 the following announcement is played:

"Help Information. You can make your selection while this message is playing. Pressing one indicates the entered telephone number is correct. Pressing two says the number is incorrect and you would like to re-enter it. Pressing star will cancel changing the override number and will leave <Schedule Override DN> as the contact number. If you need additional help, please contact your account representative."

If it is not, then at step 1076 the following announcement is played:

"Help Information. You can make your selection while this message is playing. Pressing one indicates the entered telephone number is correct. Pressing two says the number is incorrect and you would like to re-enter it. Pressing star will leave schedule override off. If you need additional help, please contact your account representative."

In either case control is returned to step 1068 to determine what selection the subscriber has made. If the star key is selected, control is returned to the main menu.

5. Simultaneous Search Subroutine

FIGS. 54-57 are flow charts illustrating the simultaneous search subroutine. The program begins at step 2000. The search path is shown to the left of the figure where at step 2002 the subscriber's profile is retrieved to obtain the numbers the subscriber has listed to be simultaneously contacted. To the right is indicated the path the calling party is led through. At step 2004 it is determined whether the system announcement is specified as default. If it is, then at step 2006 the following announcement is played: "Please hold while your party is contacted." If it is determined at step 2004 that the system announcement was not specified as default, then at step 2068 the following announcement is made: "Please hold while your party is contacted. If you would like to be connected to <default destination>, press pound at any time." Then at step 2010 music is played while the numbers listed in the simultaneous search are contacted.

Figure 55:
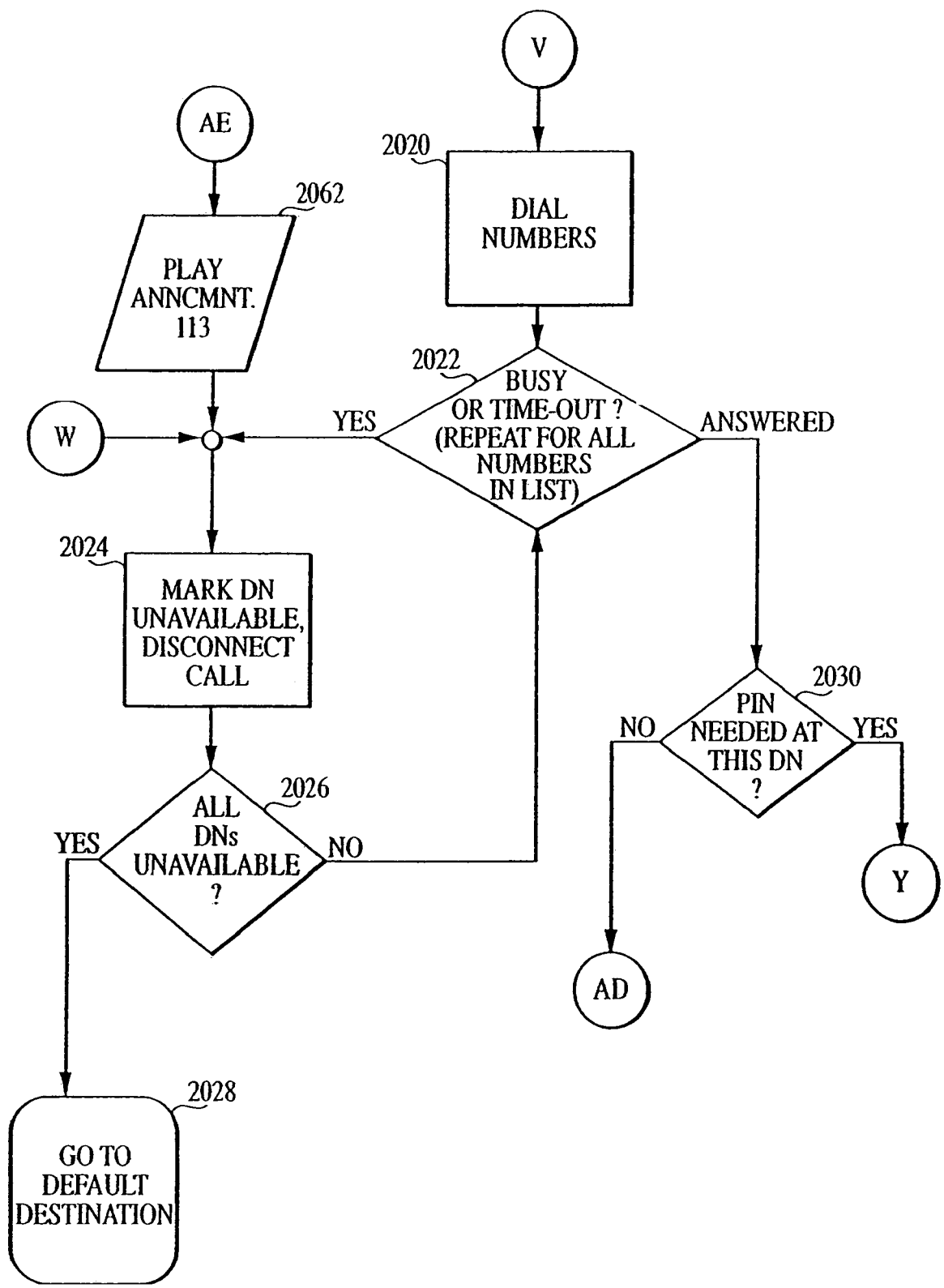
Figure 56:
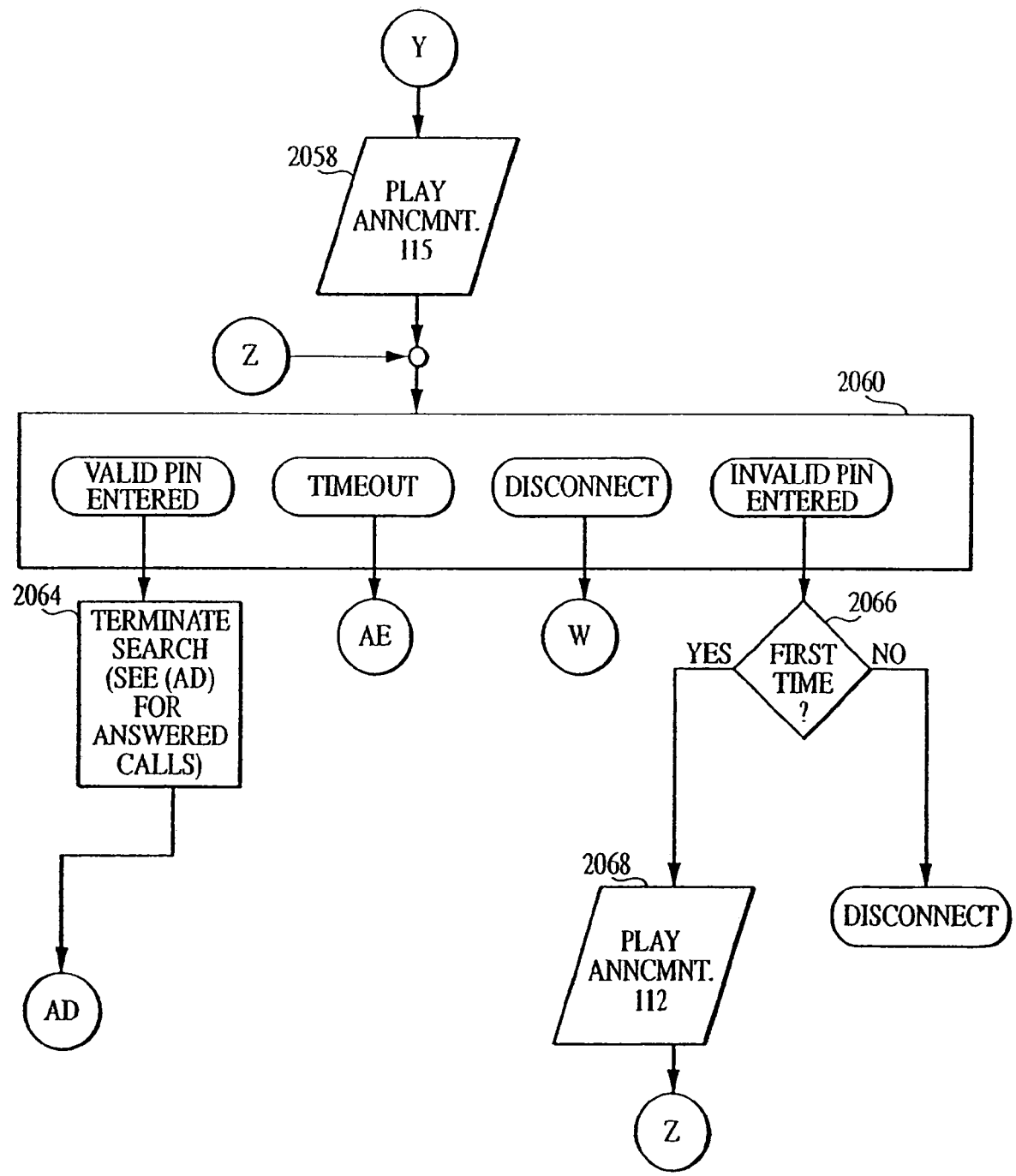
Figure 57:
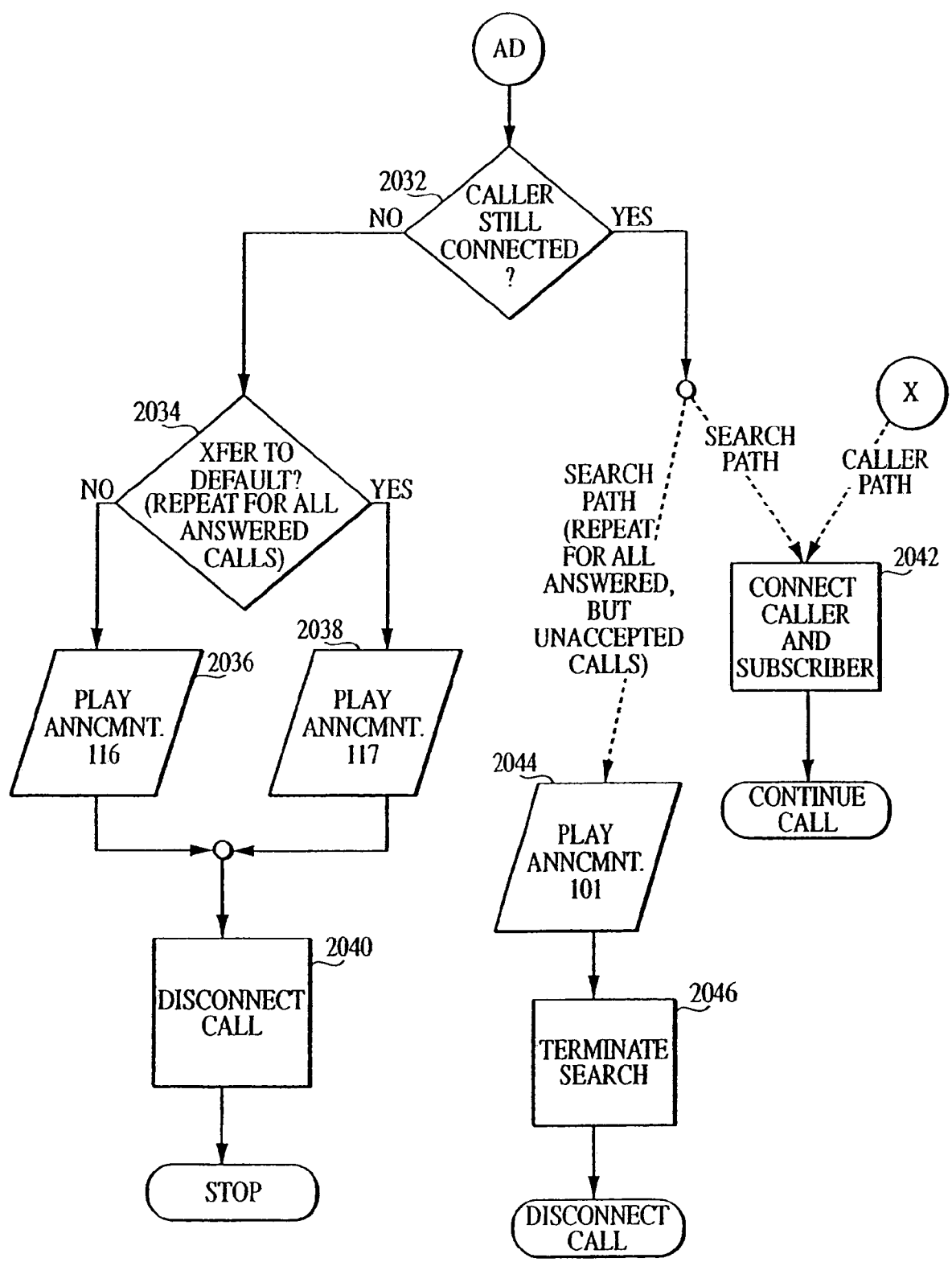
Figure 58:
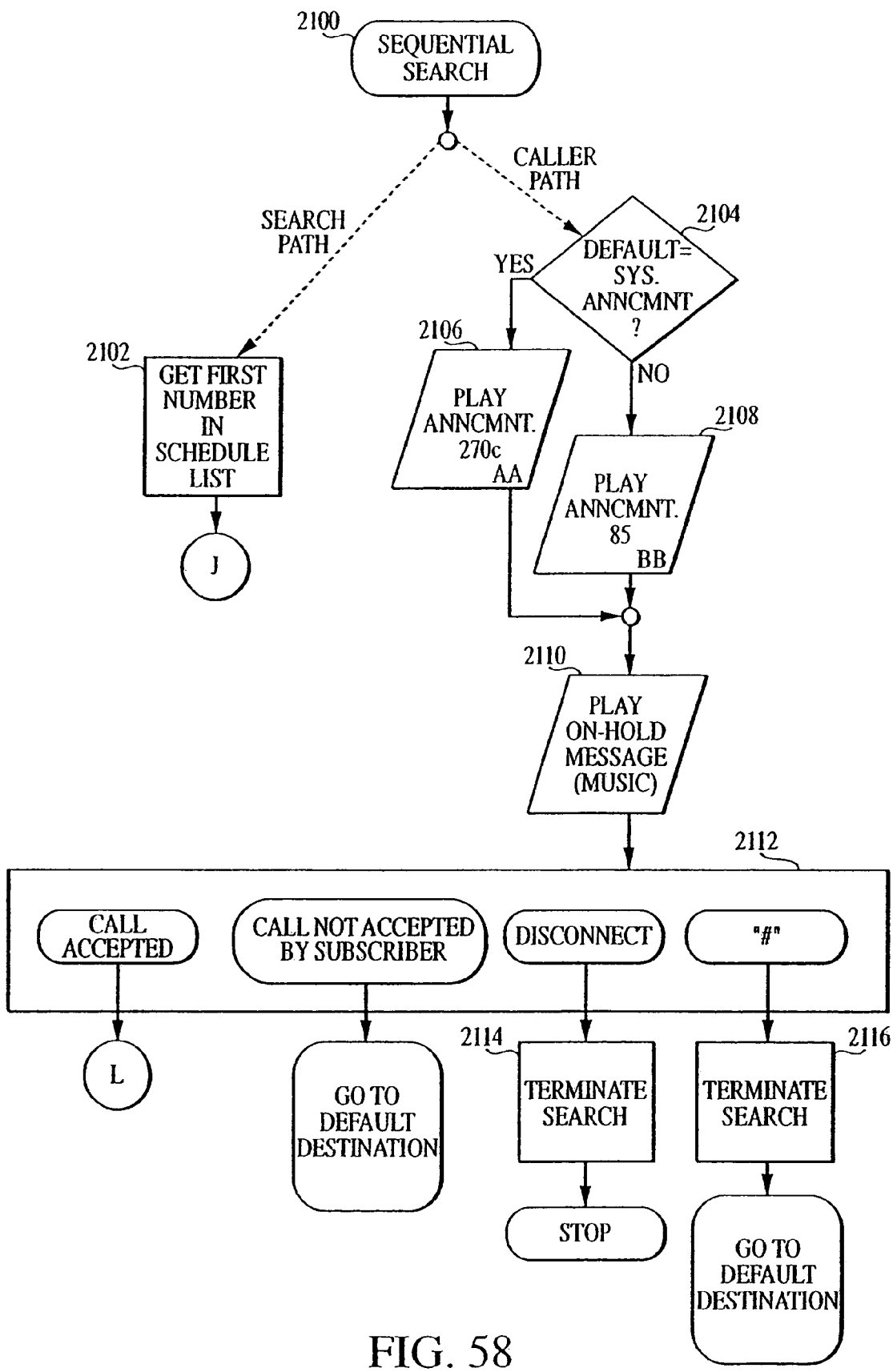
FIGS. 58-61 are flowcharts illustrating the sequential search subroutine program.

In particular, with reference to FIG. 55 at step 2020 the numbers listed to be simultaneously dialed are dialed. At step 2022 it is determined whether the currently dialed number is busy or has not been answered. In either case the dialed number is marked unavailable at step 2024 and the system stops calling that number. At step 2026 it is determined whether all of the numbers dialed in step 2020 are busy or not answered. If they are, then at step 2028 the system enters a default subroutine which will be described in detail hereinafter.

If not all of the dialed numbers were determined to be busy or not answered control is returned to step 2022 and, for the dialed number answered, control is transferred to step 2030 where it is optionally determined whether a PIN is needed for the dialed number. If a PIN is not needed for the dialed number, control is passed to step 2032 (FIG. 57) where it is determined whether the calling party is still on the line. If the calling party is not on the line, then at step 2034, it is determined whether the calling party has chosen to go to a default location which will be described in detail hereinafter. If the calling party has not, then at step 2036 the following announcement is played: "The caller has hung up. Please excuse the interruption. Good-bye." If it is determined at step 2034 that the caller has chosen the default location then at step 2038 the following announcement is played: "The caller has chosen to go to your default destination. Please excuse the interruption. Good-bye." The call to the subscriber is then disconnected at step 2040 and the subroutine program ends. If it is determined at step 2032 that the calling party is still on the line, then at step 2042 the caller is connected to the subscriber that has accepted the call. For those other numbers that were answered but the call not accepted the following announcement is played at step 2044: "The call has been accepted on another line. Please excuse the interruption." The search then ends at step 2046 and the call is disconnected.

Returning to FIG. 55 if it is determined at step 2030 that a PIN is needed, control is passed to step 2058 (FIG. 56) where the following announcement is played: "There is a call for <subscriber's name>. If you are not <subscriber's name>, please hang up. (2 second pause) Please enter your PIN." At step 2060 it is determined what action has been taken. If the called party has hung up, then control is passed to step 2024 (FIG. 55) which has already been described. If no action has been taken but the called party has not hung up, then control is passed to step 2062 (FIG. 55) where the following announcement is placed: "That is not a valid Personal Identification Number. If you need help, please contact your account representative. Good-bye." and the program continues as previously described. If it is determined at step 2060 that a valid PIN has been entered, then at step 2064 the search is terminated and control is passed to step 2032 (FIG. 57) previously described. If it is determined that an invalid PIN has been entered, then at step 2066 it is determined whether it is the first time. If it is then at step 2068 the following announcement is played: "That is not a valid entry. Please try again." and control is returned to step 2060 to determine what action has been taken by the called party. If it is determined at step 2066 that the incorrect PIN has been entered more than once then the called party is disconnected.

Returning to FIG. 54 if at step 2012 it is determined that the call has been accepted by the called party, then control is transferred to step 2042 (FIG. 57) where the caller and subscriber are connected. If the call has not been accepted by the called party, the default destination subroutine is entered which will be described in detail hereinafter. If the calling party is disconnected, then the search is terminated at step 2016 and the program ends. If the calling party has pressed the pound key, then at step 2018 the search is terminated and at step 2020 the default destination subroutine is entered.

6. Sequential Search Subroutine

FIGS. 58-61 are flow charts illustrating the sequential search subroutine. The program begins at step 2100. The search path is shown to the left of the figure where at step 2102 the subscriber's profile is retrieved to obtain the first number the subscriber has listed to be contacted. To the right is indicated the path the calling party is led through. At step 2104 it is determined whether the system announcement is specified as default. If it is, then at step 2106 the following announcement is played: "Please hold while your party is contacted." If it is determined at step 2104 that the system announcement was not specified as default, then at step 2108 the following announcement is made: "Please hold while your party is contacted. If you would like to be connected to <default destination>, press pound at any time." Then at step 2110 music is played while the first number listed in the search is contacted at steps 2102 and 2118.

At step 2112, it is determined what happens to the caller if the subscriber accepts or rejects the caller or if the caller hangs up or presses the pound key. If the call is accepted, control is transferred to step 2148 (FIG. 61) and the subscriber and caller are connected. If the call is not accepted by the subscriber, then the call is directed to the default destination which will be described hereinafter. If the call is disconnected, then at step 2114 the search is terminated. If the subscriber presses the pound key, then at step 2116, the search is terminated and the call is forwarded to the default destination.

Figure 59:
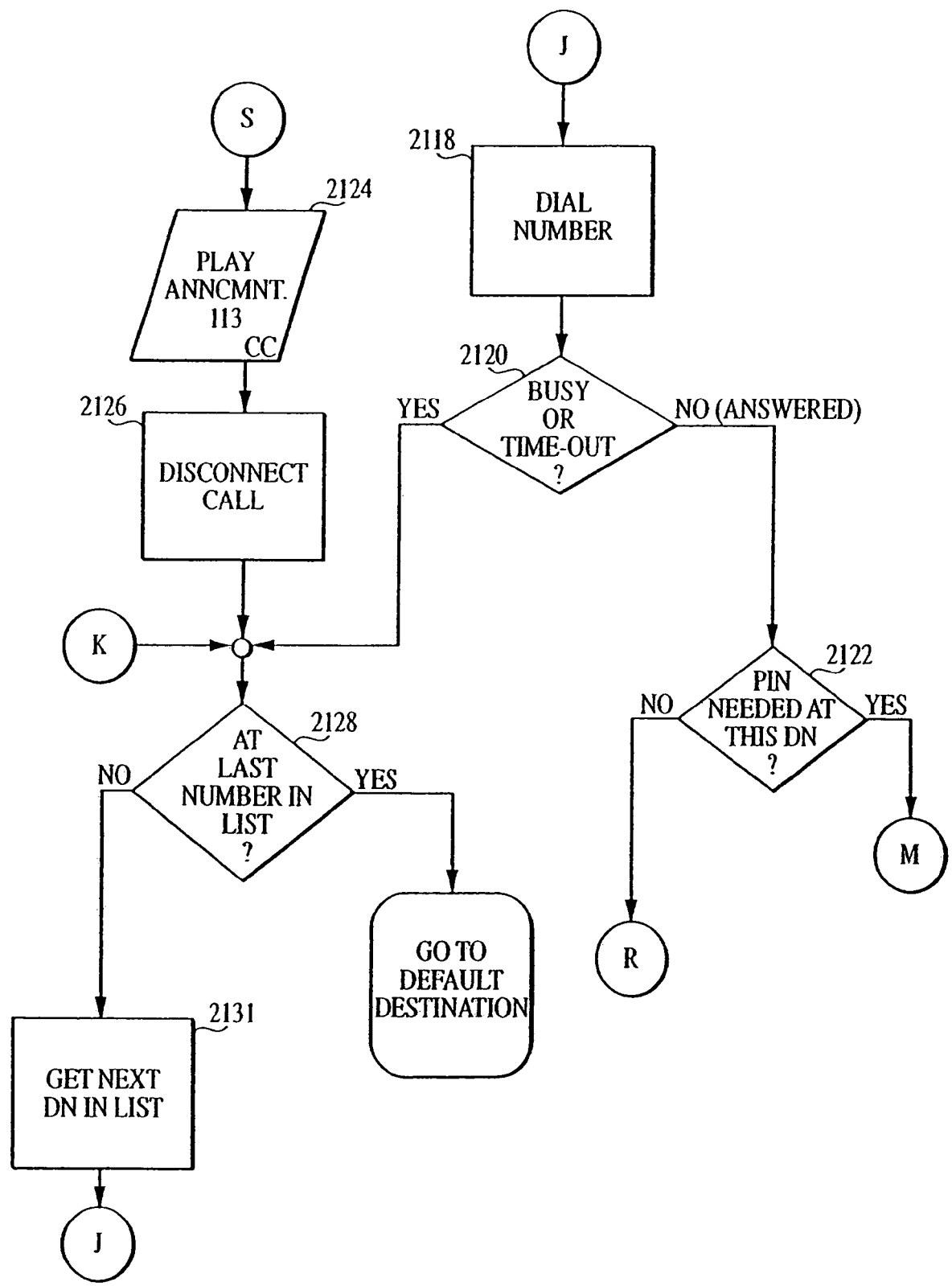
Figure 60:
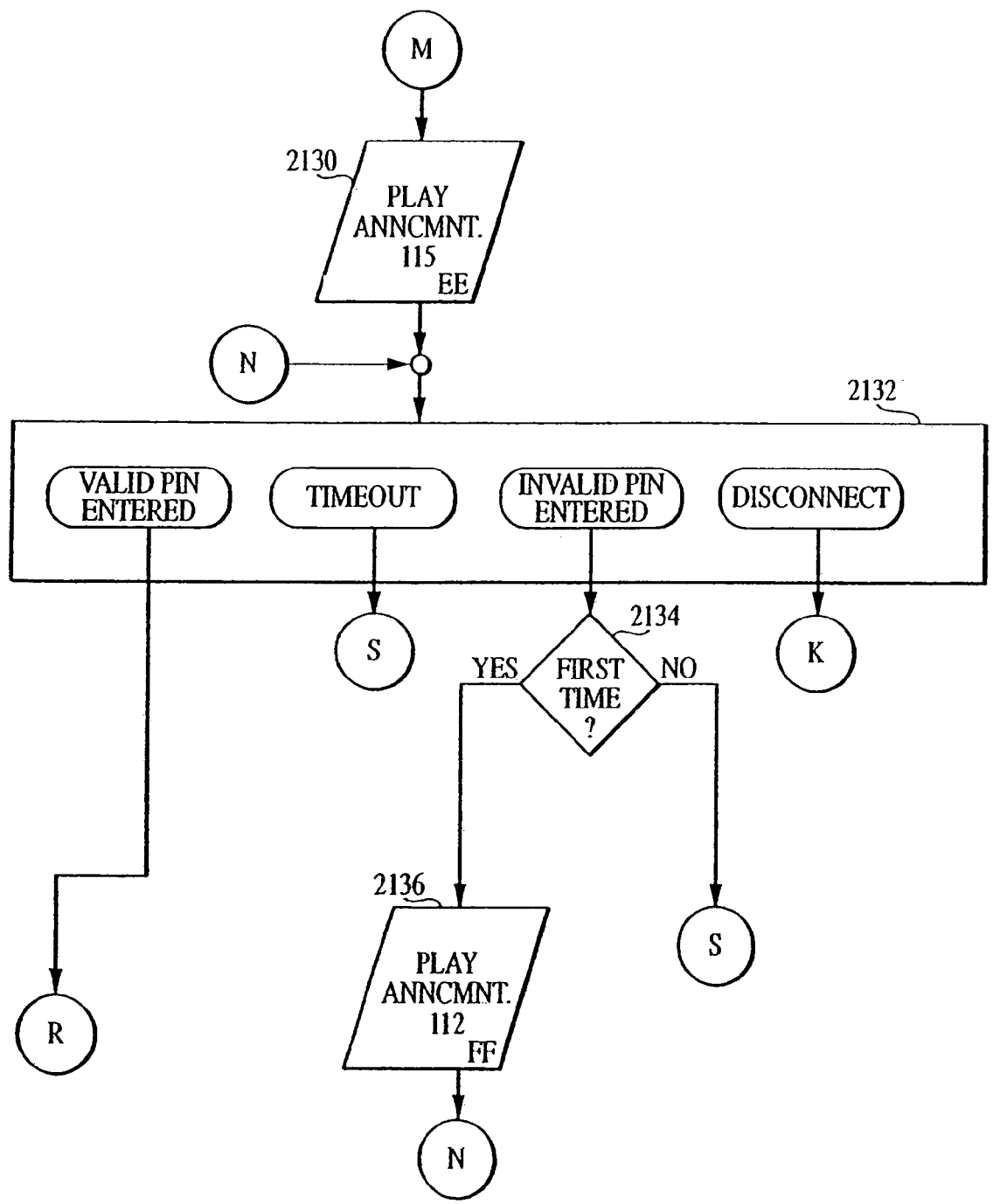
Figure 61:
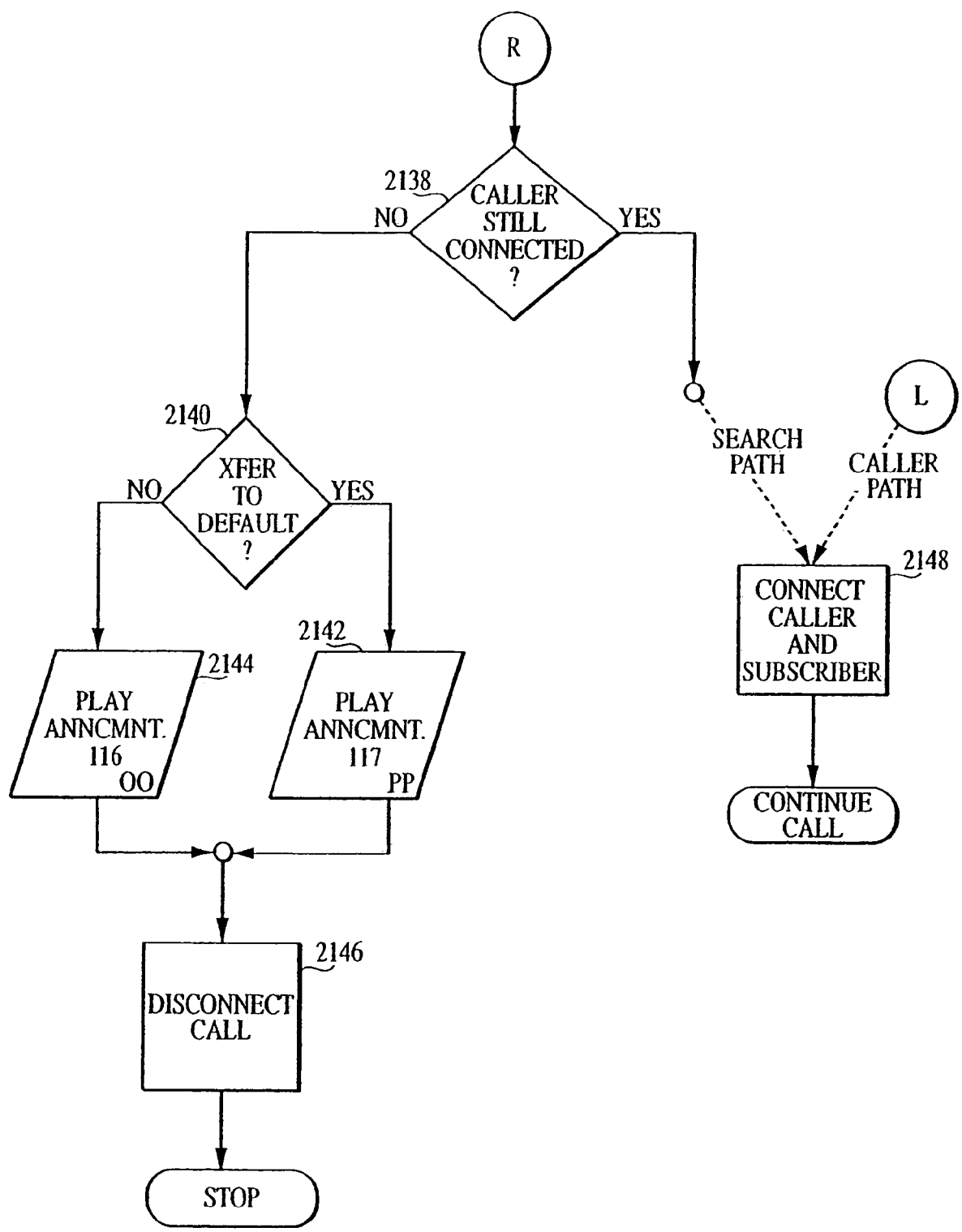

In particular, with reference to FIG. 59 at step 2118 the first number listed to be dialed is dialed. At step 2120 it is determined whether the currently dialed number is busy or has not been answered. If the call has been answered, then at step 2122 it is optionally determined whether a PIN is needed at the dialed number. If it is, then at step 2130 (FIG. 60) the following announcement is played: "There is a call for <subscriber's name>. If you are not <subscriber's name>, please hang up. (2 second pause) Please enter your PIN number." At step 2132 it is determined whether a valid or invalid PIN has been entered, if the call has been disconnected or a time out has occurred. If a valid PIN has been entered, control is transferred to step 2138 (FIG. 61) to be described hereinafter. If a time out has occurred, control is transferred to step 2124 (FIG. 59) where the following announcement is played: "This is not a valid Personal Identification Number. If you need help, please contact your account representative. Good-bye." At step 2126 the call is then disconnected. If at step 2132 (FIG. 60) an invalid PIN is entered, then at step 2134 it is determined whether it is the first time. If it is, then at step 2136 the following announcement is played: "That is not a valid entry. Please try again." Control is returned to step 2132. If it is not the first time, then control is passed to step 2124 (FIG. 59) which was previously described.

At step 2138 (FIG. 61) it is determined whether the caller is still connected. If the caller is not, then at step 2140 it is determined whether the call has been transferred to default. If yes, then at step 2142 the following announcement is played: "The caller has chosen to go to your default destination. Please excuse the interruption. Good-bye." If not, then at step 2144 the following announcement is played: "The caller has hung up. Please excuse the interruption. Good-bye." In either case, at step 2146 the call is disconnected.

If the caller is still connected at step 2138 and the subscriber has chosen to accept the call at step 2112 (FIG. 58) then at step 2148 the caller and subscriber are connected.

Returning to FIG. 59, if at step 2120 it is determined that the called number is busy or there is no answer, then at step 2128 it is determined if the called number is the last number on the sequential list. If it is, the call is directed to the default destination. If not, then at step 2131 the next number on the sequential list is retrieved and control is returned to step 2118.

7. Incoming Call Processing

Figure 62:
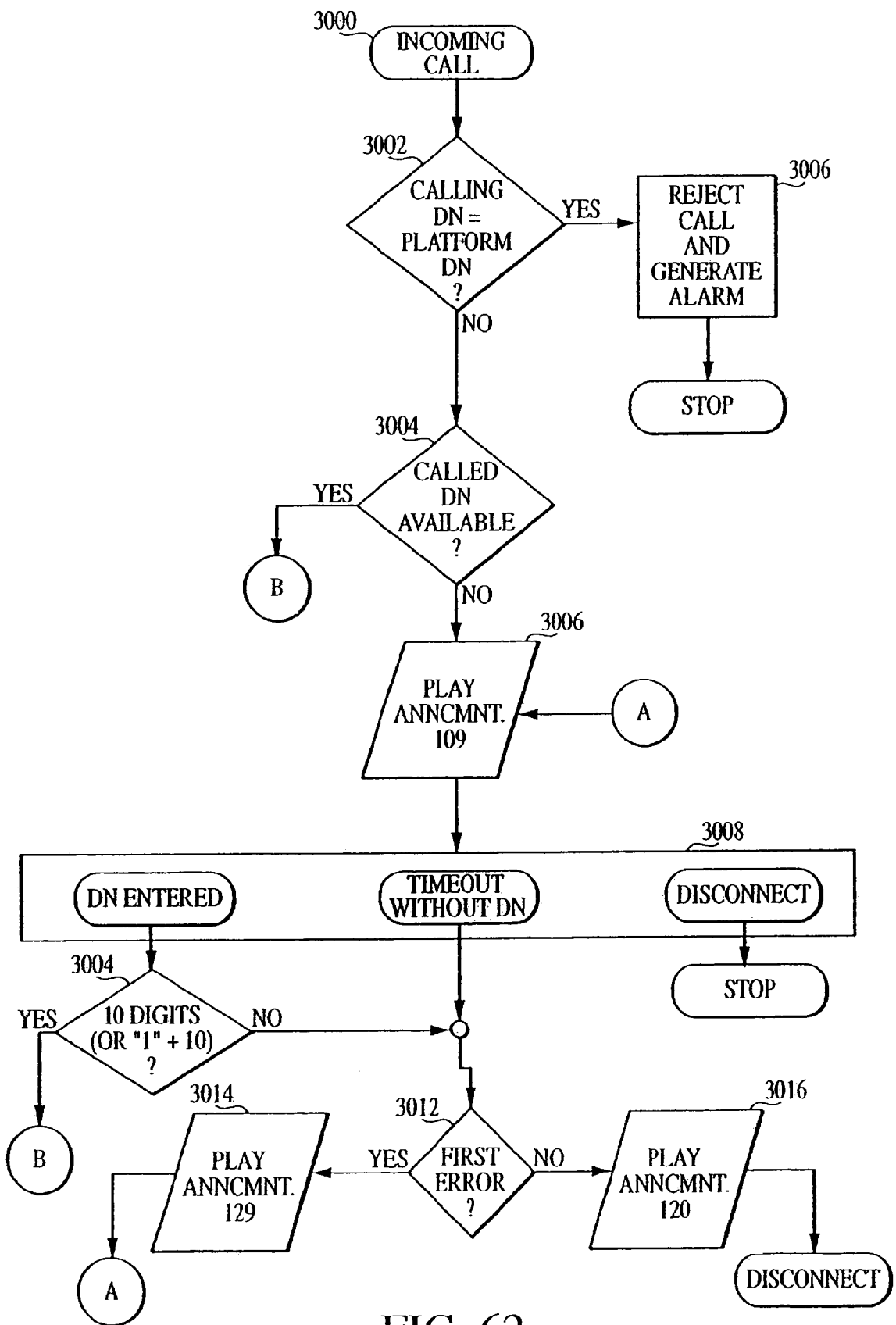
FIGS. 62-63 are flowcharts illustrating an incoming call routing flow program.
Figure 63:
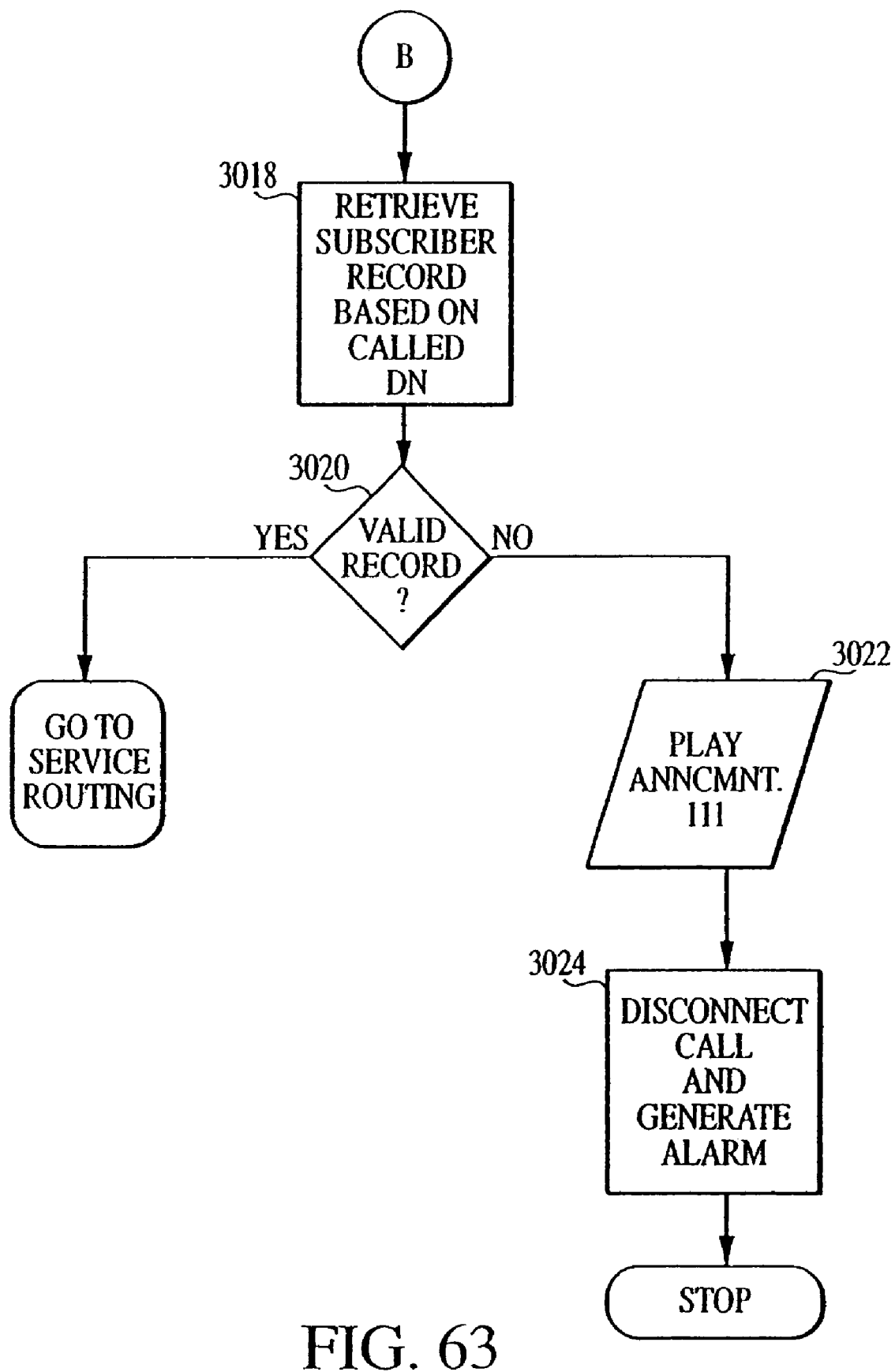

From the calling party's perspective, when the calling party dials a subscriber's PAS number, the incoming call is coupled to the platform 18 where the subscriber's profile associated with the subscriber's PAS number is retrieved from database. FIGS. 62-63 are flowcharts for an incoming call routing flow program. At reference point 3000 an incoming call is detected. At step 3002 it is determined if the calling directory number equals the platform directory number. If it does, at step 3006 the call is rejected and an alarm is generated. This is to prevent the system from going into a continuous loop if someone has placed their personal access service (PAS) phone number in their profile thereby tying up platform resources. The program is then ended. If it is determined at step 3002 that they are not equal, then at step 3004 it is determined if the called directory number is available. If it is, then at step 3018 (FIG. 63), the subscriber's profile is retrieved. At step 3020 it is determined if the subscriber's profile retrieved in step 3018 is a valid profile, i.e., meaning it has not been disabled, for example. If it is not, then the following announcement is played at step 3022:

"You have reached a non-working number. Please check the number and dial again."

Then at step 3024 the call is disconnected and an alarm is generated. The program is then ended. If it is determined at step 3020 that the profile retrieved in step 3018 is valid, the service routing subroutine program is then entered as will be discussed with reference to FIGS. 64-66.

Referring back to FIG. 61, if it is determined at step 3004 that the called directory number is not available, then at step 3006 the following announcement is played:

"Please enter the area code and telephone number of the person you are trying to reach."

At step 3008 it is determined what action has been taken by the caller. If the dialed number is entered, then at step 3010 it is determined if the proper number of digits have been entered. If they have, control is returned to step 3018 (FIG. 63). If not, then at step 3012 it is determined if this is a first error. If it is, then at step 3014 the following announcement is played:

"No keypresses have been received."

Control is then returned to step 3006 to allow the caller another opportunity to correctly enter the subscriber's telephone number. If it is determined at step 3012 that this was not the caller's first error, then at step 3016 the following message is played:

"That was not a valid entry. Please try again later. Good-bye," and the caller is disconnected.

If at step 3008 it is determined that the caller has not made a selection before the system has timed out, then the same step 3012 already described is carried out. If at step 3008 it is determined that the caller has become disconnected, then the program is terminated.

Figure 64:
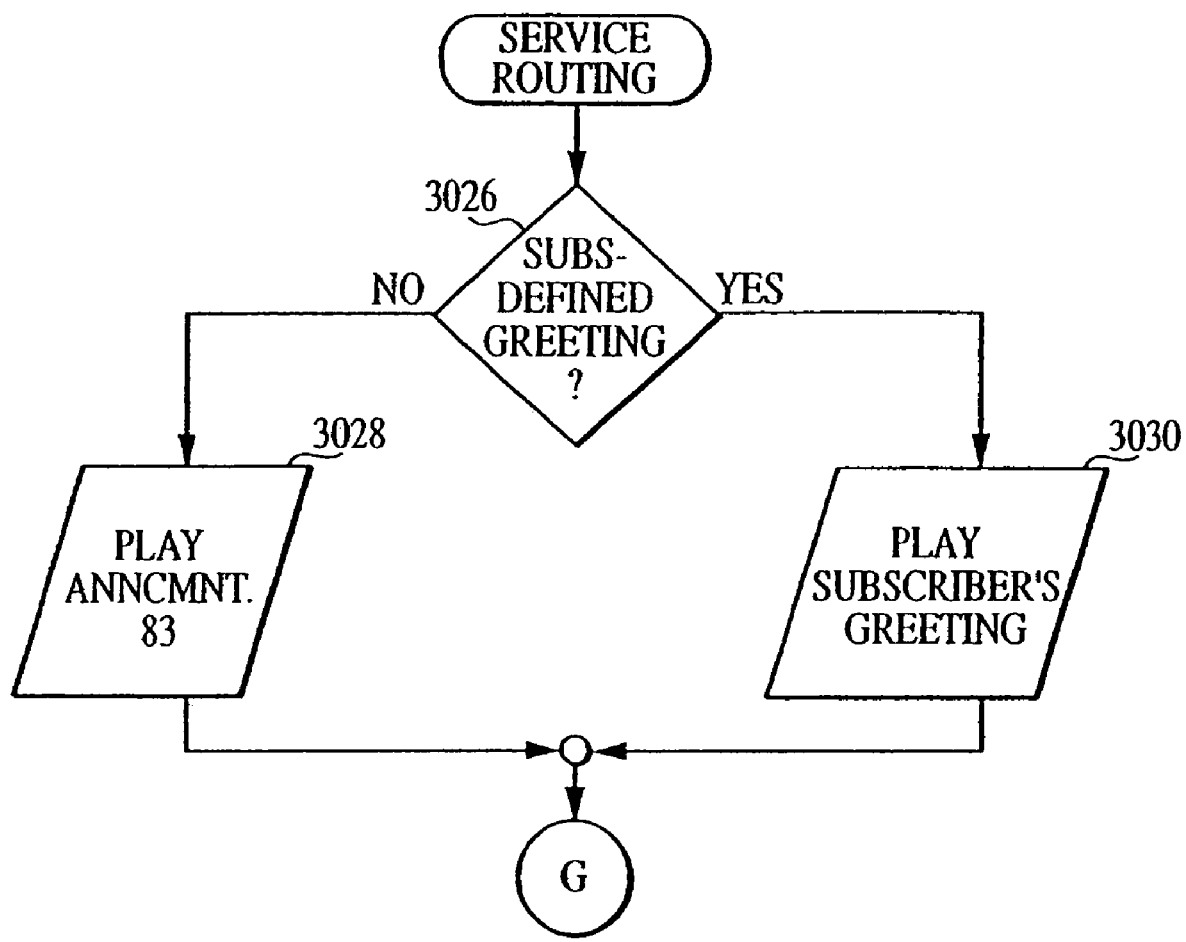
FIGS. 64-66 are flowcharts of the service routing subroutine program.
Figure 65:
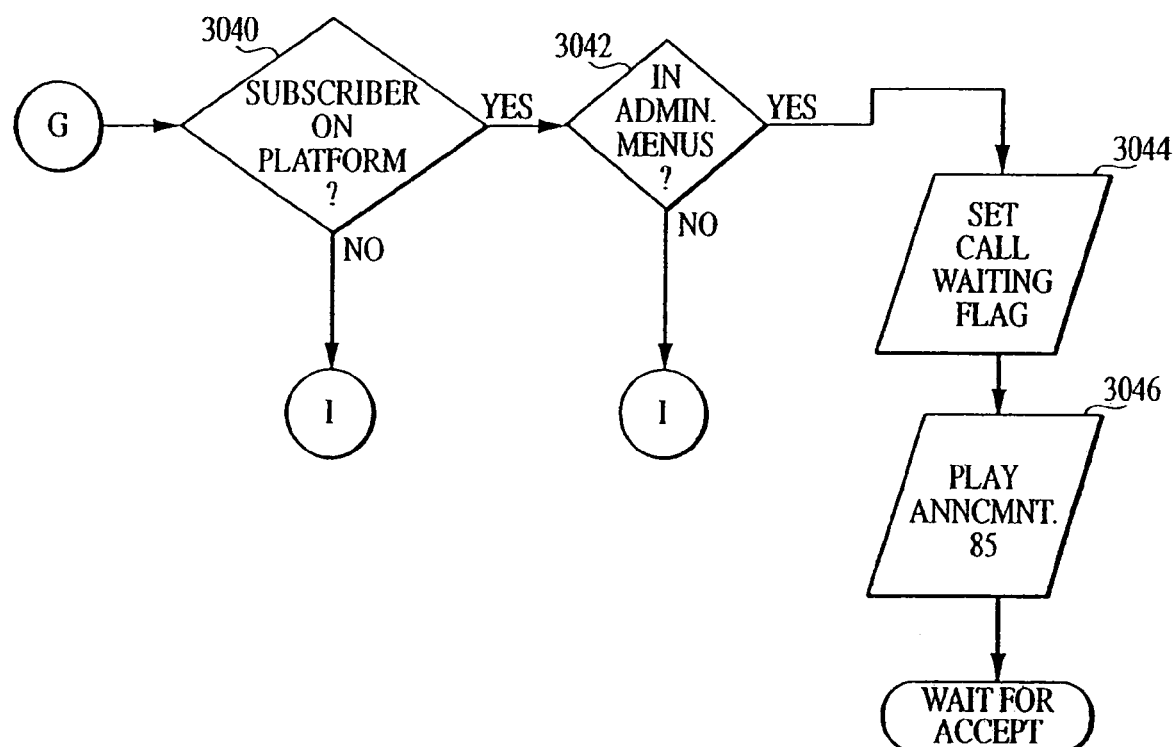
Figure 66:
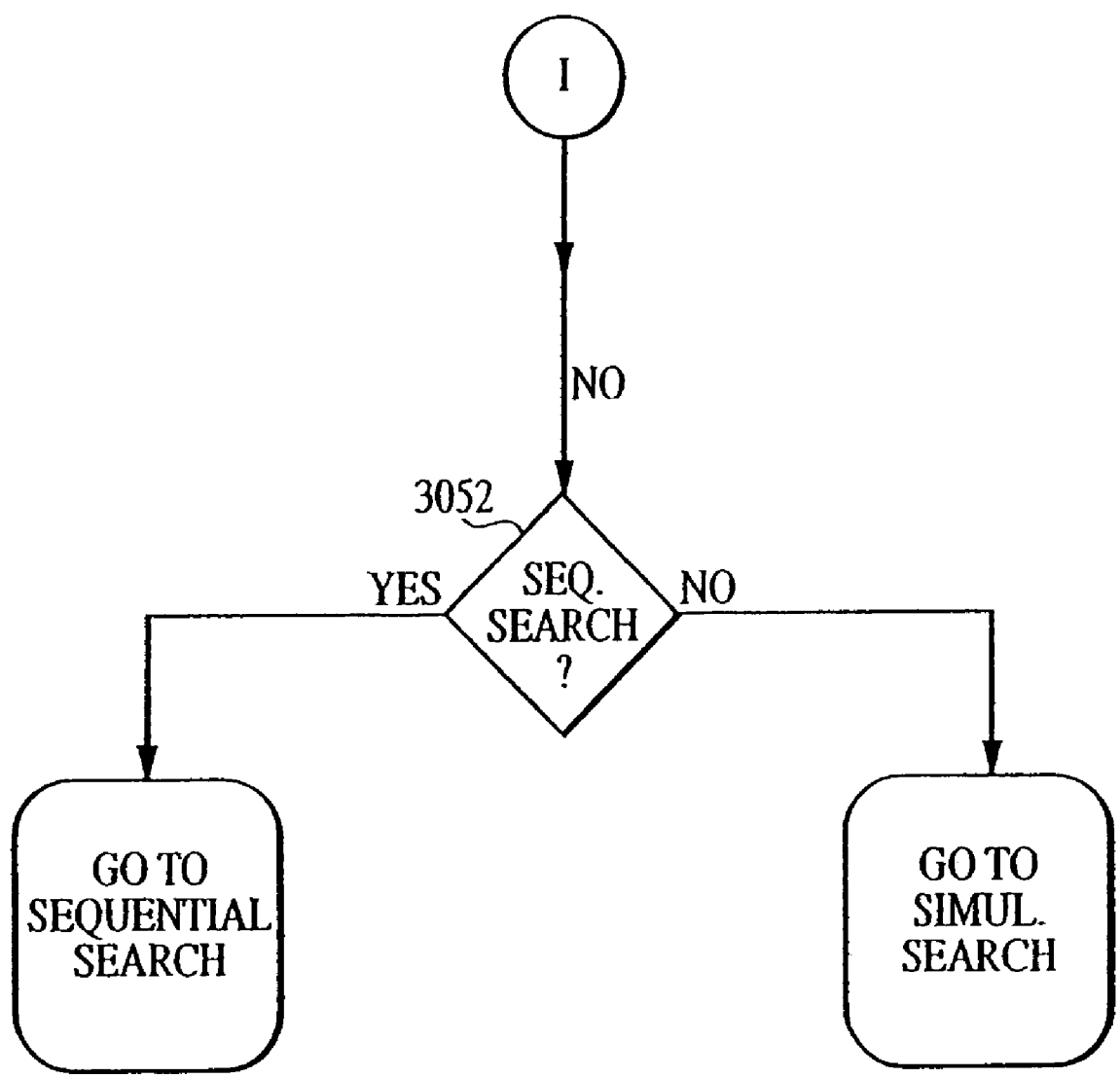

FIGS. 64-66 are flowcharts for the service routing subroutine program that is entered only if it is determined at step 3020 (FIG. 63) that the retrieved subscriber profile is a valid one. At step 3026 it is determined if the subscriber has recorded a greeting. If not, then at step 3028 the following announcement is played:

"You have called the number for <subscriber's name>."

If the subscriber has recorded a greeting, then at step 3030 the subscriber's greeting is played back to the caller.

In either case, control is transferred to step 3040 (FIG. 65). At step 3040 it is determined if the subscriber is on the platform. If the subscriber is on the platform in system administration, then at step 3044 the call waiting flag is set and at step 3046 the following announcement is played: "Please hold while your party is contacted. If you would like to be connected to <default destination>, press pound at any time."

If it is determined at step 3040 that the subscriber is not on the platform or at step 3042 that the subscriber is on the platform but is not in the administration menu, the incoming call will be directed to a telephone number indicated by the subscriber in the subscriber's profile as will be described with reference to FIG. 66.

Figure 67:
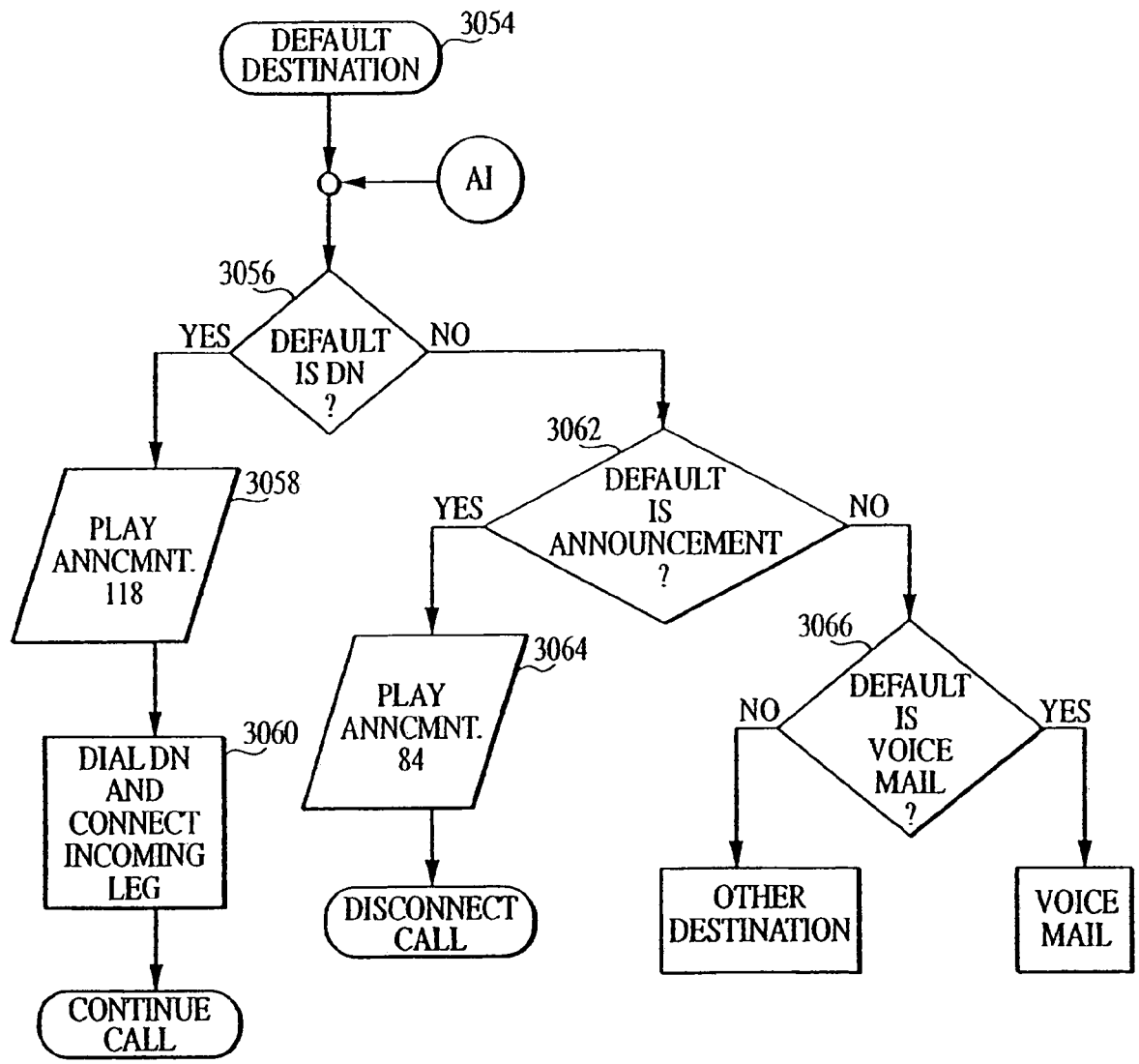
FIG. 67 is a flowchart of the default subroutine program.

If it is determined at step 3040 that the subscriber is not on the platform or that the subscriber is not in the administrative menu at step 3042, then at step 3052 (FIG. 66) it is determined whether the sequential search option has been selected. If so, control is passed to the sequential search subroutine described with reference to FIG. 58-61. If not, control is passed to the simultaneous search subroutine described with reference to FIGS. 54-57. The default destination subroutine is shown in the flow chart of FIG. 67. The subroutine begins at 3054. At step 3056 it is determined if the default location is a telephone number. If it is, then at step 3058 the following announcement is played: "Your call is being forwarded now. Please hold." Then at step 3060 the default telephone number is dialed and connected to the calling party. If it is determined at step 3056 that the default is not a telephone number, then at step 3062 it is determined if the default location is an announcement. If it is, then at step 3064 the following announcement is played: "Your party is not available now. Please try again later. (1 second pause) Good-bye." And the calling party is disconnected. If the default destination is not an announcement, then at step 3066 it is determined if the default destination is voice mail. If it is, the following announcement is played: "Your call is being forwarded to your party's voice mail. Please continue to hold" and the incoming call is transferred to voice mail. Otherwise the incoming call can be forwarded to some other destination such as a pager, for example.

It is to be understood that the forms of the invention described herewith are to be taken as preferred examples and that various changes in the shape, size and arrangement of parts may be resorted to, without departing from the spirit of the invention or scope of the claims.

The invention claimed is:

1. A call programming method for establishing a customer profile for processing subsequently received calls to a subscriber, the method comprising:
   in response to a received subscriber data entry; entering one of
      a one number programming routine,
      a sequential number programming routine, and
      a simultaneous number programming routine;
   entering a subscriber data collection routine;
   receiving subscriber entries defining the processing of subsequently received calls to the subscriber to establish the customer profile; and
   storing the customer profile for subsequent access when processing calls for the subscriber.

2. The call programming method of claim 1 wherein entering the subscriber data collection routine comprises entering a web-based subscriber interaction process.

3. The call programming method of claim 1 wherein entering the subscriber data collection routine comprises entering a graphical user interface-based subscriber interaction process.

4. The call programming method of claim 1 wherein entering a one number programming routine comprises:
   in a web page sent to the subscriber, prompting the subscriber to enter a call forwarding number;
   receiving a web page from the subscriber including the call forwarding number; and
   storing the call forwarding number for subsequent access when processing calls for the subscriber.

5. The call programming method of claim 4 further comprising:
   in a web page sent to the subscriber, prompting the subscriber for one or more time periods when subscriber calls should be forwarded to the call forwarding number; and
   receiving in a web page from the subscriber including information defining the one or more time periods.

6. The call programming method of claim 5 wherein receiving a web page including information defining the one or more time periods comprises:
   providing in the web page sent to the subscriber a default period start time for each period;
   receiving in the web page from the subscriber information defining a period start time for each time period; and
   receiving in the web page from the subscriber information defining a period end time for each period.

7. The call programming method of claim 1 wherein entering a one number programming routine comprises:
   in a web page, prompting the subscriber to enter a call forwarding number;
   receiving a web page from the subscriber including the call forwarding number; and
   storing the call forwarding number for subsequent access when processing calls for the subscriber.

8. The call programming method of claim 1 wherein entering a one number programming routine comprises:
   in a graphical user interface with the subscriber, prompting the subscriber to enter a call forwarding number;
   over the graphical user interface with the subscriber, receiving information from the subscriber including the call forwarding number; and
   storing the call forwarding number for subsequent access when processing calls for the subscriber.

9. The call programming method of claim 8 further comprising:
   in a graphical user interface with the subscriber, prompting the subscriber for one or more time periods when subscriber calls should be forwarded to the call forwarding number; and
   receiving over the graphical user interface with the subscriber information defining the one or more time periods.

10. The call programming method of claim 9 wherein receiving over the graphical user interface information defining the one or more time periods comprises:
    providing over the graphical user interface a default period start time for each period;
    receiving over the graphical user interface from the subscriber information defining a period start time for each time period; and
    receiving over the graphical user interface from the subscriber information defining a period end time for each period.

11. The call programming method of claim 1 wherein entering a sequential number programming routine comprises:
    in a web page sent to the subscriber, prompting for a first sequential call forwarding number for a time period;
    receiving a web page from the subscriber including information defining the first sequential call forwarding number;
    in a web page sent to the subscriber, prompting the subscriber to enter another sequential call forwarding number; and
    prompting the subscriber to enter additional sequential call forwarding numbers until all sequential call forwarding numbers have been entered.

12. The call programming method of claim 11 wherein entering the sequential number programming routine further comprises:
    in a web page sent to the subscriber, prompting for information defining one or more time periods when subscriber calls should be forwarded according to the sequential number programming routine; and
    receiving a web page from the subscriber including the information defining the one or more time periods.

13. The call programming method of claim 1 wherein entering a sequential number programming routine comprises:
    over a graphical user interface to the subscriber, prompting for a first sequential call forwarding number for a time period;
    receiving over the graphical user interface from the subscriber information defining the first sequential call forwarding number;

over the graphical user interface, prompting the subscriber to enter another sequential call forwarding number; and prompting the subscriber to enter additional sequential call forwarding numbers until all sequential call forwarding numbers have been entered.

14. The call programming method of claim 13 wherein entering the sequential number programming routine further comprises:

over the graphical user interface, prompting for information defining one or more time periods when subscriber calls should be forwarded according to the sequential number programming routine; and receiving over the graphical user interface from the subscriber the information defining the one or more time periods.

15. The method of claim 1 wherein entering a simultaneous number programming routine comprises:

in a web page sent to the subscriber, prompting the subscriber for a first simultaneous call forwarding number for a time period;

receiving a web page from the subscriber including information defining the first simultaneous call forwarding number;

in a web page sent to the subscriber, prompting the subscriber to enter another simultaneous call forwarding number; and prompting the subscriber to enter additional simultaneous call forwarding numbers until all simultaneous call forwarding numbers have been entered.

16. The method of claim 15 wherein entering the simultaneous number programming routine further comprises:

in a web page sent to the subscriber, prompting for information defining one or more time periods when subscriber calls should be forwarded according to the simultaneous number programming routine; and receiving a web page from the subscriber including the information defining the one or more time periods.

17. The method of claim 1 wherein entering a simultaneous number programming routine comprises:

over a graphical user interface, prompting the subscriber for a first simultaneous call forwarding number for a time period;

receiving over the graphical user interface from the subscriber information defining the first simultaneous call forwarding number;

over the graphical user interface, prompting the subscriber to enter another simultaneous call forwarding number; and prompting the subscriber to enter additional simultaneous call forwarding numbers until all simultaneous call forwarding numbers have been entered.

18. The method of claim 17 wherein entering the simultaneous number programming routine further comprises:

over the graphical user interface, prompting the subscriber for information defining one or more time periods when subscriber calls should be forwarded according to the simultaneous number programming routine; and receiving over the graphical user interface from the subscriber including the information defining the one or more time periods.

19. The method of claim 1 further comprising: in a web page sent to the subscriber, prompting the subscriber to enter a schedule override routine; and receiving a web page from the subscriber including information selecting the schedule override routine.

20. The method of claim 19 further comprising:

if the schedule override routine is selected, in a web page sent to the subscriber, prompting the subscriber to enter an override call forwarding number; and receiving a web page from the subscriber including information defining the override call forwarding number.

21. The method of claim 20 further comprising:

in a web page sent to the subscriber, repeating the override call forwarding number to the subscriber; and receiving a web page from the subscriber including verification information for the override call forwarding number.

22. The method of claim 1 further comprising: over a graphical user interface, prompting the subscriber to enter a schedule override routine; and receiving over the graphical user interface information selecting the schedule override routine.

23. The method of claim 22 further comprising:

if the schedule override routine is selected, prompting the subscriber over the graphical user interface to enter an override call forwarding number; and receiving over the graphical user interface information defining the override call forwarding number.

24. The method of claim 22 further comprising:

repeating the override call forwarding number over the graphical user interface to the subscriber; and receiving over the graphical user interface verification information for the override call forwarding number.

25. A computer readable data storage medium storing call programming code for establishing a customer profile for processing subsequently received calls to a subscriber, the code comprising:

code to form a web page including a prompt to the subscriber to establish the customer profile;

code to process web information from the subscriber;

in response to a received subscriber data entry; code to enter one of a one number programming routine, a sequential number programming routine, and a simultaneous number programming routine;

code to enter a subscriber data collection routine;

code to receive web information including subscriber entries defining the processing of subsequently received calls to the subscriber to establish the customer profile; and code to store the customer profile for subsequent access when processing calls for the subscriber.

26. A computer readable data storage medium storing call programming code for establishing a customer profile for processing subsequently received calls to a subscriber, the code comprising:

code to prompt the subscriber, over a graphical user interface, to establish the customer profile;

in response to subscriber data entry received over the graphical user interface;

code to enter one of a one number programming routine, a sequential number programming routine, and a simultaneous number programming routine;

code to enter a subscriber data collection routine;

code to receive over the graphical user interface subscriber entries defining the processing of subsequently received calls to the subscriber to establish the customer profile; and code to store the customer profile for subsequent access when processing calls for the subscriber.

* * * * *